(12) United States Patent
Hedges et al.

(10) Patent No.: US 6,535,282 B2
(45) Date of Patent: Mar. 18, 2003

(54) POSITION MEASUREMENT SYSTEM AND METHOD USING CONE MATH CALIBRATION

(75) Inventors: Thomas M. Hedges, Great Falls, VA (US); Hiro Takagi, Ashburn, VA (US); Timothy Pratt, Blacksburg, VA (US); Michael J. Sobel, Annandale, VA (US)

(73) Assignee: Arc Second, Inc., Dulles, VA (US)

( * ) Notice: Subject to any disclaimer, the term of this patent is extended or adjusted under 35 U.S.C. 154(b) by 0 days.

(21) Appl. No.: 10/021,402

(22) Filed: Oct. 30, 2001

(65) Prior Publication Data

US 2002/0154294 A1 Oct. 24, 2002

Related U.S. Application Data

(60) Provisional application No. 60/243,762, filed on Oct. 30, 2000.

(51) Int. Cl.[7] .............................. G01B 11/26; G01C 1/00
(52) U.S. Cl. ................................................... 356/141.3
(58) Field of Search ............................. 356/140–141.5, 356/141.1, 141.3

(56) References Cited

U.S. PATENT DOCUMENTS

| | | | | | |
|---|---|---|---|---|---|
| 4,796,198 A | * | 1/1989 | Boultinghouse et al. | .... | 180/167 |
| 5,100,229 A | * | 3/1992 | Lundberg et al. | ............ | 172/4.5 |
| 5,110,202 A | * | 5/1992 | Dornbusch et al. | .......... | 172/4.5 |
| 5,309,212 A | * | 5/1994 | Clark | ....................... | 356/141.1 |
| 5,579,102 A | * | 11/1996 | Pratt et al. | .................... | 172/4.5 |
| 6,381,006 B1 | * | 4/2002 | Ramstrom | ............... | 356/141.1 |
| 6,400,452 B1 | * | 6/2002 | Maynard | .................... | 342/457 |
| 6,437,860 B1 | * | 8/2002 | Jappinen | ................... | 356/141.2 |

* cited by examiner

Primary Examiner—Thomas H. Tarcza
Assistant Examiner—Brian K Andrea
(74) Attorney, Agent, or Firm—Steven L. Nichols; Paul W. Fish, Esq.; Rader, Fishman & Grauer PLLC

(57) ABSTRACT

An improved three-dimensional position detector and measurement system includes one or more transmitters that each transmit planar light beams and a strobe pulse and a receiver that responds to illumination from the beams and the strobe. The receiver in the system includes calibration logic for executing a quadratic mathematical algorithm to uniquely characterize said planar beams of each of said optical transmitters active in said measurement field. In one embodiment, the quadratic mathematical algorithm uses cones to represent the scan path of the planar beams.

37 Claims, 42 Drawing Sheets

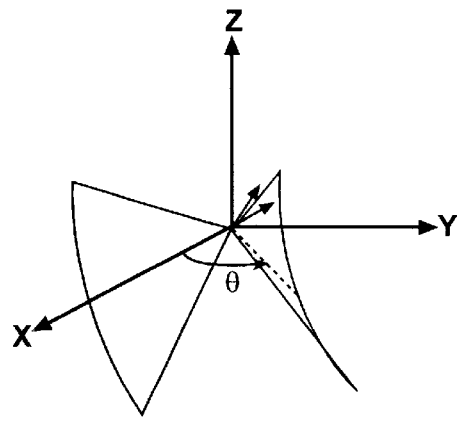
Fig. 8
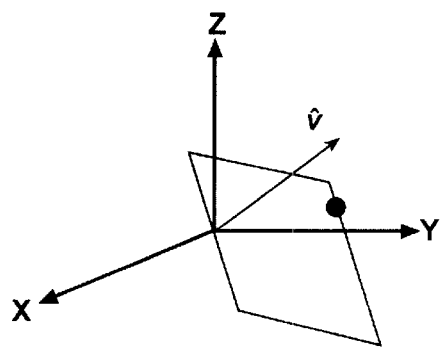 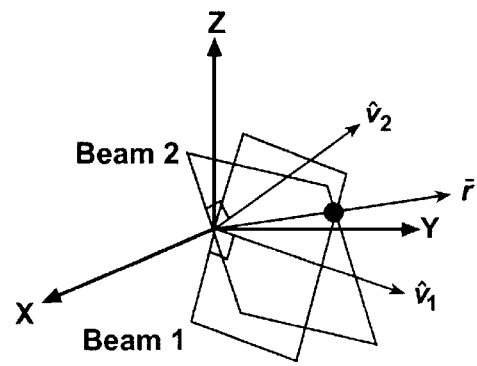
Fig. 9A              Fig. 9B

Az/E1 Calculation

POSITION MEASUREMENT SYSTEM AND METHOD USING CONE MATH CALIBRATION

REFERENCE TO RELATED APPLICATIONS

This application claims the benefit of commonly assigned U.S. Provisional Appln. No. 60/243,762, filed Oct. 30, 2000, the disclosure of which is incorporated herein by reference in its entirety. This application is also related to the following previously filed, commonly assigned U.S. utility applications: U.S. application Ser. No. 09/532,100 to Hedges et al., filed Mar. 21, 2000; U.S. application Ser. No. 09/532,099 to Hedges et al., filed Mar. 21, 2000; U.S. application Ser. No. 09/532,026 to Hedges et al., filed Mar. 21, 2000; and U.S. application Ser. No. 09/417,112 to Pratt et al., filed Mar. 21, 2000, all of which are incorporated herein by reference.

TECHNICAL FIELD

This invention relates in general to the field of position measurement in a three-dimensional workspace and more particularly to an improved system and method of providing position-related information.

BACKGROUND OF THE INVENTION

A variety of endeavors require or are greatly aided by the ability to make a precise determination of position within a three-dimensional workspace. For example, laying out a construction site according to a blueprint requires the identification at the actual construction site of a number of actual positions that correspond to features of the building on the blueprint.

Despite the many applications which require or are advanced by the ability to make precise determinations of position, it has historically been relatively difficult or expensive to precisely fix the position of any given point relative to an origin in an actual three-dimensional workspace.

A variety of techniques are known in the art to measure position, including land surveying techniques and global positioning satellite ("GPS") system techniques. However, these techniques generally are not precise or require expensive devices which are complex and difficult to manufacture with high precision and accuracy. Additionally, many of these techniques required extensive training, and therefore cannot be practiced by those not trained in the art. Land surveying techniques, for example, fix position using a precision instrument known as a theodolite. The theodolite is both an expensive piece of equipment and requires substantial training to use. GPS equipment is relatively easy to use, but can be expensive and has limited accuracy on a small scale due to a certain amount of intentional error that is introduced by the military operators of GPS satellites.

Consequently, there has long been a need in the art for a method and device that can quickly and accurately fix positions in a three-dimensional workspace. There is a further need in the art for such a method and device which is easy to use and does not require extensive training.

SUMMARY OF THE INVENTION

Accordingly, the present invention is directed to an improved position measurement system, comprising at least one optical transmitter positioned within a position measurement field to generate a pair of planar light beams and a strobe pulse to illuminate said measurement field, at least one selectively positionable receiver within said position measurement field to generate position measurement data in response to said illumination from said planar beams and said strobe pulse, and calibration logic associated with said light detector receiver for executing a quadratic mathematical algorithm to uniquely characterize said planar beams of each of said optical transmitters active in said measurement field.

The invention is also directed to a position measurement system which includes an optical transmitter for generating a pair of spaced apart planar light beams and a periodic strobe pulse and a selectively positionable detector having at least two spaced apart optical detectors wherein said transmitter and detector are positioned in a measurement field, where the improvement comprises means to continuously monitor and calculate a pulse width of said beams, means to characterize said planar beams using a quadratic mathematical algorithm, wherein a range distance from said transmitter position to said detector position is estimated based on the pulse width and the quadratic mathematical algorithm, and means to display said estimated range to a user.

The invention is further directed to a receiver for an improved position measurement system having at least one optical transmitter positioned within a position measurement field that generates a pair of planar light beams and a strobe pulse to illuminate the position measurement field, the receiver comprising a data generator for generating position measurement data in response to illumination of the receiver from said planar beams and said strobe pulse and calibration logic associated with the receiver for executing a quadratic mathematical algorithm to uniquely characterize said planar beams of each of said optical transmitters active in said measurement field.

BRIEF DESCRIPTION OF THE DRAWINGS

The above described novel aspects of applicants' improved apparatus and methods for position measurements can be better understood with reference to the attached drawings, in which:

FIG. 8 is a graphic representation of the cone surface further rotated about the z-axis;

FIG. 9A is a graphic representation of the plane of a fan beam intersecting a detector according to the present invention;

FIG. 9B is a graphic representation of the planes of two fan beams intersecting a detector according to the present invention;

FIG. 31-1 is an illustration of a system according to the present invention which is being initialized using a Least Squares Resection method;

FIG. 31-2 is a mathematical illustration of a step in the Least Squares Resection method of initializing a position measuring system according to the present invention;

FIGS. 32-1 and 32-2 are illustrations of a system according to the present invention which is being initialized using a Quick Calc Method which is part of the present invention;

FIG. 32-3 is a mathematical illustration of a step in the Quick Calc Method of initializing a position measuring system according to the present invention;

FIG. 32-4 is an illustration of a first transmitter identified in the Quick Calc Method.

FIGS. 32-5, 32-6, 32-7, 32-8, 32-9, 32-10, 32-11 and 32-12 are a mathematical illustrations steps in the Quick Calc Method of initializing a position measuring system according to the present invention.

DETAILED DESCRIPTION OF THE EMBODIMENTS

Figure 1:
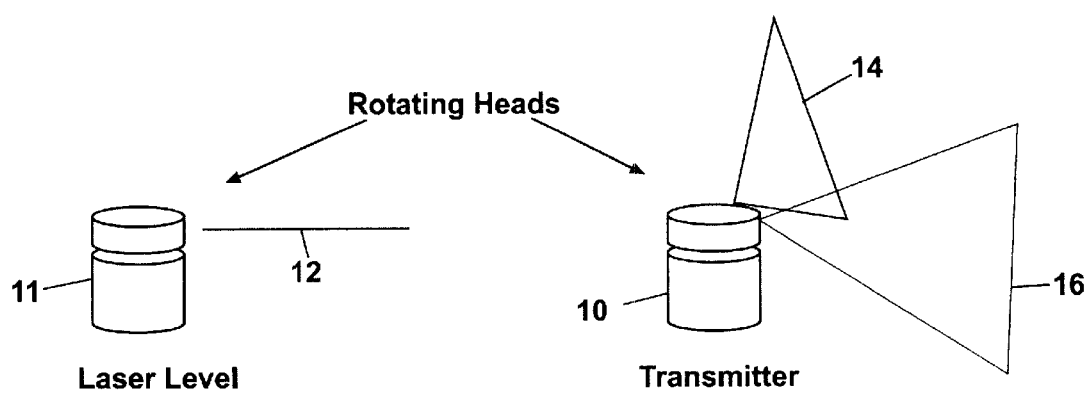
FIG. 1 is an illustration of an improved optical transmitter according to the present invention, contrasted with a conventional rotating laser.

The preferred embodiments of the present invention will now be described in detail with reference to the drawings. The components of the invention will be described generally in an overview, and then the details and operation of each component, as well as the manner in which they operate together, will be described in more detail after the overview.

1. Transmitter Overview

The transmitter of the present invention includes a rotating head which sweeps one or more, preferably two, fanned laser beams continually through the three-dimensional workspace in which the receiver will be used to make position determinations based on the optical signals received from the transmitter. In this way, the signals from the transmitter cover the entire three-dimensional workspace. The present invention can be used in conjunction with the techniques and apparatus described in previous provisional patent application U.S. Ser. No. 60/104,115 to Pratt, also assigned to the present assignee, filed on Oct. 13, 1998, and International Patent Appln. No. PCT/US99/23615, filed Oct. 13, 1999 and published Apr. 21, 2000, both of which are incorporated herein by reference.

Generally, the measurement system uses fans of light and a strobe to create a measurement field. As a result, a two-dimensional measurement field (e.g., azimuth and elevation) can be created with a single transmitter, and a three-dimensional measurement field (e.g., an x-y-z Cartesian coordinate system) can be created with two transmitters tied together by a common reference frame.

A. Simplified Optical Path

The receiver preferably has a clear optical path to each transmitter in the system during position fixing operation. One of the key advantages of the transmitters according to the present invention is the simplification of the optical paths as exemplified by the lasers rotating with the head. Additionally, there is no window in the preferred transmitter. Therefore, there is no distortion introduced by the movement of the laser across a window. As described in detail below, the preferred embodiment utilizes a lens or other device which rotates with the laser. Thus, there is no distortion caused, for example, by variable window characteristics or angles of incidence or between a rotating lens and a fixed laser. The lack of a fixed window also simplifies manufacture, maintenance, and operation. The lack of a fixed window does make it preferable that a rotating seal be added to the transmitter.

B. Speed of Rotation and Storage of Parameters

The rotating head of the transmitter of the present invention, and the lasers within it, rotate through a full 360 degrees at a constant, although configurable, velocity. As will be explained below, each transmitter in the system needs to rotate at a different velocity. Therefore, each transmitter has a velocity that can be controlled by the user. Additionally, each transmitter has an easily quantifiable center of rotation which simplifies the algorithms for determining position and can simplify the set-up of the system. A separate synchronization signal, also preferably an optical signal, fires in the preferred embodiment once per revolution of the rotating head to assist the receiver in using the information received from the transmitter.

The velocity of the rotating head is configurable through the use of, in the preferred embodiment, a field programmable gate array ("FPGA"). Such configurable speed control allows the lasers, or other transmitters, to be differentiated by a receiver based on their unique and predetermined speeds of rotation. The use of multiple transmitters, as is appreciated by those of ordinary skill in the art, enhances position detection. Other advantages are obtained through the use of programmable electronics (FPGAs, flash memory, etc). Not only can the desired speed be set by changing the clock to the phase locked loop, but the overall gain of the control loop can be programmed to maximize performance at the velocity of interest.

C. Beam Type and Number

As described in the incorporated provisional and known in the art, position detection is also enhanced by using multiple beams and controlling the shape of those beams. These beams may be in the same rotating head assembly or in separate rotating head assemblies.

Two beams is the preferred number per rotating head assembly, however, more beams can be used. In particular, another embodiment uses four beams, two for short range and two for long range. The two short-range beams would have fan angles as large as possible. This will allow the user to operate near the transmitters, such as in a room. For long-range, the user would normally be operating away from the transmitters. Therefore, in that circumstance the vertical extent of the beams would be reduced to maximize the range of the system. The beams are, preferably, of type III laser. However, the rotation of the beams reduces their intensity to the fixed observer such that they can be classified as type I lasers. Safety features are integrated into the device to prevent the powering of the lasers when the rotating head is not in motion. In the preferred embodiment at least two interlocks are utilized. The first depends on the phase lock loop. The lasers are turned off until the system is rotating in phase-lock for at least 1024 phase-clock-cycles (approximately 32 revolutions). The second is monitoring the absolute speed using the once-per-rev index on the encoder. A tolerance is programmed into the system, currently 1-part-in-1000. When the velocity is outside that window the laser is disabled and not allowed to operate.

D. Beam Shape

The Transmitter allows flexibility in setting beam characteristics as needed for the specific application of the invention. One advantage is that the beam shape can be modified. The key is that the beam shape should correspond with correctly filling the desired three-dimensional workspace. For construction trades this might be a room 20 m×20 m×5 m in size. For construction machine control this might be a space 100 m×100 m×10 m in size. By modifying the beam shape, the energy can be properly directed.

The beam shape can also be controlled to differentiate beams. This can be done for multiple beams on a given transmitter or on different transmitters. For a given transmitter, the beam of the first and second beams must be differentiated. One technique uses their relative position with respect to the strobe in time. Another technique is to assure that the beams have different widths ("beam width" or "divergence angle"). Then, for instance, the first beam could be the "larger" of the two beams.

Fanning the beam can be done using a variety of methods known in the art, including without limitation, rod lenses, pal lenses, and cylindrical lenses. The use of rod lenses offers a relatively simple approach, whereas the use of pal lenses offers greater control over the energy distribution. The beam typically is emitted from the source as a conical beam, then a collimating lens shapes the beam into a column, then the fanning lens fans the column.

Rod lenses can be used to increase control on divergence. One of the major advantages of rod lenses for line generation is that they do not directly affect the quality of the beam in the measurement direction (beam direction). Therefore, they should not affect the divergence of the laser beam as set by the collimating optics.

PAL lenses can be used to increase control of the energy distribution in the fan direction. PAL type lenses can even create "uniform" distributions, where the energy is uniform in the direction of the fan plane. A uniform distribution is often inefficient, however, if potential receivers are not uniformly distributed along the entire fan plane. In some implementations a "focus" must be created before the lens. In that implementation, the use of the PAL technique could affect the beam in the measurement direction.

Gaussian beams can also be used to maximize the performance of the receiver. Gaussian beams are symmetric beams in that the energy distribution across the divergence angle or beam width is symmetric. When a simple threshold technique is used in the receiver, it important that the pulses be symmetric and be without shoulders or sidelobes. It is also helpful if the distribution's shape does not change with range. There are several pulse shapes that meet many of these criteria. However, the Gaussian distribution meets all of these criteria. With symmetric pulses that do not have shoulders or sidelobes, the receiver will be able to detect the center of the beam. Non-symmetric pulses, conversely, can cause the receiver to falsely identify the exact time when the beam center intersects the receiver.

E. Strobe

Additionally, the synchronization signal, mentioned above, is strobed and must be symmetric. Therefore, pulse shaping in the flash/strobe pulse generator for the synchronization signal is required. A square pulse with equal rise and fall times is the desired pulse shape. This pulse is preferably provided to a plurality of LEDs on the transmitter that are arranged to send out the synchronization pulse signal in a multitude of directions throughout the three-dimensional workspace. The light output of the LEDs is directly proportional to the current flowing through the LEDs. Because of the high currents involved in creating the strobe, a pulse-forming network must be used to assure that the current is a square wave as it passes through the diodes.

F. Communications and Control

A transmitter according to the present invention uses a serial port for communication and control. This allows calibration data and control parameters to easily be transferred. Recall that the transmitters are differentiated by their speeds. Therefore a technique must be put in place to simplify the speed changes. Additionally, a particular set of transmitter parameters must be made available to the receiver so that the receiver can calculate position based on the signals received from the transmitter. To create a simple, reliable, and unified technique the preferred embodiment uses serial communication between the transmitter and the receiver or test equipment. For test purposes, the serial connection is a well-known RS-232 connection. For use in the field, the connection is preferably through an infrared serial port. This allows the transmitter to be sealed and yet communicate with the outside world. To avoid interference with the measurement technique, this port is only active when the lasers are off.

G. VHDL

Many of the digital designs of a disclosed embodiment are implemented in field programmable gate arrays (FPGAs). These devices allow complex designs to be programmed into general-purpose hardware available from multiple vendors. The programs for these devices are written in a very special computer understandable language VHDL (VHSIC [very high-speed integrated circuit] Hardware Description Language). This is the same language that is used to design microprocessors and other semiconductor devices and is now standardized as IEEE 1076.

H. Providing Power to the Laser Head

As explained in the incorporated provisional application, the motor and the provision of power to the rotating head assembly are key components of a transmitter according to the preferred embodiment.

A rotary transformer is used. Several techniques are available for powering devices in a rotating head. The most common is the use of slip rings. Unfortunately, slip rings require physical contact between the "brushes" and the "slip-ring". This creates dust in the system and can cause friction in the motor. The preferred technique is to use a rotating transformer. The transformer technique will provide minimal drag on the motor. Additionally, through the use of flat signal transformers as power transformers, the technique is very compact.

Fly-back control is used on the stator side of the transformer. To minimize the number of components in the rotating head, the voltage control is performed on the stator side of the transform. To optimize efficiency, a fly-back driving technique is utilized.

I. Stability and Precision of Rotation

The stability of the power transfer is also discussed in the incorporated provisional application. As those of ordinary skill in the art will recognize, a sine wave drive motor is a low-cost motor with good inherent stability intra-revolution and, as such, is useful in ensuring constant velocity rotation.

The bearing separation should be maximized to achieve optimal results. Any precession and wobble (wow and flutter in a turntable) will be a source of error in the system. It will lead directly to an error in the "z" direction. Using two precision bearings and maximizing the distance between the bearings can minimize these errors.

The strobe flashes of the synchronization signal are based on a once-per-revolution indicator tied to the motor shaft. There are many ways to create this shaft position index. The simplest and preferred technique is to use the index normally supplied with an optical encoder. This separate output of the encoder is directly equivalent to a shaft position index. An optical encoder disk is used to give rotation information. Other devices, including without limitation, tachometers and synchros could be used.

The optical encoder disk is typically made of glass and has a series of radial marks on it which are detected as the disk rotates. Additionally, the disk typically has a single "index" mark of a different radius which is used to detect complete rotations. The disk system produces a square wave with a frequency dictated by the speed with which the radial marks are passing. For example, if the disk is rotating at 1 revolution/second, a 1000 mark disk system would produce a 1000 Hz square wave (1000 radial marks/revolution*1 revolution/second=1000 Hz).

The speed of the motor is controlled through a feedback phase-locked loop ("PLL") system. The disk system square wave is one input and a clock from the transmitter system is the other input. The transmitter clock has a selectable frequency. The output of the PLL is used to control the speed of the motor rotation such that the PLL remains locked at the selected frequency.

The index mark of the disk can also be used to initiate the strobe pulse once/revolution.

J. Low Manufacture Cost

As noted above, for the receiver to use the signals from the transmitter to accurately and precisely fix a position in the three-dimensional workspace, the receiver must have available a certain set of parameter characteristic of the transmitter. For example, as will be explained in detail below, the receiver must know the angles at which the laser beams are emitted from the transmitter head.

If these angles are pre-defined and the transmitter must then be manufactured with precision to match the specified parameters, it becomes extremely expensive to manufacture the transmitter. Under the principles of the present invention, the transmitter can be manufactured without such high precision and without requiring that the resulting transmitter conform to pre-specified parameters. Rather, the operating parameters of the transmitter required by the receiver are carefully measured after the transmitter is manufactured. This process, which will be referred to as transmitter calibration herein and described in more detail below, removes the expensive requirement of a precisely constructed transmitter. Consequently, the system of the present invention becomes much less expensive.

The operating parameters of the transmitter are preferably stored electronically in the each transmitter after that transmitter is calibrated. Consequently, each transmitter preferably incorporates a memory device in which the calibration parameters can be stored. These parameters can then be communicated to the receiver electronically through the serial port, optical or wired, of the transmitter described above. The receiver will have a corresponding serial port, optical or wired, for receiving data from the transmitter.

Preferably, these parameters are then stored in memory in a Position Calculation Engine (PCE) of the receiver and can be updated as required. For example, if a new transmitter is added to the system, then a new set of parameters needs to be loaded into the PCE from or for that transmitter. As an additional example, if the rotation speed of a transmitter is changed, then this information needs to be updated in the PCE.

2. Receiving Instrument Overview

In the present system, the receiver or receiving instrument is a wand, an example of which is illustrated in FIG. 17. The wand provides a light-weight, mobile receiving instrument that can be carried anywhere within the three-dimensional workspace. A tip of the wand is used as the point for which position within the workspace is determined based on the signals received from the system transmitter. The position of the tip can be continuously calculated by the receiver and displayed for the user on a display device provided on the receiver. Consequently, no extensive training is required to operate the position fixing system of the present invention once the system is set up and functioning.

The wand preferably contains two receivers, which are light detectors if the transmitter is emitting optical signals as in the preferred embodiment. The Position Calculation Engine ("PCE") of the receiving instrument is a processor that performs most of the computations of the receiving instrument. The PCE supports any required set-up procedure as well as the subsequent tracking, position calculation, and information display functions. The receiving instrument and PCE will be described in detail below.

The Smart Tip, shown in FIG. 17, can also perform computations, as indicated by the FPGA (field-programmable gate array) and the "i Button" in each Smart Tip. The Smart Tip can be present at either end of the wand in the present system and the signal "Tip Present" indicates whether there is a Smart Tip on each of the receiving instrument ends.

3. Setup Overview

The setup procedure is described in detail below. The setup procedure places the transmitters in position and commences their operation. The setup procedure also allows the system to, among other things, define a useful coordinate system relative to the three-dimensional workspace and begin tracking the wand's location in that coordinate system.

The components and operation of the inventive system will now be described in greater detail.

4. The Transmitter

A. Physical Description

With reference to FIG. 1, a transmitter (10) according to the present invention is a device physically similar to a rotating laser (11), which is also illustrated in FIG. 1 for comparison. However, a conventional rotating laser (11) has a single rotating spot beam (12) that is swept through a plane as the head of the laser (11) rotates. In contrast, the transmitter (10) of the present invention emits two rotating fan beams (14 & 16). These fan beams (14 & 16) sweep through the three-dimensional workspace within which the system of the present invention can fix the position of the receiving instrument.

Figure 2:
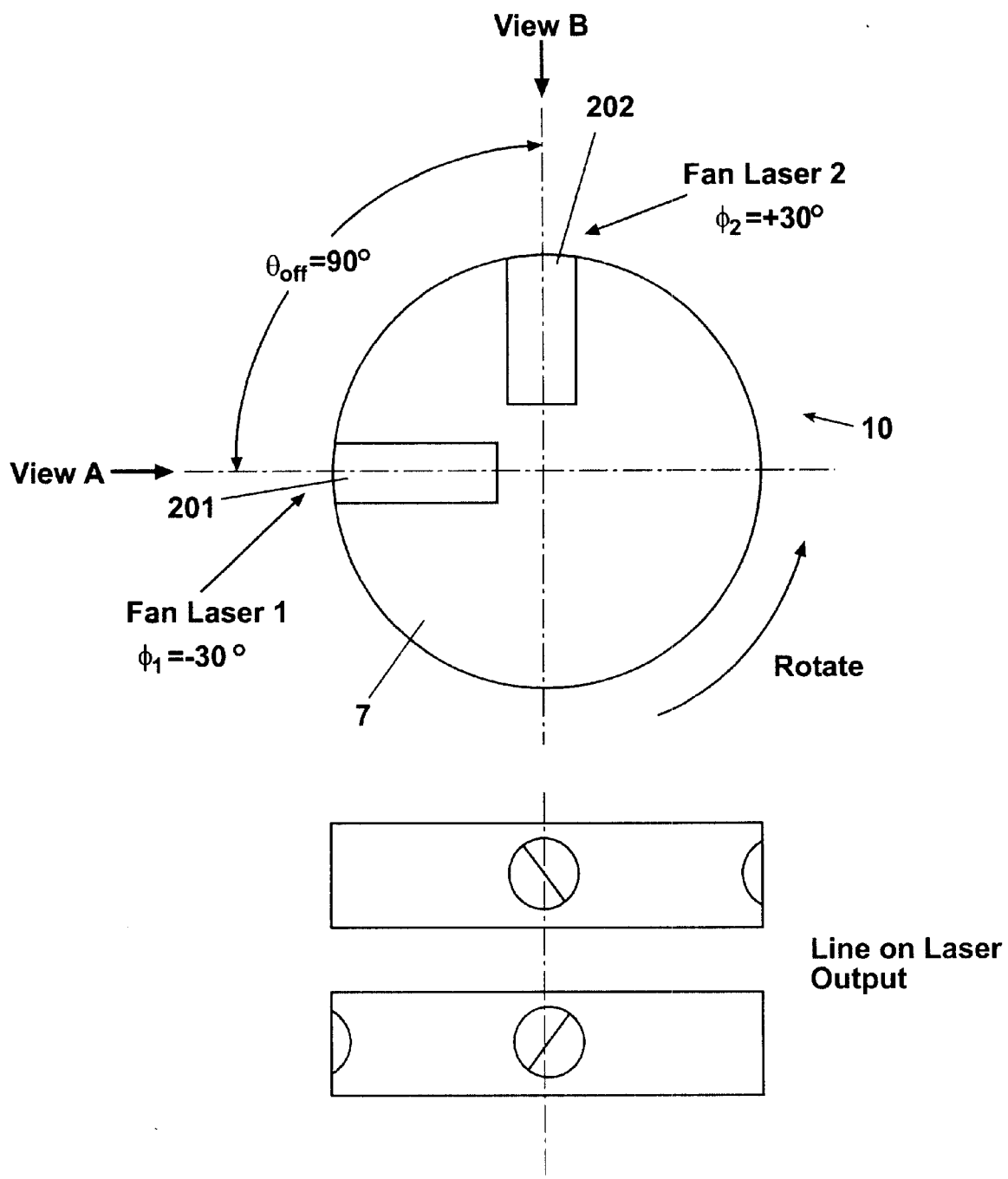
FIG. 2 is a schematic plan and sectional views illustrating the preferred embodiments of the optical transmitter apparatus of FIG. 1 according to the present invention.

FIG. 2 shows the preferred assembly of the transmitter (10), particularly the rotating head (7) of the transmitter (10), according to the present invention. As shown in FIG. 2, the rotating head (7) of the transmitter (10) includes two fan lasers (201 & 202). There are three important angles in the Fig.: $\theta_{Off}$, $\phi_1$, and $\phi_2$. $\theta_{Off}$ describes the angular separation between the two laser modules (201 & 202) in the rotating head (7) as viewed from above the transmitter (10). The lasers (201 & 202) are preferably disposed with optical axes at approximately 90° to each other. $\theta_1$ and $\theta_2$ describe the tilt of the fan plane of the lasers (201 & 202), respectively, with respect to a vertical plane. As shown in the lower portion of FIG. 2, these two angles are measured from vertical, and are nominally set to −30° for beam 1 and +30° for beam 2. We explain the sign convention for these angles below. As described above, the actual values for $\theta_{Off}$, $\phi_1$, and $\phi_2$ are determined through a factory calibration process and need not conform exactly to the preferred values described herein.

As the transmitter head (10) rotates, it scans the measurement field more fully described hereafter with the two planes of light (14 & 16) emitted by the fan lasers (201 & 202). The receiver or receiving instrument (24, FIG. 12) is illuminated by each laser's fan plane (14 & 16) exactly once during a rotation of the head (7).

In addition to this scanning operation, the transmitter (10) also fires an optical strobe as a synchronization signal to the receiver (24). The strobe is fired from a plurality of LED's (6, FIG. 3) disposed to emit light at a variety of angles from the transmitter (10) so as to cover the three-dimensional workspace. The synchronization signal is emitted at a fixed point in the head's revolution so as to be emitted once per revolution of the transmitter head (7). The strobe illuminates the receiver (24) and is used to provide a zero reference for the rotation of the head (7). This scanning of the fan beams (14 & 16) and the strobed synchronization signal process provides the basis for the position measurements made by the receiver which will be described in more detail below.

Each transmitter (10) in the system rotates at a known and unique rate. This unique rotational rate allows the software in the receiver to differentiate between the transmitters surrounding the three-dimensional workspace. Knowing the speed of each transmitter and a zero point for the rotation of that transmitter given by the synchronization signal, the receiver knows when at what interval and time to expect to detect the first and second fan beams (14 & 16) emitted by any particular transmitter (10). Thus, beams detected at the expected interval and timing can be assigned as having come from a particular transmitter in the system based on the operating parameters of that transmitter known by the receiver, i.e., communicated to the receiver in the calibration processes mentioned above.

B. Low Cost Transmitter Detailed Description

Figure 3:
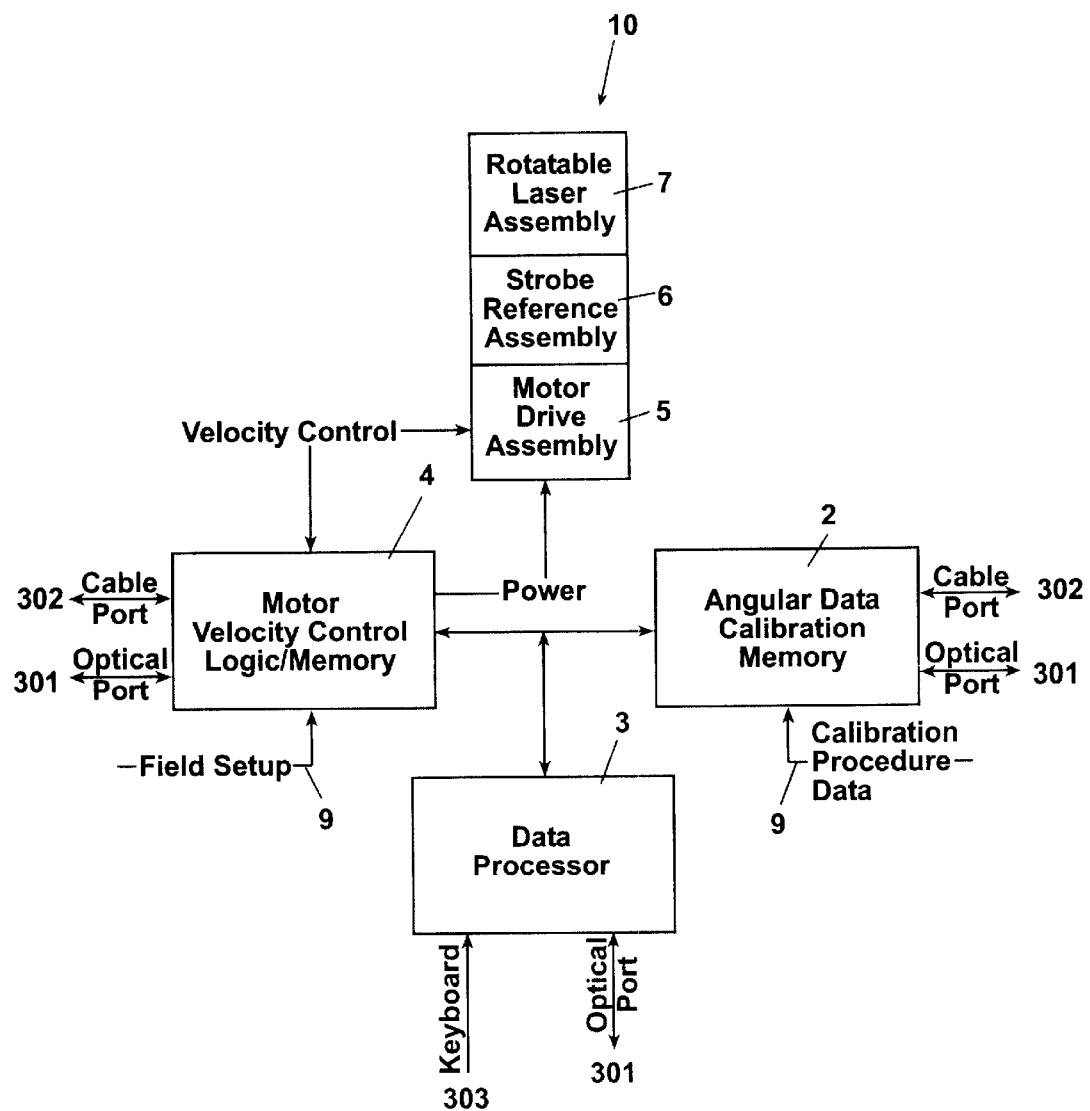
FIG. 3 is a block diagram of the improved optical transmitter for a position location system and method according to the present invention.

An improved, low cost optical transmitter useful in a three dimensional measurement system in accordance with several novel aspects of applicants' invention is illustrated in the logic block diagram of FIG. 3. Throughout the specification and drawings, like numerals are used to designate like elements.

As shown in FIG. 3, a transmitter (10) of the present invention preferably includes the rotating head (7) and synchronization or reference signal emission assembly (6) as described above. A motor drive assembly (5) drives the rotating head (7).

As noted above, the speed of the rotating head is used by the receiver (24) to recognize the transmitter emitting a particular pair of fan beams (14 & 16). Therefore, a motor velocity control circuit (4) is provided to provide power to and regulate the velocity of the motor drive assembly (5).

As described above, in order to achieve a low cost optical transmitter (10) and method, the present invention preferably relies on a calibration procedure performed during the manufacture/assembly process to generate unique data for characterizing each optical transmitter (10) rather than employing a much higher cost precision assembly process. Specifically, angular calibration data is generated during the manufacture/assembly process that includes $\theta_{Off}$, $\phi_1$, and $\phi_2$ (as defined above) for each transmitter (10). Off describes the angular separation between the two laser modules (201 & 202) in the rotating head (7) of each transmitter, and $\phi_1$, and $\phi_2$ describe the tilt of the fan plane of the lasers (201 & 202) in each transmitter (10), respectively, with respect to a vertical plane.

This angular calibration data (9) is preferably stored in calibration data memory (2). In addition, data defining the setting for the rotational velocity can be preloaded during the manufacturing process and loaded into calibration data memory (2) or variable motor control memory (4). If the rotational velocity is adjusted by the user, the new rotational velocity value will be recorded in the data memory (2) or the motor control memory (4).

A data processor (3) is also provided to control the motor velocity control unit (4) and the data calibration memory (2). The data processor (3) is preferably connected to a user interface (303), such as a keyboard, so that the calibration data can be entered for storage in the calibration memory (2) or so that the angular velocity of the motor drive assembly (5) can be changed and the new value stored in the appropriate memory (4 and/or 2).

Alternatively, during field setup, data (8) that sets the velocity of the motor drive assembly (5) may be input directly to variable motor control unit (4) using a cable port (302) or optical port (301) of the transmitter. That velocity calibration data must likewise be stored in memory (4 and/or 2). Likewise, calibration data (9) can be entered directly to the calibration memory (2) through a cable port (302) or optical port (301) of the transmitter.

Figure 12:
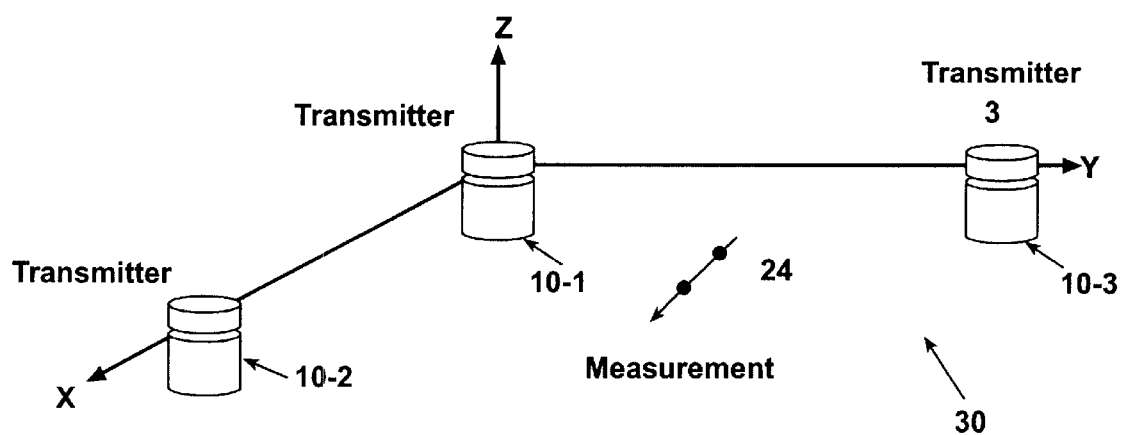
FIG. 12 is an illustration of a three-transmitter position measurement system according to the present invention.

As shown in FIG. 3, the processor (3), calibration memory (2) and velocity control logic/memory unit (4) each may be connected to the cable port (302) or optical port (301) of the transmitter so that data can be input or retrieved therefrom. Calibration data from the memories (2 & 4) can be output to the optical receiver (24; FIG. 12) in a measurement system of the present invention from the memory units (2 & 4) via the cable or optical output ports (302 & 301). As mentioned above, when a transmitter (10) is introduced into a measurement system according to the present invention, the calibration data for that transmitter (10) must be transferred to or loaded into the receiver (24; FIG. 12).

C. Mathematical Description

A mathematical model is now set forth that describes the physical scanning operation of the transmitter. We use this model in the next section to derive the position calculation algorithm.

Figure 4:
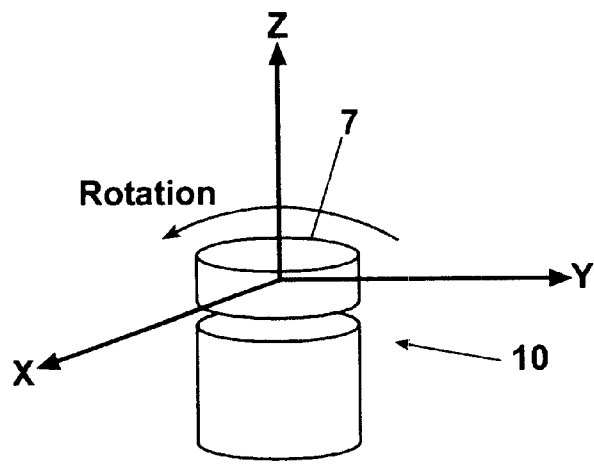
FIG. 4 is an illustration of the rotating optical head and corresponding frame of reference according to the transmitter of the present invention.

Physically, the scanning operation of the transmitter (10) is accomplished with the two laser fan beams (14 & 16) described above with reference to FIGS. 1 and 2. Each of the fan beams (14 & 16) will be considered individually in this mathematical model. To build this model, we first define the transmitter's reference frame as shown in FIG. 4. Each transmitter (10) has its own local reference frame, and these reference frames are different from the user's reference frame as will be explained hereinafter. The reference frames of the various transmitters (10) in the system will be related to the user's reference frame as described below. As can be seen in FIG. 4, the head (7) preferably rotates in the positive direction about the z-axis according to the right hand rule.

Figure 5:
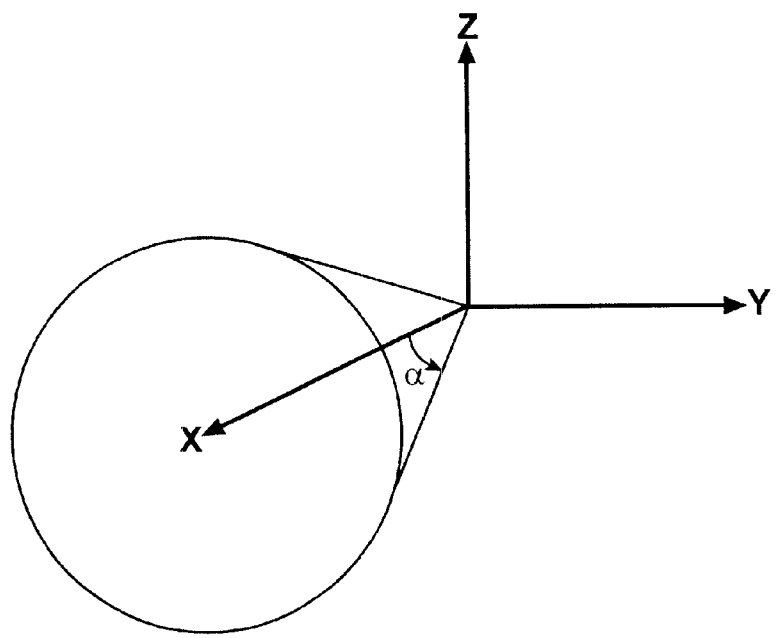
FIG. 5 is a graphic representation of a first step of a quadratic mathematical algorithm, represented as a cone, according to the present invention.

Referring to FIG. 5, the scan of a fan beam can be described with a quadratic mathematical expression, such as a cone having its center aligned with x-axis. Just as a plane can be represented by a vector normal to its surface, the cone can be represented by a cone vector pointing from its vertex to center of the cone. In this example, the cone is centered on the x-axis. A part of the cone surface corresponds to the beam of light created by a light source, such as a laser. The beam can be a planar or fan beam or any other beam having similar characteristics. The cone central angle $\alpha$ is defined as an angle formed by cone vector and cone surface. The cone can therefore be represented by a cone vector and $\alpha$, where cone vector r points to $$\begin{bmatrix} 1 \\ 0 \\ 0 \end{bmatrix}.$$

Figure 6:
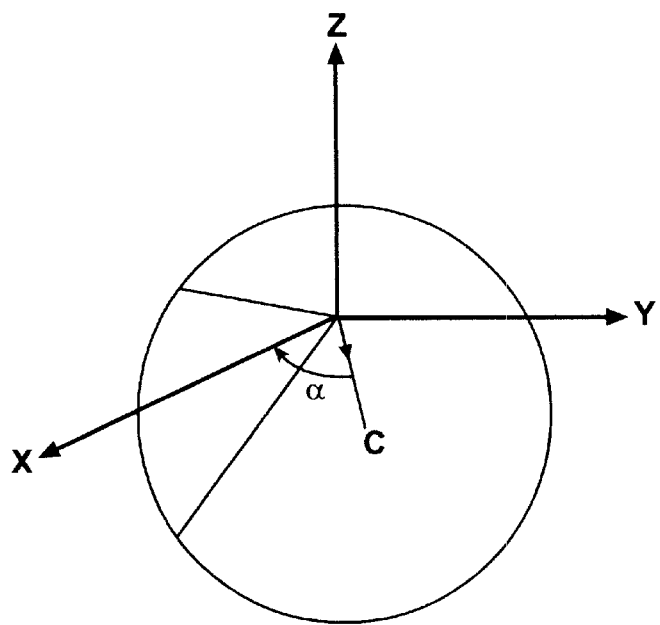
FIG. 6 is a graphic representation of a cone surface rotated about the z-axis.

Next, the cone is rotated by the angle $\alpha$ with respect to the z-axis so that the cone surface is tangential to x-axis. Note that the cone vector is pointing at an angle of $\alpha$ from x-axis, as shown in FIG. 6. The rotated cone can therefore be represented as follows:

$$\begin{bmatrix} \cos\alpha & -\sin\alpha & 0 \\ \sin\alpha & \cos\alpha & 0 \\ 0 & 0 & 1 \end{bmatrix} \begin{bmatrix} 1 \\ 0 \\ 0 \end{bmatrix} = \begin{bmatrix} \cos\alpha \\ \sin\alpha \\ 0 \end{bmatrix}$$

Figure 7:
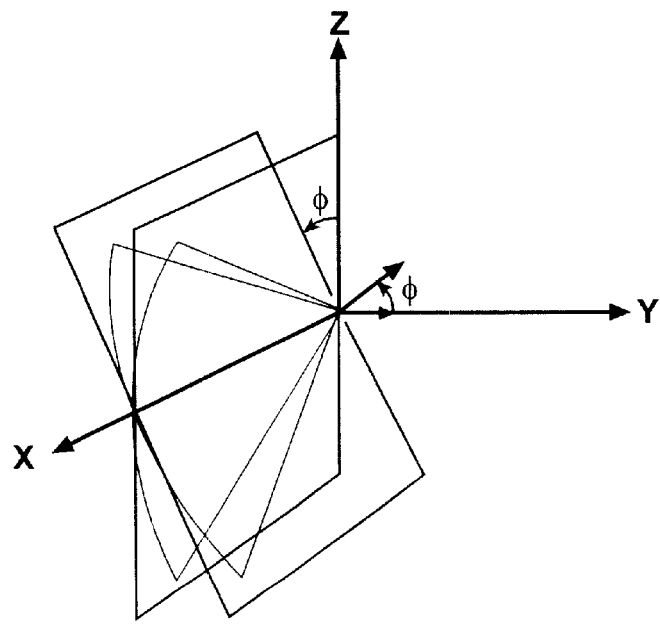
FIG. 7 is a graphic representation of the cone surface of FIG. 6 tilted about the x-axis.

Next, the vertical cone surface is rotated about the x-axis by an angle $\phi$ to conduct a slant angle rotation, as shown in FIG. 7. This new cone surface represents a planar beam, such as a fan beam, as transmitted from the head of the transmitter. $\phi$ is the physical slant angle described in the previous section. A positive $\phi$ is a right-handed rotation about the x-axis, as shown in FIG. 2.6. The equation for describing the cone after slant angle rotation is:

$$\begin{bmatrix} 1 & 0 & 0 \\ 0 & \cos\phi & -\sin\phi \\ 0 & \sin\phi & \cos\phi \end{bmatrix} \begin{bmatrix} \cos\alpha \\ \sin\alpha \\ 0 \end{bmatrix} = \begin{bmatrix} \cos\alpha \\ \cos\phi\sin\alpha \\ \sin\phi\sin\alpha \end{bmatrix}$$

Figures 1, 32:
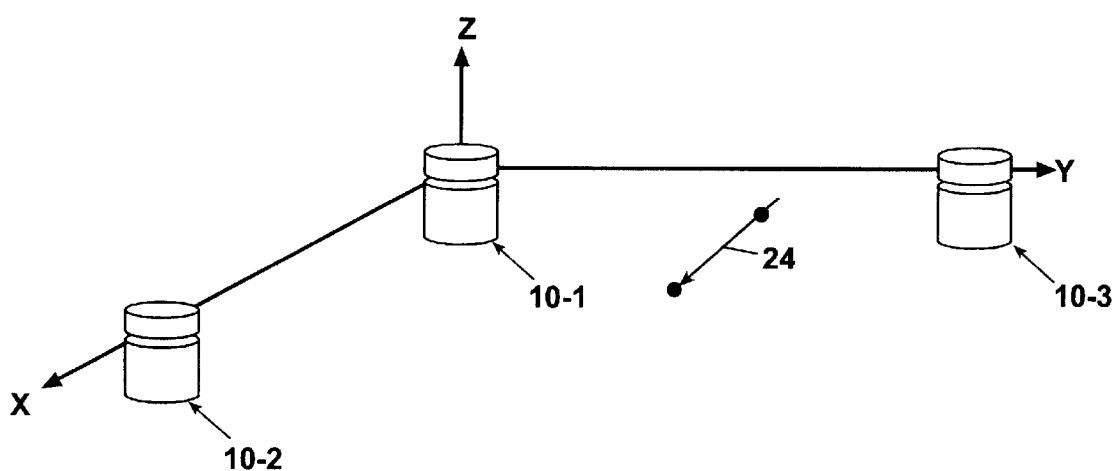
Figures 2, 32:
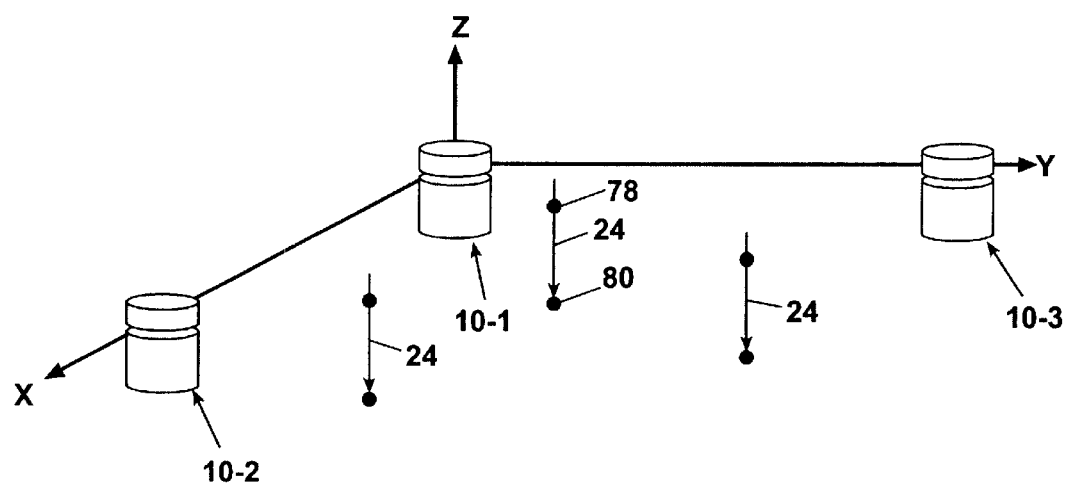
Figures 3, 32:
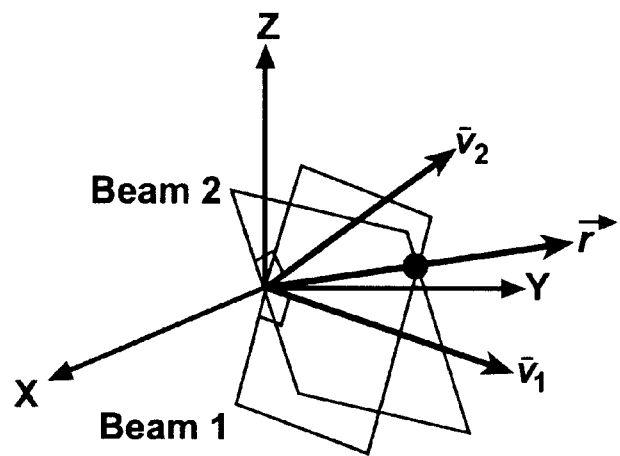
Figures 4, 32:
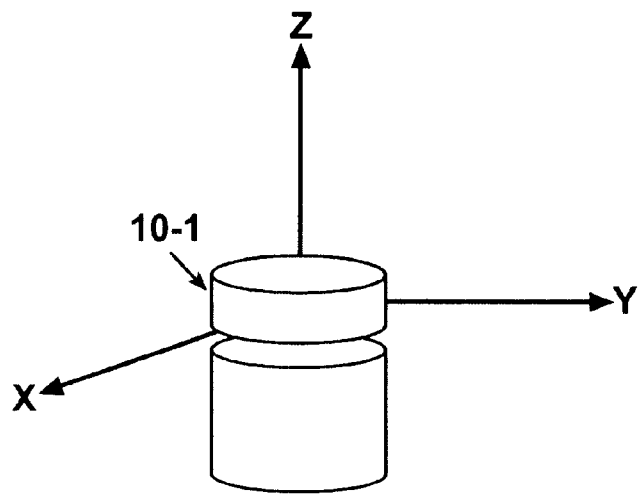
Figures 5, 32:
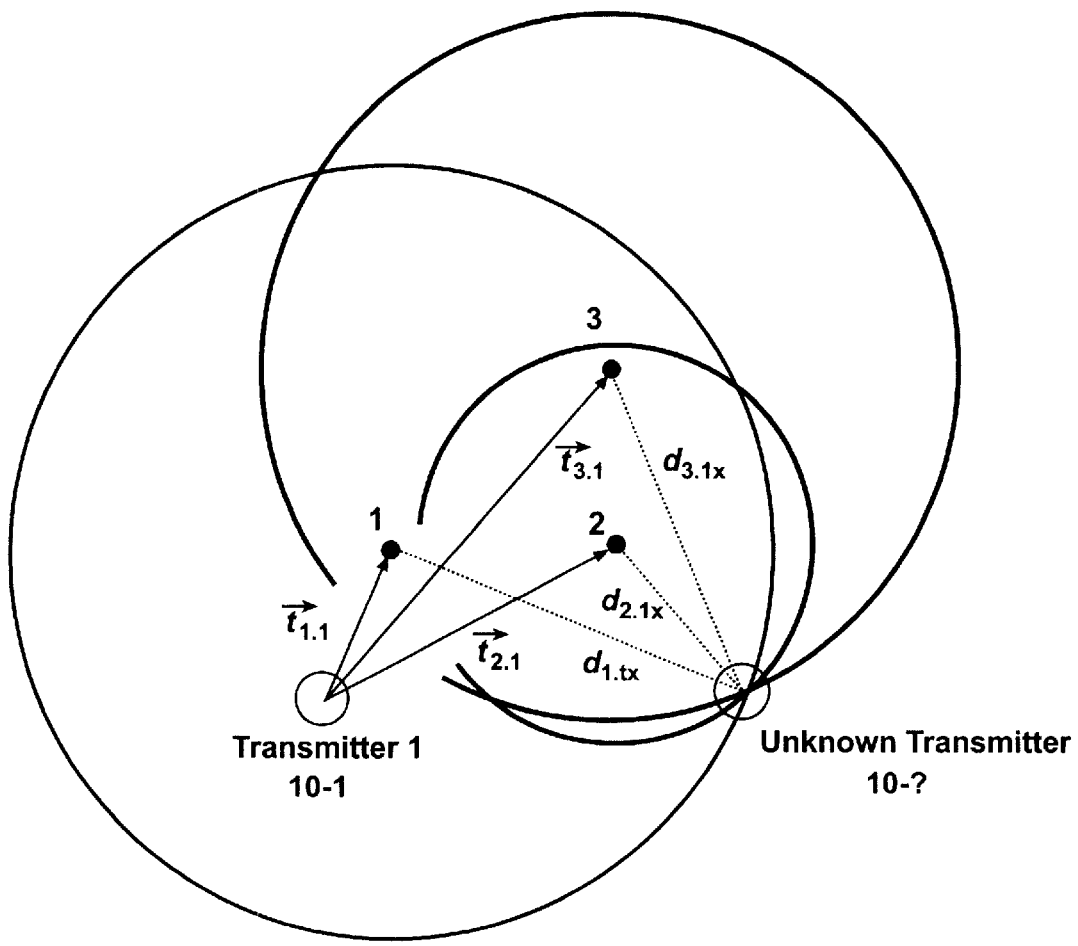
Figures 6, 32:
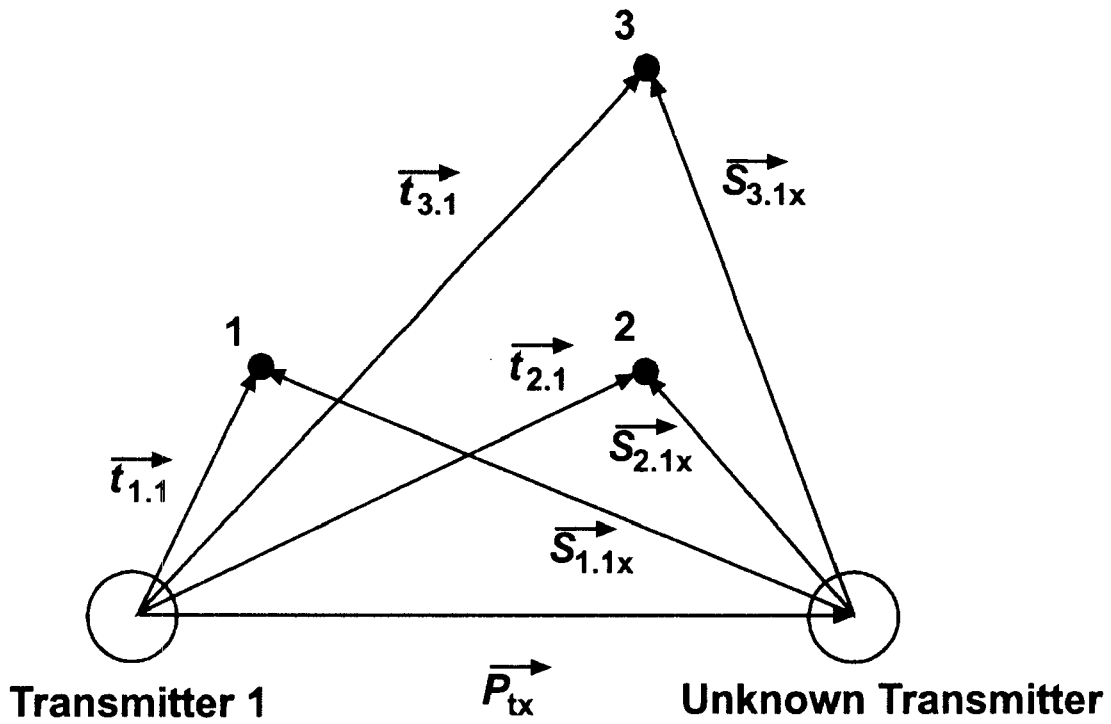
Figures 7, 32:
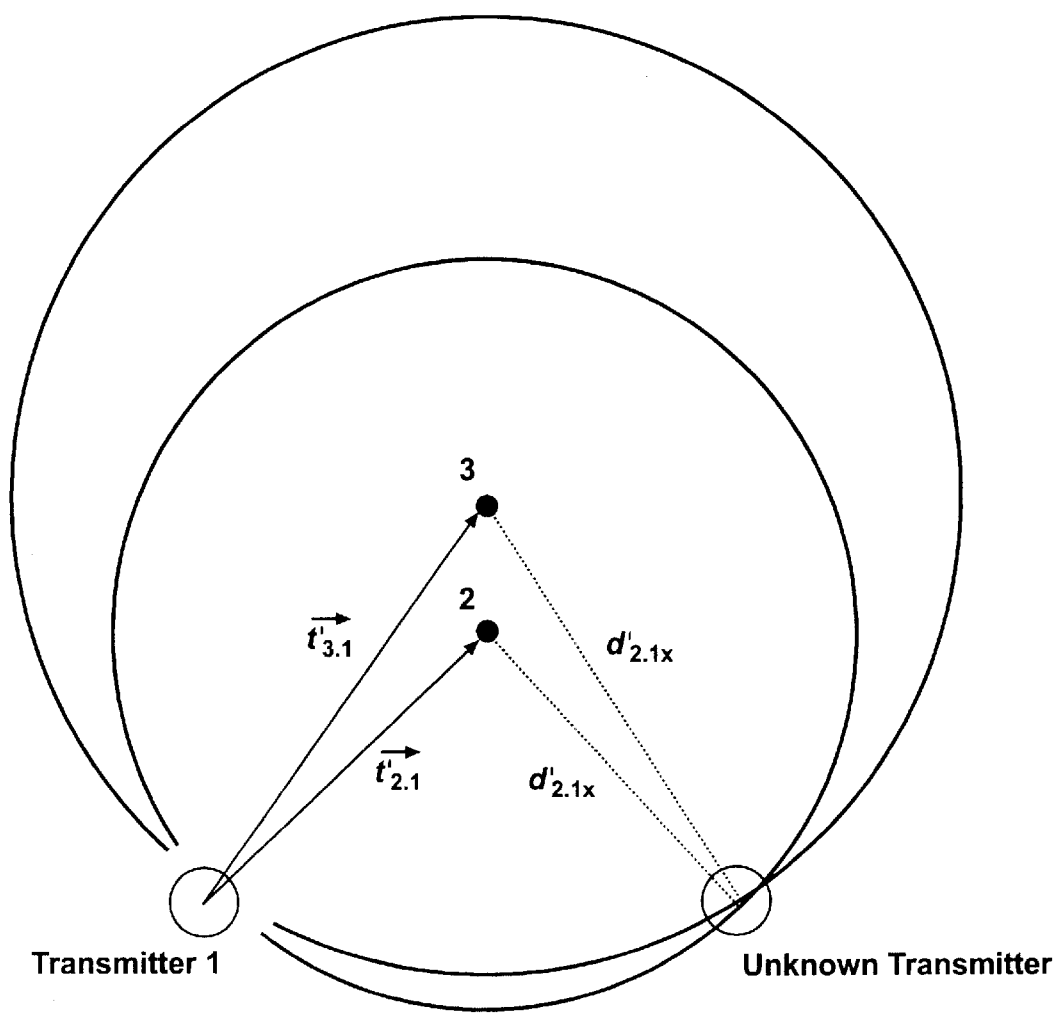
Figures 8, 32:
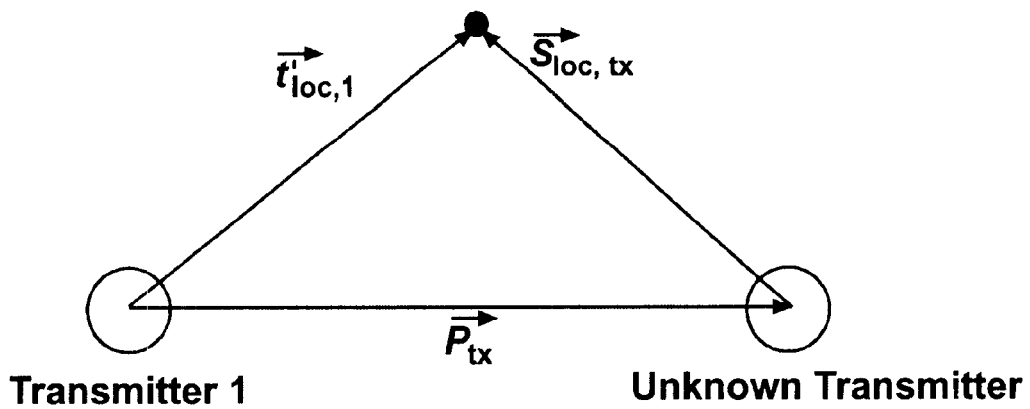

Lastly, the new cone surface is rotated about the z-axis by an angle $\theta$, as shown in FIG. 8. This angle is a function of time because it represents the location of the fan beam as the transmitter head rotates about the z-axis, i.e. $\phi(t)$ is the scan angle at time t. The resulting cone surface after z-axis rotation can be described as:

$$\begin{bmatrix} \cos\theta(t) & -\sin\theta(t) & 0 \\ \sin\theta(t) & \cos\theta(t) & 0 \\ 0 & 0 & 1 \end{bmatrix} \begin{bmatrix} \cos\alpha \\ \cos\phi\sin\alpha \\ \sin\phi\sin\alpha \end{bmatrix} = \begin{bmatrix} \cos\alpha\cos\theta(t) - \cos\phi\sin\alpha\sin\theta(t) \\ \cos\alpha\sin\theta(t) + \cos\phi\sin\alpha\cos\theta(t) \\ \sin\phi\sin\alpha \end{bmatrix}$$

Figures 9, 32:
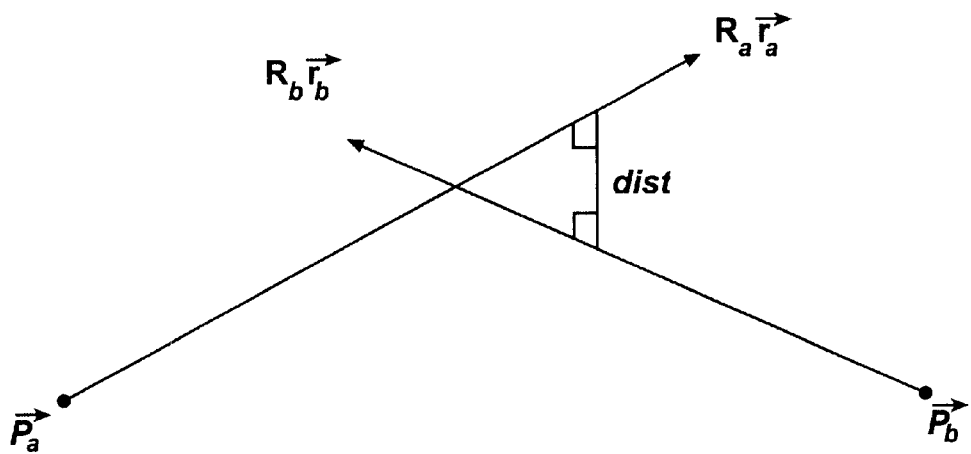
Figures 10, 32:
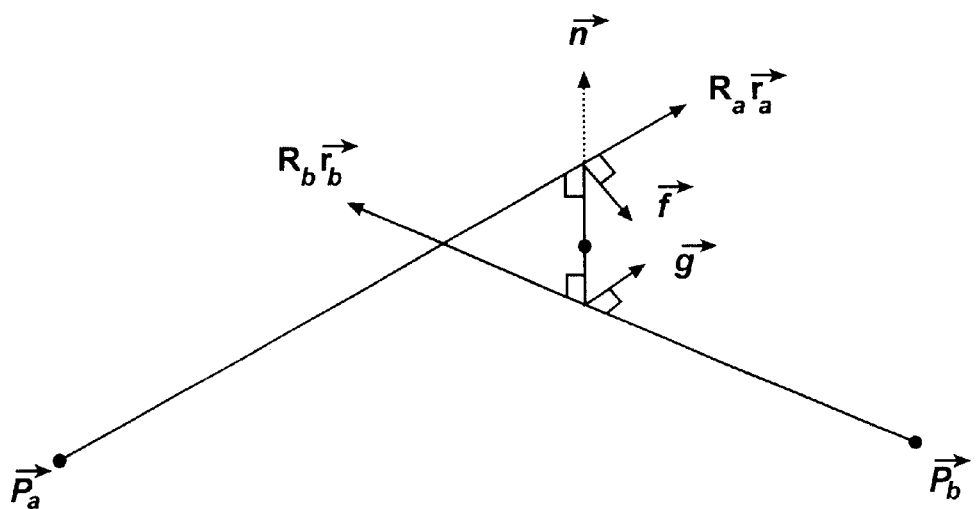
Figures 11, 32:
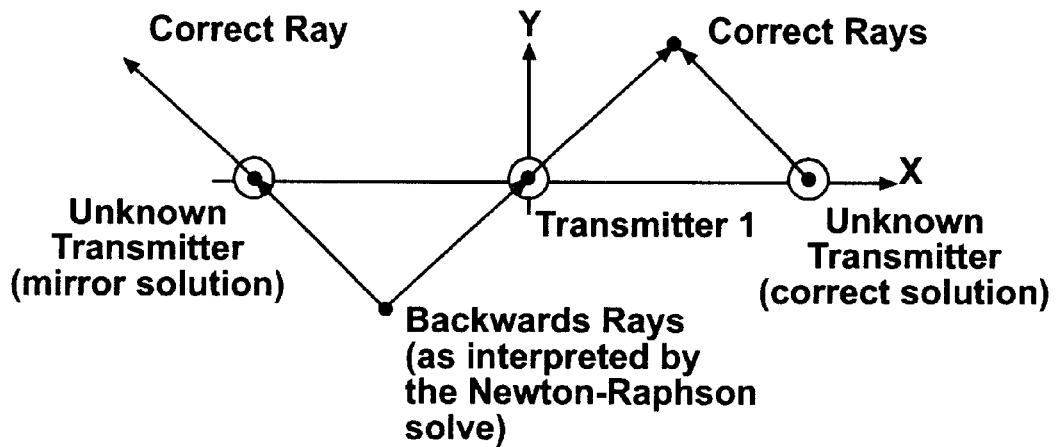
Figures 12, 32:
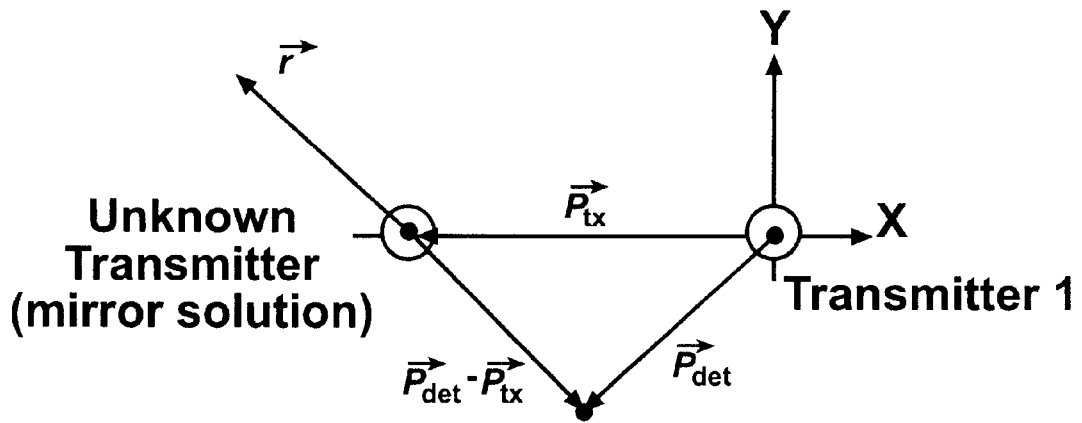

In a position calculation algorithm, the vector expression above represents the laser fan beam at the point in time when it intersects the detector as shown in FIG. 9. and will be referred to as $\hat{v}$:

$$\hat{v} \equiv \begin{bmatrix} \cos\alpha\cos\theta(t) - \cos\phi\sin\alpha\sin\theta(t) \\ \cos\alpha\sin\theta(t) + \cos\phi\sin\alpha\cos\theta(t) \\ \sin\phi\sin\alpha \end{bmatrix}$$

For each rotation of the transmitter head, the receiver system calculates two vectors, $\hat{v}_1$ and $\hat{v}_2$, that describe the location of the two fan beams at their intersection point with the detector. Because $\phi$ is constant and determined during factory calibration, each $\hat{v}$ vector depends solely on it corresponding scan angle $\theta$, which in turn depends on timing measurements made by the receiver system. The way the two scan angles $\theta$'s are calculated by the receiver system is described later in the specification.

D. Transmitter Calibration

Transmitter calibration can be conducted various ways. U.S. application Ser. No. 09/532,100 to Hedges et al., entitled "Low Cost Transmitter with Calibration Means for Use In Position Measurement Systems" describes one possible calibration process and the disclosure is incorporated by reference herein in its entirety. As noted above, the transmitter is characterized by five parameters for 3D position measurement.

More particularly, the tilt angle of beam 1 and beam 2 from the spin axis are denoted by $\phi 1$ and $\phi 2$, respectively. The cone central angle of beam 1 and beam 2 are denoted by $\alpha 1$ and $\alpha 2$, which specify the degree of curvature in each beam, and an azimuth angle difference of beam 1 and beam 2 is denoted by an offset value. The transmitter calibration generally involves extracting these five parameters.

The technique used for transmitter calibration is a resection commonly used in photogrammetry and surveying. In a resection technique, a fixed target position or orientation is computed based on the observation made at known positions. The accuracy of resection depends on the quality of observation and accuracy of known observation points.

In a transmitter calibration, the relative position of observation points are fixed but transmitter is turned on a precision turn table. At each turn table angle, an observation is made which corresponds to an observation at a known position in a conventional resection technique. Mounting the turn table and sensors on a rigid fixture ensures the relative position of sensors to the transmitter to the highest accuracy.

Figure 10:
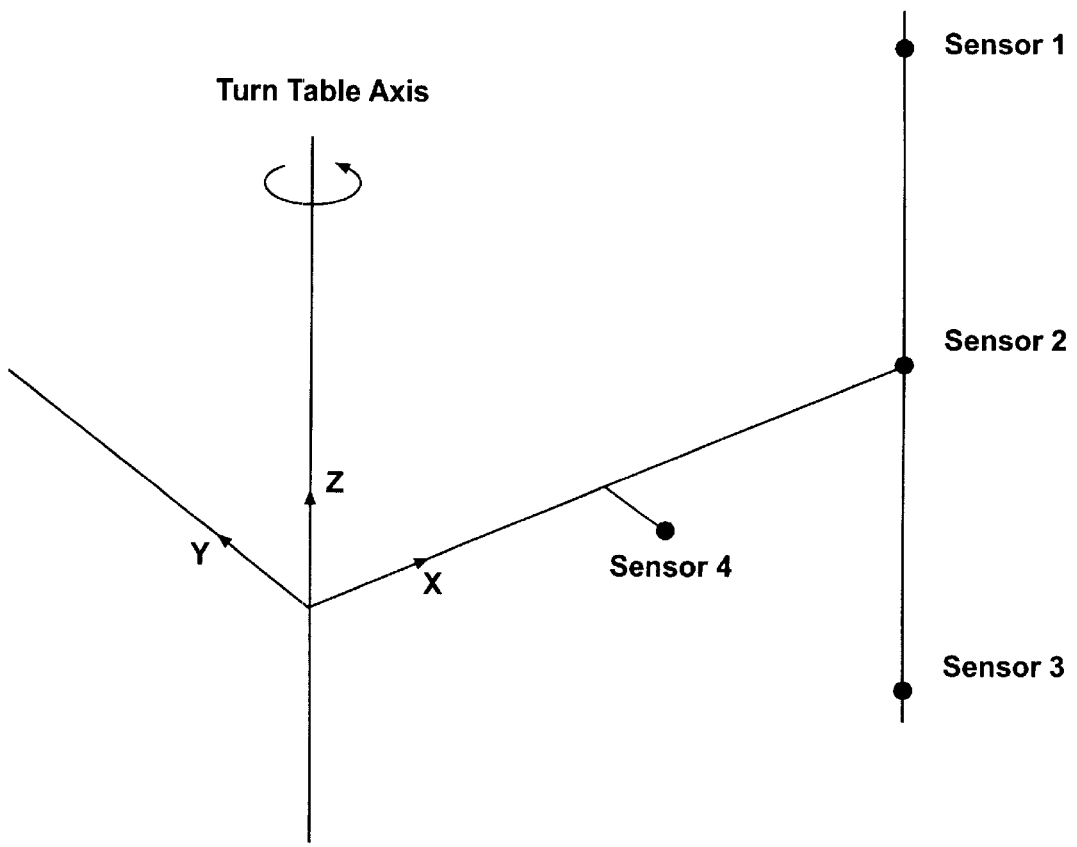
FIG. 10 is a diagram illustrating a transmitter calibration method.

In one embodiment of a transmitter calibration fixture there are three vertical sensors 1 to 3 and one mid sensor, labelled sensor 4, as shown in FIG. 10. The turntable turn axis is considered the Z-axis and the horizontal line from Z-axis and the horizontal line from Z-axis to sensor 2 is considered the X-axis. The Y-axis is determined based on the right hand rule, given the X and Z axes. The three vertical sensors help extract $\phi 1$, $\phi 2$, $\alpha 1$, and $\alpha 2$.

Sensor 4 establishes the horizontal plane in conjunction with sensor 2 and helps define a $\theta$ offset. Beam 1 and beam 2 strike times are measured at each turntable angle. The accuracy of calibration entirely depends on the quality of the beam strike time measurements and the tolerance of sensor locations in the coordinates.

Like a normal vector that represents the plane, a cone vector represents a cone and is defined as a unit vector from the vertex to the center of the cone. If a cone is positioned with its centerline aligned to x-axis, its cone vector can be represented as:

$$v_0 = \begin{bmatrix} 1 \\ 0 \\ 0 \end{bmatrix}$$

The rotation matrices with respect to z-axis and x-axis, respectively, can be defined as:

$$R_z(x) = \begin{bmatrix} \cos x & -\sin x & 0 \\ \sin x & \cos x & 0 \\ 0 & 0 & 1 \end{bmatrix}$$

$$R_x(x) = \begin{bmatrix} 1 & 0 & 0 \\ 0 & \cos x & -\sin x \\ 0 & \sin x & \cos x \end{bmatrix}$$

The cone vector, which is rotated by $\alpha$ about z-axis, tilted by $\phi$ about the x-axis and then rotated by $\theta$ about the z-axis is represented as:

$$R_z(\theta(t)) * R_x(\alpha) * v_0 = \begin{bmatrix} \cos\alpha\cos\theta(t) - \cos\phi\sin\alpha\sin\theta(t) \\ \cos\alpha\sin\theta(t) + \cos\phi\sin\alpha\cos\theta(t) \\ \sin\phi\sin\alpha \end{bmatrix}$$

Then, the beam 1 cone vector is represented as:

$$v_1 = R_z(\theta_1(t)) * R_x(\phi_1) * R_z(\alpha_1) * v_0$$

and the beam 2 cone vector is represented as:

$$v_2 = R_z(\theta_2(t) - \theta_{offset}) * R_x(\phi_2) * R_z(\alpha_2) * v_0$$

The transmitter rotation matrix can be represented as:

$$R_{tx} = R_z(Az_{turn}) * R_x(rx) * R_y(ry) * R_z(rz - Az_{turn})$$

where Rx, Ry and Rz are rotation angles with respect to the x, y and z-axis, respectively, and $Az_{turn}$ is a turn table angle.

Using this transmitter rotation matrix, the transmitter position can be represented as:

$$P_{tx} = R_z(Az_{turn}) * \begin{bmatrix} px \\ py \\ pz \end{bmatrix}$$

where Px, Py and Pz are transmitter positions at $Az_{turn} = 0$. The unit position vector from the transmitter to the detector position can be represented as $$p = \frac{P_{Det} - P_{tx}}{|P_{Det} - P_{tx}|}$$

A unit position vector p that is on the cone 1 surface and also on the cone 2 surface will satisfy the following equations:

$$(R_{tx} * v_1) \cdot p = \cos \alpha_1$$

$$(R_{tx} * v_2) \cdot p = \cos \alpha_2$$

The two equations above serve as the calibration model. The measurements are $\theta$ values taken at each sensor and at each turntable azimuth angle. The transmitter position and orientation and transmitter parameters are adjusted so that the model fits the measurements in a least square error. When this iteration results in an acceptable error, the transmitter parameters $\phi_1$, $\phi_2$, $\alpha_1$, and $\theta_{offset}$ are extracted.

The cone math calibration method described above has several advantages, including the fact that he detector position can be accurately surveyed with the latest angle measure systems before the calibration process. Further, initial transmitter alignment on the calibration fixture is not required. Also, regardless of the transmitter position and orientation on the turntable, the procedure described above can produce true transmitter parameters.

Note that although the above examples assume that the quadratic mathematical algorithm describes a circular cone shape, the algorithm can describe an elliptic, parabolic, or hyperbolic cone shape without departing from the scope of the invention.

5. Position Calculation

There are two possible methods we can use to calculate the position of a light detector on the receiver (24) or receiving instrument of the present invention: the theodolite network method and the preferred non-theodolite transmitter method. In the receiving instrument of the present invention, the non-theodolite method is used because it is faster and more suited to the transmitter's unique design.

In one embodiment, the receiver calculates the intersection between the measured azimuth-elevation vectors from each transmitter to the desired detector. To establish these vectors, FIG. 9A, which shows a single laser fan plane, can be modified to include two fan planes as shown in FIG. 9B.

The beam 1 cone surface is represented by the cone vector $v_1$ and the beam 2 cone surface by cone vector $v_2$. Because the two cones represented by cone vectors v1 and v2 originate from the same vertex, the intersection of the two cone surfaces will be a line and its direction can be represented by a unit vector r. The unit vector r lies on both the beam 1 cone and beam 2 cone, satisfying the following equation.

$$v_1 r = \cos \alpha_1$$

$$v_2 r = \cos \alpha_2$$

To find r, r is solved given $v_1$, $v_2$, $\alpha_1$, and $\alpha_2$. More particularly, if there exists such a vector $q_0$ $$v_1 q_0 = \cos\alpha_1$$

$$v_2 q_0 = \cos\alpha_2$$

with $$q_0 = \begin{bmatrix} q_x \\ q_y \\ 0 \end{bmatrix}$$

then $q_0$ is on the ray determined by two planes:

$$v_1 \begin{bmatrix} x \\ y \\ z \end{bmatrix} = \cos\alpha$$

$$v_2 \begin{bmatrix} x \\ y \\ z \end{bmatrix} = \cos\alpha_2$$

which obtains $$v_1(p - q_0) = 0$$

$$v_2(p - q_0) = 0$$

The direction of vector, p–q0 is given by the cross-product of r1 and r2. Therefore, $$r - q_0 = k(v_1 x v_2)$$

where k is a scalar constant such that $$|r| = |q_0 + k(v_1 x v_2)| = 1$$

Thus r is solved by $$r = q_0 + k(v_1 x v_2)$$

While $\vec{r}$ passes through the detector, there is no information about the length of $\vec{r}$ from the vectors $\hat{v}_1$ and $\hat{v}_2$. Therefore, the system can only calculate the azimuth and elevation of vector $\vec{r}$ relative to the transmitter's reference frame as shown below.

$$az = \tan^{-1}\left(\frac{y_r}{x_r}\right)$$

$$el = \tan^{-1}\left(\frac{z_r}{\sqrt{x_r^2 + y_r^2}}\right)$$

where $r_x$ $r_y$ and $r_z$ are components of vector $\vec{r}$. Calculating the $\vec{r}$ vectors for all transmitters in the workspace and the intersections of the vectors will be described in greater detail below in the Solution Calculation section.

6. Calculating the Scan Angles Using Timing Measurements in a Non-Theodolite Process As previously discussed, the two $\hat{v}$ vectors from each transmitter (10) are based on the corresponding scan angles, $\theta_1(t)$ and $\theta_2(t)$, for the two laser fan beams (14 & 16) of the transmitter (10). We now discuss how the receiver system (24) calculates these two scan angles. Specifically, to calculate position for a single light detector on the receiver system (24), we need $\theta_1(t)$ and $\theta_2(t)$ for each transmitter (10) in the three-dimensional workspace (30).

A typical receiver system (24), to be described hereinafter with reference to FIG. 21, includes a physical tool or wand on which are a measurement tip and photodiode detector circuitry, a Position Calculation Engine (PCE), and a user interface. As the user moves the tool around in the workspace (30), the photodiode detector circuitry receives electrical pulses or strikes every time one of the planes of light or one of the optical synchronization strobes illuminates a light detector on the receiver (24). Using a high-speed timer, which preferably is built into the PCE, the system makes differential timing measurements between pulses. These timing measurements are then used calculate the scan angles.

Figure 13:
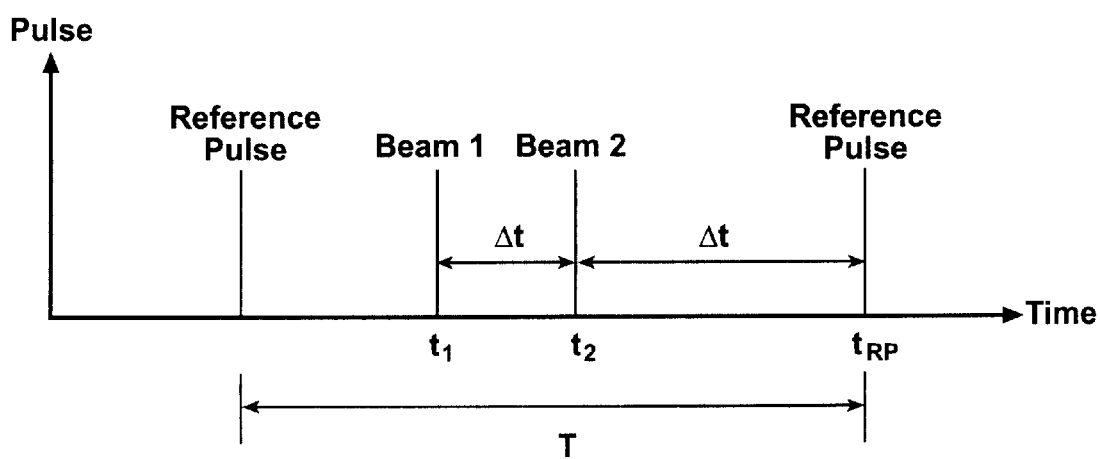
FIG. 13 is a linear time plot of a typical pulse sequence for pulses from an optical transmitter according to the present invention.

FIG. 13 illustrates a typical pulse sequence for a single rotation of the transmitter head (7). The time between reference pulses, as indicated by T, is the period of one transmitter head revolution. In FIG. 13, the reference pulse is preferably created by the optical strobe assembly (6, FIG. 3). Between each pair of reference pulses, the receiver system (24) makes two differential timing measurements, $\Delta t_1$ and $\Delta t_2$, for each rotation of the transmitter head (7). These timing measurements correspond to the times at which the light detector of the receiver system (24) detects each of the two fan beams from a transmitter (10).

Figure 14:
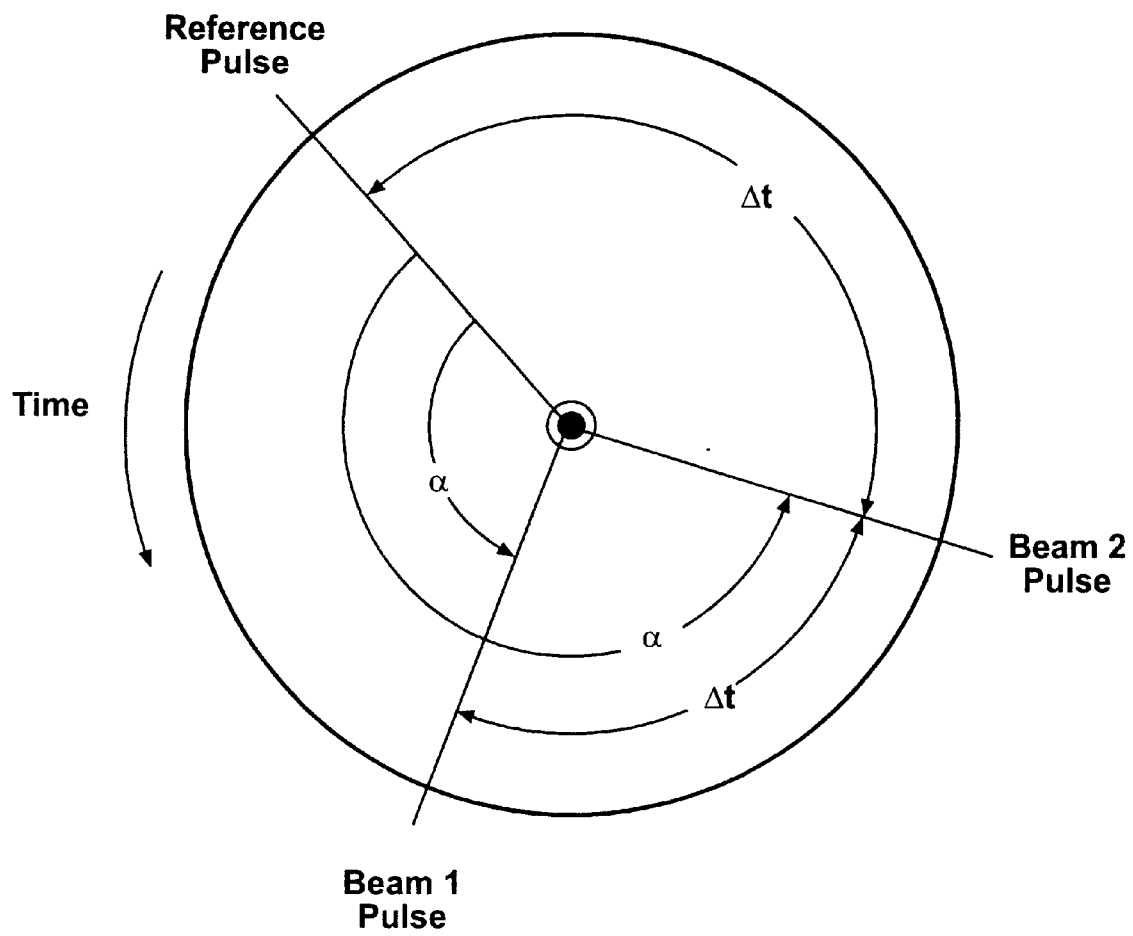
FIG. 14 is a time plot of the pulse sequence during a single rotation of an optical transmitter according to the present invention.
Figure 15:
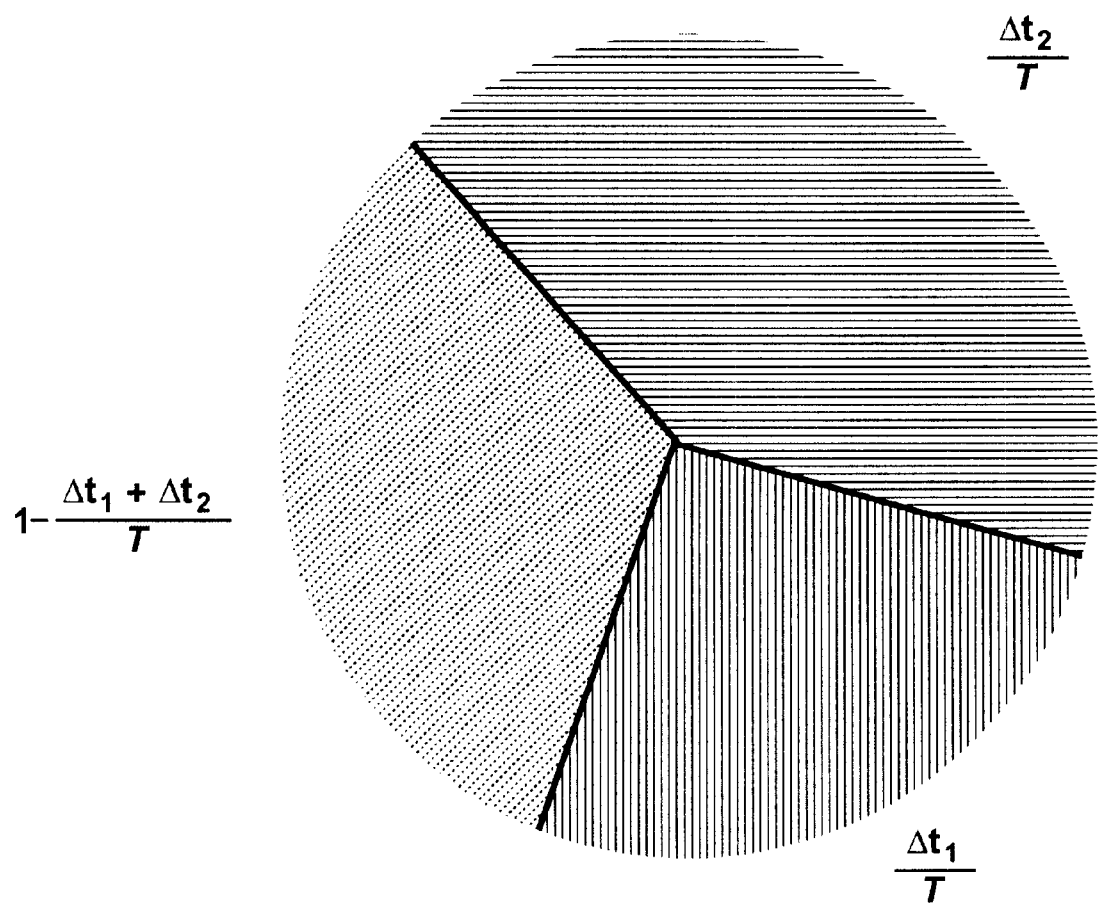
FIG. 15 is a graphical depiction of the pulses emitted during a single rotation of an optical transmitter according to the present invention.

FIG. 14 relates these time differences to angular differences. We take the above plot in time and view it as a circle of $2\pi$ radians representing one revolution of the transmitter head (7). We define two angular measurements, $\alpha_1$ and $\alpha_2$, as the angle between the optical reference signal detection pulse and the fan beam 1 and fan beam 2 detection pulses, respectively. The reader should not confuse this circle with the actual transmitter head. This circle shows a plot in time and angle as viewed by the light detector on the receiver (24). Using the measured time intervals $\Delta t_1$ and $\Delta t_2$ and the fact that the transmitter completes one revolution in T seconds, we can calculate $\alpha_1$ and $\alpha_2$ by splitting the circle into percentages, as shown in FIG. 15.

Using these percentages and the fact that there are $2\pi$ radians in a single head revolution, we get the following equations for $\alpha_1$ and $\alpha_2$:

$$\alpha_1 = 2\pi\left(1 - \frac{\Delta t_1 + \Delta t_2}{T}\right)$$

$$\alpha_1 = 2\pi\left(1 - \frac{\Delta t_1 + \Delta t_2}{T} + \frac{\Delta t_1}{T}\right) = 2\pi\left(1 - \frac{\Delta t_2}{T}\right)$$

Note that the reason the time intervals are measured from beam 1 rather than the reference pulse is to provide backward compatibility in the receiver system software for other versions of a transmitter, however this could be changed as desired.

For two important reasons, $\alpha_1$ and $\alpha_2$ are not exactly equivalent to the $\theta_{Off}$ angles described in the transmitter model. First, in the model the two beams are not separated in azimuth. Rather, they scan together while overlapped as illustrated in FIG. 9B. In the actual transmitter, we separate the two beams azimuthally on the head to so that the receiver system can differentiate between them. We define this angular separation $\theta_{Off}$ as described herein above. Therefore, we must subtract $\theta_0$ from $\alpha_2$ to line $\alpha_2$ up with $\alpha_1$. $\theta_0$ is determined through factory calibration and is part of the calibration data stored in memory (2: FIG. 3).

Figure 16:
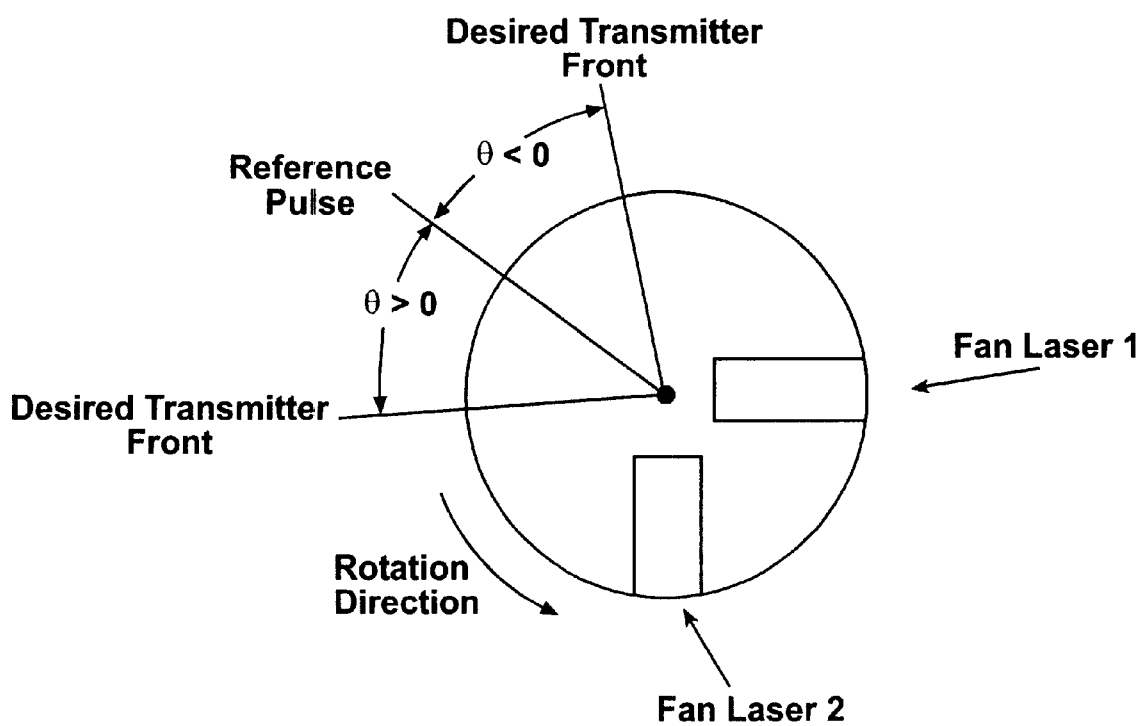
FIG. 16 is a plan view of the improved transmitter according to the present invention illustrating the preferred positioning of the transmitter front and the zero-azimuth plane of the improved transmitter.

Second, the $\alpha_1$ and $\alpha_2$ angles are measured relative to the reference pulse as shown in FIG. 14. If we relate this measurement to the transmitter model, then the front of the transmitter—its local x-axis—is the point in the head's rotation when the reference pulse fires. Therefore, the reference pulse also defines the zero-azimuth plane, since azimuth is measured from the transmitter's x-axis. If a single transmitter is to be used for azimuth and elevation calculations, it is sometimes desirable to set the point on the transmitter (10) where the detector's azimuth will be zero. This set point is established with a factory-calibrated constant called $\theta_{RP}$. As shown in FIG. 16, $\theta_{RP}$ is the angular separation between the desired front of the transmitter and the occurrence of the reference pulse. The sign of $\theta_{RP}$ is determined as illustrated. For most transmitters, $\theta_{RP}$ is set to zero because azimuth-elevation measurements relative to a single transmitter are not required. Therefore, we convert $\alpha_1$ and $\alpha_2$ to the desired the scan angles, $\theta_1$ and $\theta_2$, by using the following equations:

$$\theta_1 = \alpha_1 + \theta_{RP}$$

$$\theta_1 = 2\pi\left(1 - \frac{\Delta t_1 + \Delta t_2}{T}\right) + \theta_{RP}$$

$$\theta_2 = \alpha_2 + \theta_{RP} - \theta_{Off}$$

$$\theta_2 = 2\pi\left(1 - \frac{\Delta t_2}{T}\right) + \theta_{RP} - \theta_{Off}$$

To summarize, these equations are used to calculate $\theta_1$ and $\theta_2$ values for each transmitter that illuminates a light detector on the receiving instrument (24). Therefore, if there are two transmitters (10) set up in the workspace (30), four $\theta$ angles will be calculated for each detector, and hence four $\hat{v}$ vectors will be calculated. Three transmitters would result in six $\hat{v}$ vectors, and so on. Using all of the calculated $\hat{v}$ vectors, the receiver system (24) then performs the matrix solve described above for each light detector on the receiving instrument (24). If more than one light detector is present on the receiving instrument (24) and spaced from the other light detectors on the instrument (24), more accurate position information can be obtained by individually and separately calculating the position of each light detector on the instrument (24) and using those results to define the position of a particular point, e.g., the wand tip, of the receiving instrument.

7. Receiving Instrument

Figure 17A:
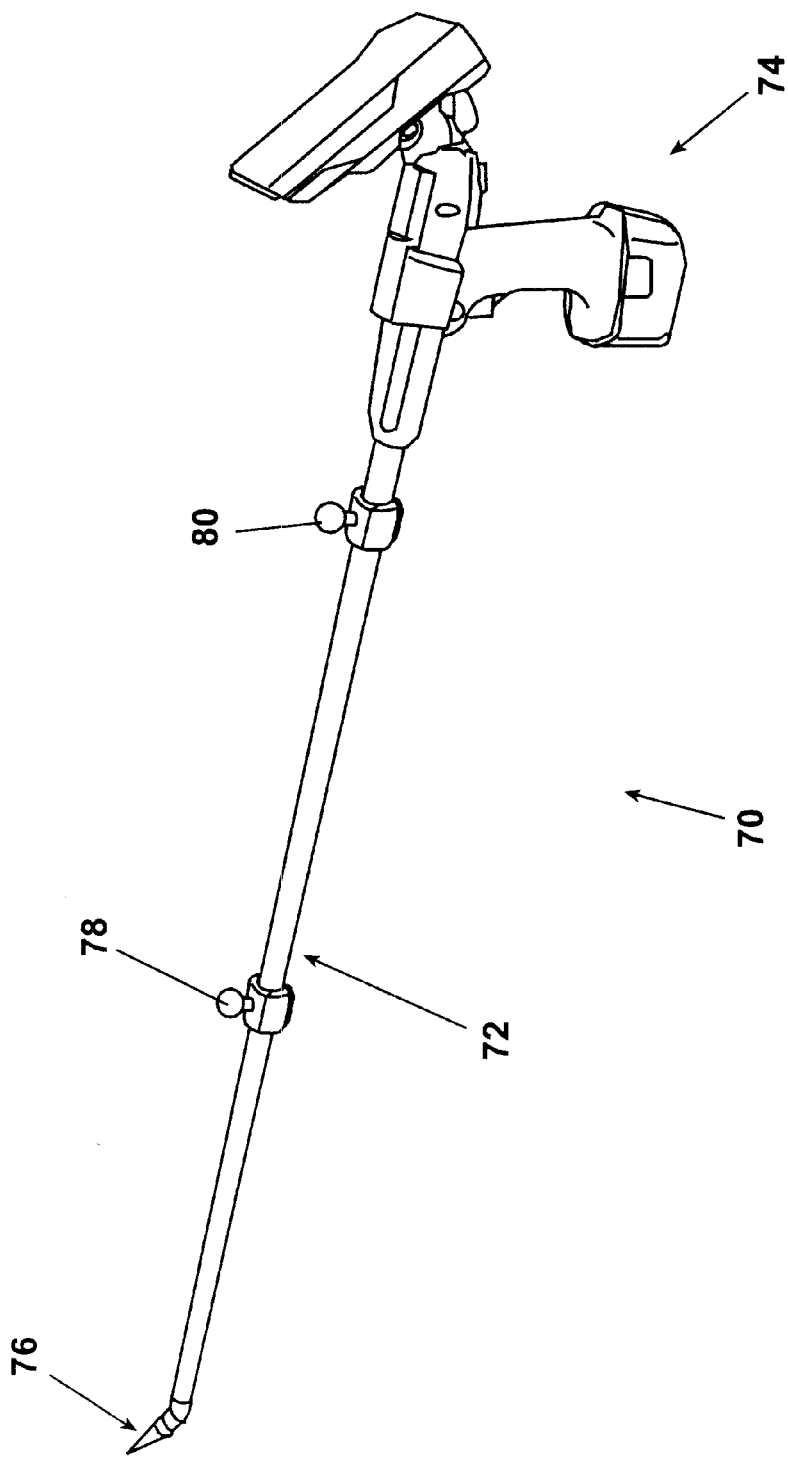
FIG. 17A is an illustration of a receiving instrument for a position measuring system according to the present invention.

In the spatial position measurement system shown in FIG. 12, the receiver system (24), which includes the data gathering apparatus, may comprise the portable wand-shaped receiving instrument (70) shown in FIG. 17A. Receiver (70) includes a rod or wand-shaped section (72) and a handle section (74). Rod section (72) terminates in a sensor point (76) which is utilized to touch or contact a position within the measurement field for which x-y-z data is to be generated.

Figure 17B:
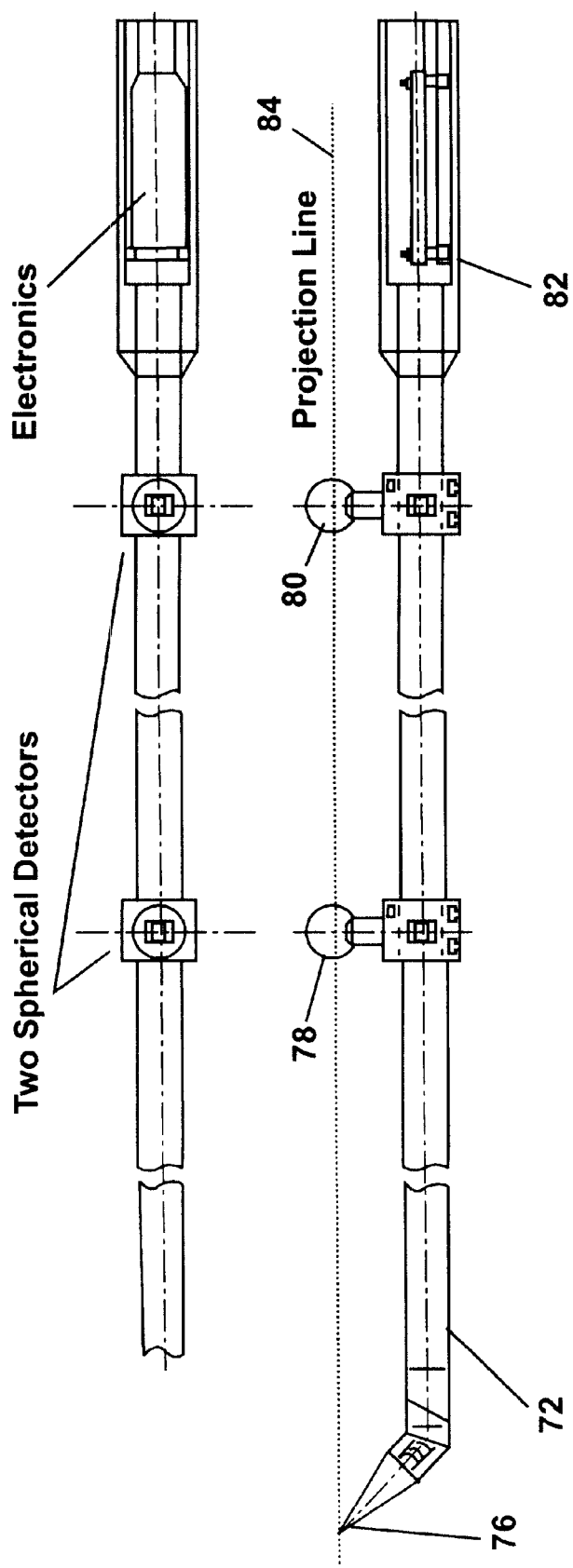
FIG. 17B is an detailed illustration of the detector and tip assembly of the receiving instrument of FIG. 17A according to the present invention.

Referring now to FIG. 17B as well, the rod section (72) includes two spherically shaped, spaced apart optical or light detectors (78 & 80) and an electronics section (82). The proper alignment and positioning of the sensor point (76) with the detectors (78 & 80) can be mathematically expressed as:

$$\vec{P}_{TIP} = d_{TIP}\frac{\vec{P}_{DET2} - \vec{P}_{DET1}}{\|\vec{P}_{DET2} - \vec{P}_{DET1}\|} + \vec{P}_{DET2}$$

where:

$\vec{P}_{TIP}$=is the position of the tip 76

$\vec{P}_{DET2}$=is the position of the detector 80 closest to the wand handle 82

$\vec{P}_{DET2}$=is the position of the detector 78 closest to the tip 76

$d_{Tip}$=is the distance 72 from detector-2 78 to the tip 76.

Proper alignment and spacing of the detectors (78 & 80) relative to the sensor tip (76) along projection line (84) as shown in FIG. 17B is an important aspect of the present invention as it permits a user to take accurate measurements within a workspace or measurement field without having the receiving instrument (24), i.e., wand (70), positioned exactly perpendicular to a transmitter reference plane (See FIG. 12) or any particular user reference plane. In fact, utilizing a wand tip (76) designed as described, permits a user to position the receiver/detector tip (76) and receiver/detector rod section (72) without concern for any particular alignment.

Figure 17C:
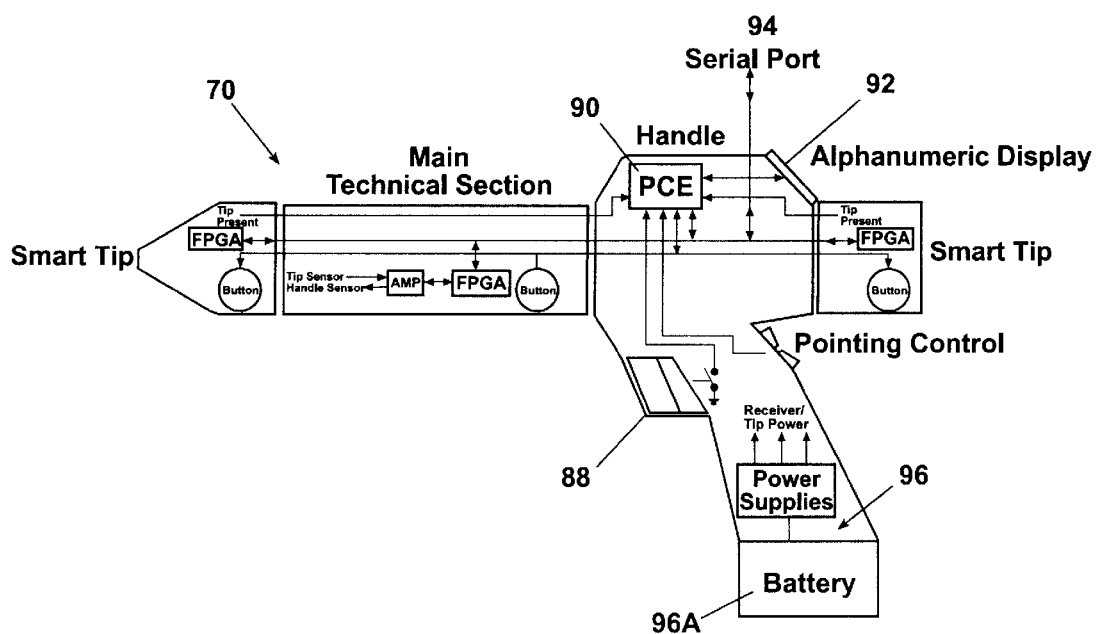
FIG. 17C is a block diagram of some of the important elements of the receiving instrument according to the present invention.

Referring now to FIG. 17C, the hand grip section (74) of portable receiver (70) of FIG. 17A will now be described. Receiver handle section (74) includes a trigger switch (88) to activate the receiver (70) to initiate x-y-z data generation in response to illumination of detectors (78 & 80) by two or more transmitters (10). This x-y-z position data may be generated when electric signals emanating from detectors (78 & 80) activate or are inputted to an internal programmed computer (90), i.e. the Position Calculation Engine (PCE). The PCE (90) is schematically diagrammed for reference in FIGS. 20 and 21.

The x-y-z position data corresponding to the position of the sensor point tip (76) is calculated by the PCE (90) when the trigger (88) is activated. This position data may be displayed in a display panel (92) and/or transferred to another data processor, not shown, via output data port (94), as will be understood by those skilled in the data processing arts.

The output data port (94) is a serial port and may be an optical or wired port. Preferably, the port (94) is an optical port and can be used to receive the calibration data stored in each transmitter (10) via the optical serial port (301; FIG. 3) or wired serial port (302; FIG. 3) of each transmitter (10).

The hand grip portion (74) of the receiving instrument (70) also preferably includes the power supply (96) for the instrument (70). The power supply (96) preferably includes a rechargeable battery pack (96A) that feeds power to the instrument (70), including the PCE (90), communication port (94) and display device (92).

8. Pulse Tracking

This section describes how the receiving instrument (24, 70) tracks its location as it is moved through the workspace (30). What is described explains, amongst other things, how the wand (24) uses the received laser beam strikes and strobe pulses from each transmitter (10) to determine its location.

D. Summary

Figure 20:
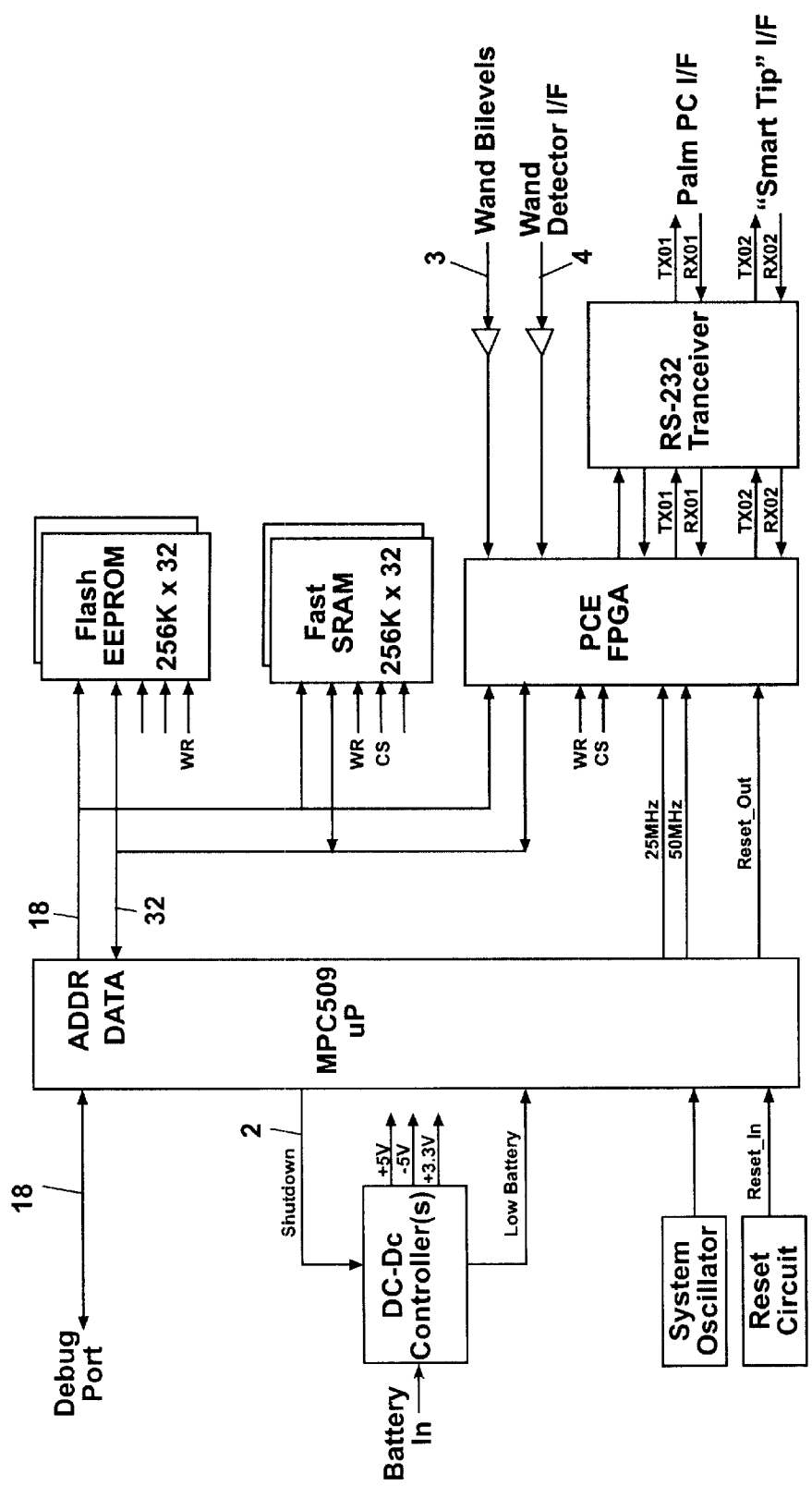
FIG. 20 is a block diagram of the Position Calculation Engine (PCE) of the receiving instrument according to the present invention.
Figure 21:
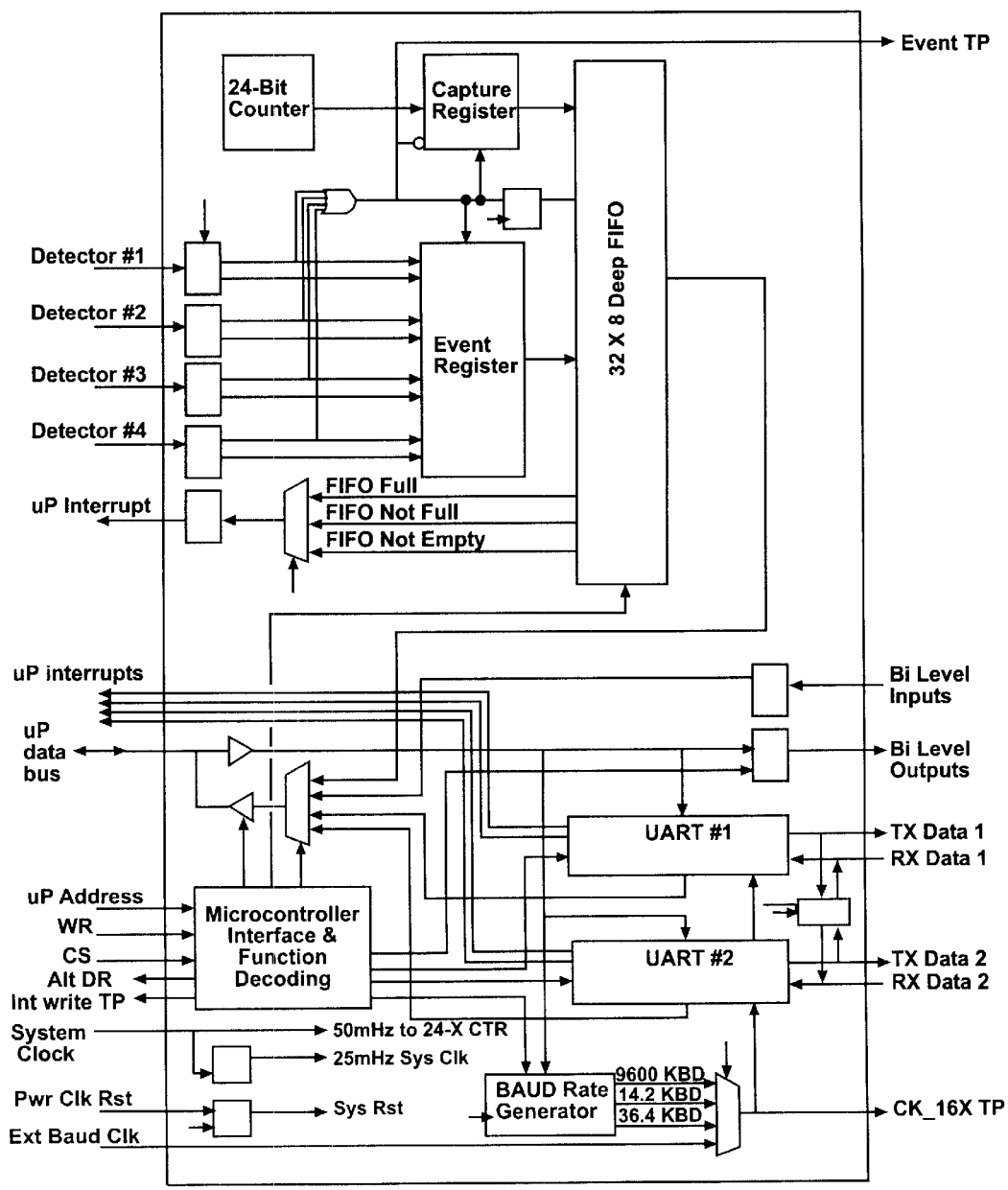
FIG. 21 is a block diagram of the field programmable gate array (FPGA) on the PCE of FIG. 20.

The PCE (position calculation engine) (90), as shown schematically in FIGS. 20 and 21, contains firmware which translates incoming pulse times into physical position in space. This code is partitioned into several major blocks, or tasks. One of the tasks performs the job of categorizing and associating these pulse times upon their arrival. This process is known as tracking. The following flowcharts and text describe the operation of the tracker. There is a separate tracker or tracking function for each physical light detector on the receiving instrument (70).

E. Background

As described above, from the perspective of any one fixed location in the workspace, each transmitter in the system emits a periodic stream of light pulses. Within one period, three pulses are emitted from each transmitter. Each transmitter maintains a unique and stable period, or rate of emission. This allows the firmware in the PCE to discriminate between transmitters.

F. Tracking

The tracking algorithm maintains an individual pulse tracker for each emitter, e.g., laser light source, on each transmitter. When a pulse is received by the firmware, its timing characteristic is compared with each of the pulse trackers in the system in an attempt to associate it with a known pulse train. There are two distinct phases to the tracking process; synchronization and tracking. During the sync phase, an attempt is made at pairing unknown pulses, within the preset parameters of the existing pulse trackers. Once this is accomplished, the tracking mode is entered, whereby successive pulses are associated with their assigned pulse trackers. If a sequence of assignment failures occurs, tracking mode is exited, and re-synchronization is attempted.

Once synchronization is achieved, a post-sync check is performed to ensure that the pulses have been identified in the correct order. If an inconsistency is found, the pulse trackers are swapped. This helps to avoid unnecessary re-synchronization cycles.

Under some conditions, environmental interference such as noise and multipath reflections are experienced. A noise pulse is defined as a pulse which cannot be correlated with the period of an existing pulse tracker. Multipath occurs when reflected and/or unexpected pulses are detected at the period of a transmitter.

Figure 18:
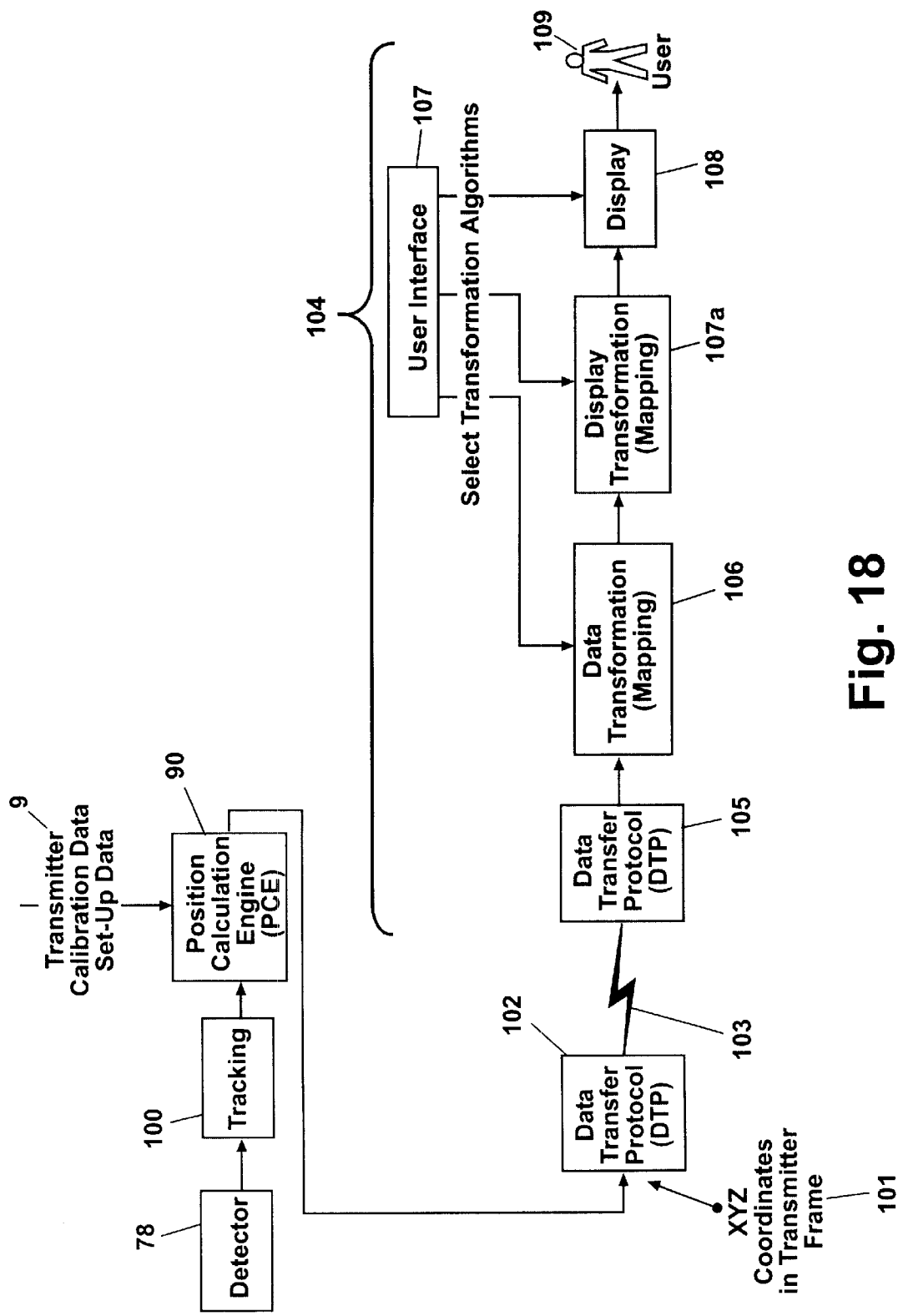
FIG. 18 shows the data flow of the position measurement receiver according to the present invention.

FIG. 18 provides a diagram of the data flow accomplished in the tracking function. The flow represented in FIG. 18 from the detector (78) to the PCE (90) will be duplicated for each light detector on the instrument (70). As shown in FIG. 18, the detector (e.g., 78) outputs signals indicative of detection of an optical pulse to a tracking system (100), which will be described in more detail below. The tracking system (100) outputs data to the PCE (90). The PCE (90) also has received the calibration data (9) from all the transmitters in the system.

Using the output of the tracking system (100) and the calibration data (9), the PCE (90) generates the x,y,z position (101) of the detector (78) in the transmitter's reference frame using the mathematical model described in detail above. This information is then transmitted using a data transfer protocol (102) over a communications link (103) to a user interface system (104).

The user interface system (104) may either be mounted on the receiving instrument (70) or may be a separate system in communication with the instrument (70) via communications link (103). Within the user interface system (104), the data (101) is received (105). The data (101) is then mapped from the transmitter reference frame in which it was created into the user's reference frame (106). A user interface (107) is also part of the system (104) and allows the user to define the user's reference frame and the consequent mapping function performed in block (106). The data is then mapped for display (107) on a display device (108). The display device (108) and display mapping block (107) are also under control of the user (109) through the user interface (107). Consequently, the user can have the mapping block (107) map the data into the most useful format. For example, the data may be mapped by block (107) into a numeric display of x, y and z values in the user reference frame for display on the display device (108). Alternatively, the data may be mapped by block (107) into a dot on a map displayed on the display (108) that indicates the current position of the detector (78). Any mapping of the data that is most useful to the user (109) can be effected by block (107) prior to display (108).

Figure 19:
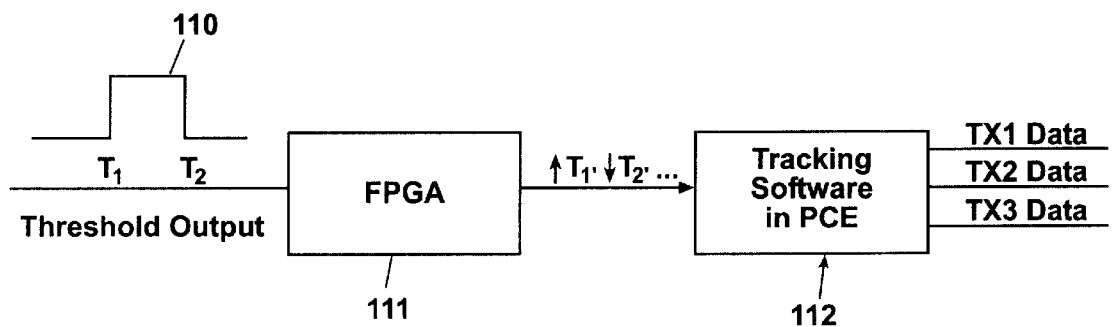
FIG. 19 shows the data flow of pulse detection and tracking according to the present invention.

FIG. 19 illustrates in greater detail the tracking block (100) of FIG. 18. As shown in FIG. 19, each light detector in the system will output a signal (110) including square pulses indicative of the detecting of a light pulse from the transmitter having been received and detected by the detector. For each pulse, a Field Programmable Gate Array (FPGA) (111) will output a signal specifying a time ($T_1$) corresponding to a rising edge of the detected light pulse and a time ($T_2$) corresponding to a falling edge of the detected light pulse. These times ($T_1$ and $T_2$) are transmitted to the tracking software (112), typically executed by the PCE (90).

The tracking software, as will be described in more detail below, associates each pulse, defined by times ($T_1$ and $T_2$), with a particular transmitter (10). This is done as described above based on the time at which the pulse is received as matched against a time a which a pulse from a given transmitter is expected, knowing that transmitter's rotational velocity and consequent synchronization pulse duty cycle.

Once each detected pulse is associated with a transmitter, that pulse is also then associated with the calibration data (9) for that transmitter. Given the calibration data (9) for the transmitter (as described above) and the times ($T_1$ and $T_2$) for the two fanned light beams and the synchronization pulse for that transmitter, the PCE (90) can calculate the θ value, as shown in FIG. 7, for each the plane of light which swept the detector (e.g, 78). Consequently, the position of the detector (78) can be calculated using the mathematical model described above.

G. Flowchart Narrative (1) Detector:: Entry

Figure 22:
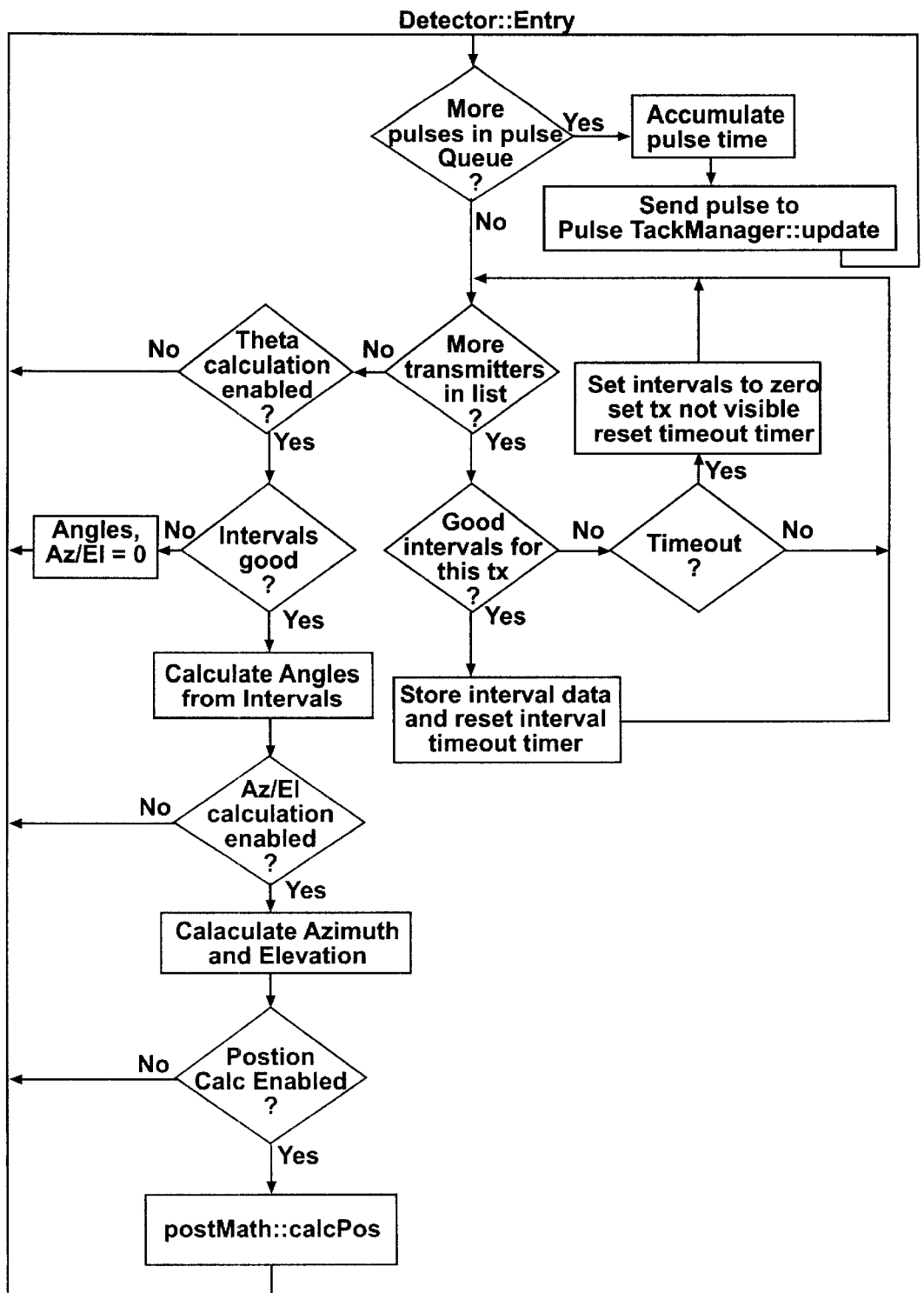
FIG. 22 is a flowchart for Software Object Detector::Entry which is executed by the receiving system according to the present invention.

FIG. 22 illustrates the main background loop for the system. It is an RTOS (Real Time Operating System) task, and once launched, continues to execute in an infinite loop. Referring to the flowchart (FIG. 22), the following sequence of events takes place:

1) Check for pulse time events in the queue. These are passed in from the hardware FIFO in the FPGA, via an interrupt service routine. If there is another event in the queue, add it to the accumulated total time, and pass it through to the update routine. The update routine generates pulse intervals from the incoming pulse times. It also associates the pulses with a particular transmitter.

2) Once the queue has been emptied, run through the list of transmitters to make sure that new intervals have been calculated for every transmitter. If they have not, note a timeout, and mark the associated transmitter as invisible. This will be displayed on the user interface. Otherwise, store the interval data for use in subsequent position calculations.

3) Once all transmitters have been updated with interval information, check to see if theta calculations have been enabled. Thetas are the equivalent angles between the lasers and the reference pulse based upon pulse times and transmitter rotational rate. This is a basic calculation required for any subsequent calculations, and must be enabled for any output to be generated. If they are disabled, go back to looking for more pulse times.

4) Check that all interval data is valid. If not, clear the theta and azimuth/elevation data and check for new pulse times.
5) Perform the calculation to convert angles (thetas) into intervals.
6) If azimuth and elevation calculations are enabled, generate these numbers.
7) If position calculation is enabled, calculate the position (x,y,z) of this detector. Send a message to the measurement tool indicating that a position has been generated for this detector.

(2) PulseTrackManager::Update

Figure 23A:
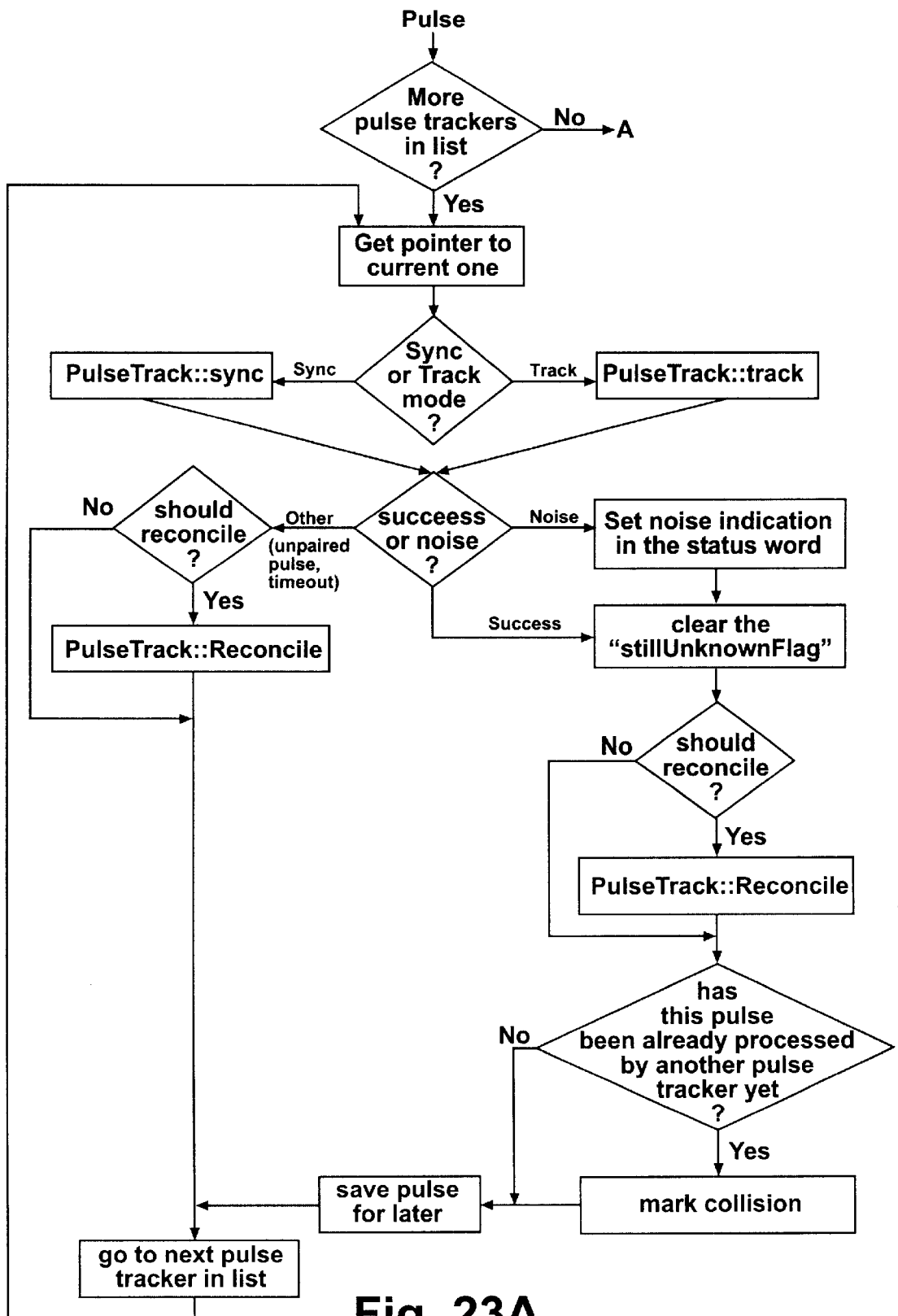
FIG. 23A is a flowchart for Software Object PulseTrackManager::Update which is executed by the receiving system according to the present invention.
Figure 23B:
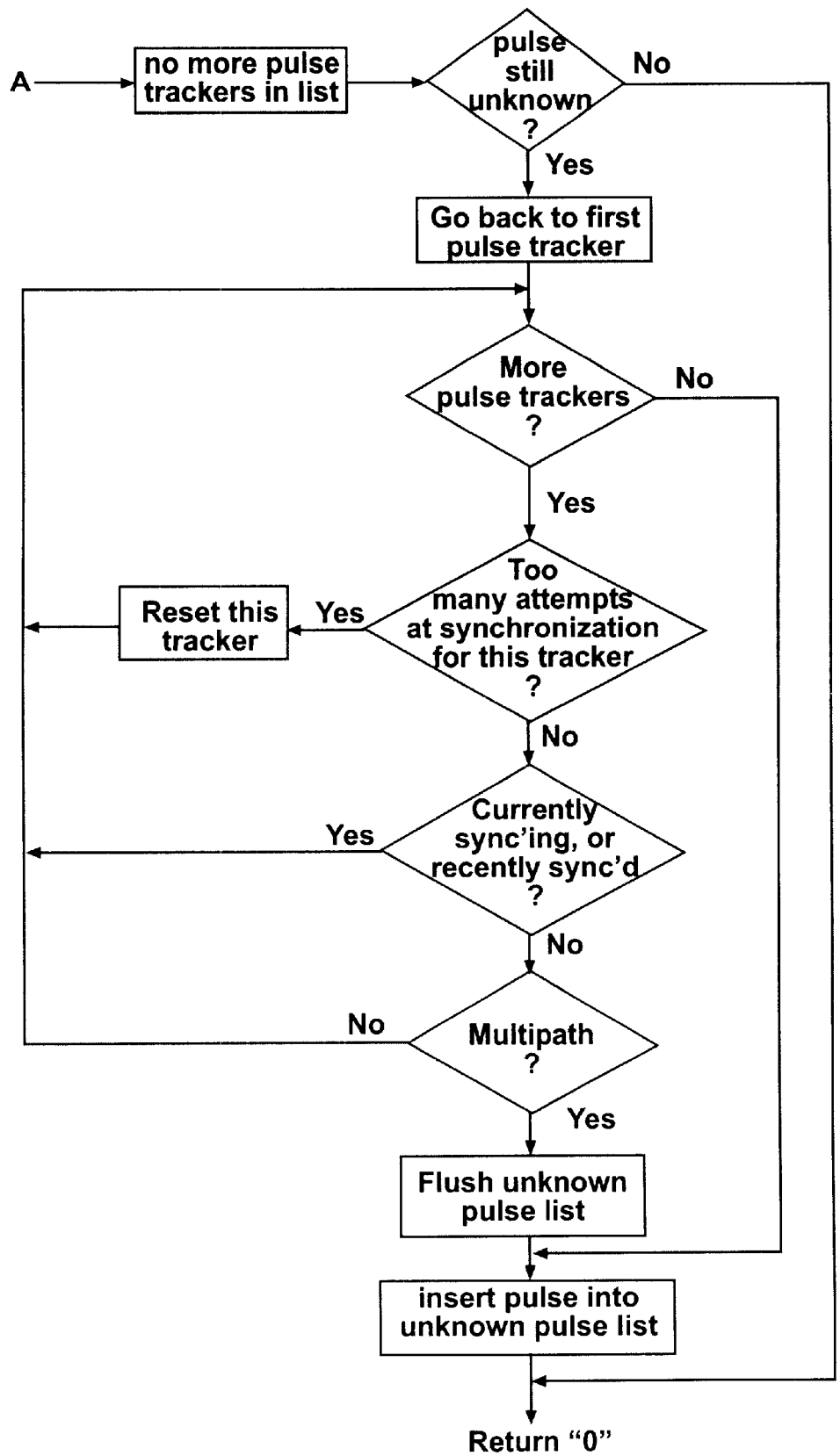
FIG. 23B is a continuation of the flowchart for Software Object PulseTrackManager::Update of FIG. 23A.

The update function of the present invention is shown in flowchart form in FIGS. 23A and 23B. This routine receives pulse times from the Detector "Entry" routine of FIG. 22, and associates them with pulse trackers. An individual pulse tracker exists for each emitter (i.e., fanned laser light source) in the system, preferably two per transmitter and each reference pulse generator (one per transmitter). This accomplished, an attempt is made to reconcile a set of three pulses and associate them with a single transmitter.

The sequence of events is as follows, until a pulse is identified:

8) If currently in synchronization mode, call the synchronization function. Otherwise, call the track function.
9) If noise was detected, set the noise flag.
10) If the sync or track function was successful, check to see if a previous pulse is to be reconciled. If so, call the reconcile routine. This will perform pulse pair housekeeping.
11) If this pulse has already been processed by another pulse tracker, a collision has occurred. Set the "collision" flag.
12) Otherwise, save the pulse for later. It will be used to reconcile the next pulse from this emitter.
13) If the sync or track function was not successful, a timeout may have occurred. Reconcile the pulse anyway so that the interval from the previous pulse gets recorded. Continue with the next tracker.
14) Once all pulse trackers have been attempted, if the pulse has been identified, exit.
15) Otherwise, go back to the top of the list of pulse trackers.
16) For each pulse tracker, check to see if we have exceeded the maximum number of sync attempts. If so, reset this tracker, and go to the next one. If it has recently been sync'd go on to the next one.
17) If multipath interference has not been detected, go on to the next pulse tracker. Otherwise, clear out the unknown pulse list, and insert this one into it.

(3) PulseTrack::Synchronize

Figure 24:
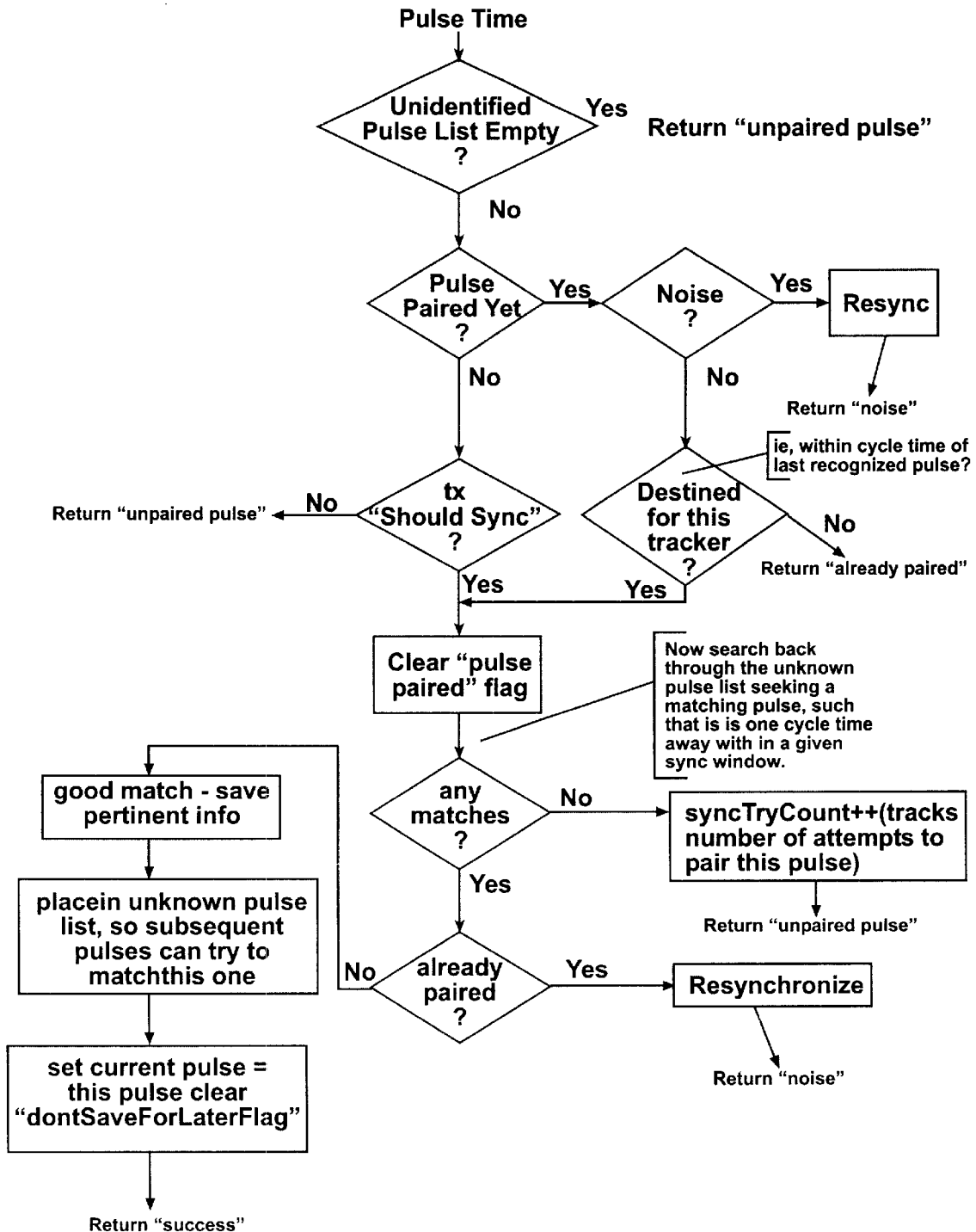
FIG. 24 is a flowchart for Software Object PulseTrack::Synchronize which is executed by the receiving system according to the present invention.

The synchronizing function of the present invention is shown in flowchart form in FIG. 24. The synchronize routine attempts to associate an incoming pulse with an existing pulse tracker. Once a regular pattern of pulses has been established, the system leaves sync mode and enters track mode, whereby the "track" routine is invoked instead of "synchronize". As long as "track" continues to successfully classify incoming pulses, the sync function is no longer called. Should the tracker encounter difficulty in recognizing pulses as coming from a particular transmitter within the system, sync mode is re-invoked, and the system attempts to re-synchronize the pulse stream.

Loss of synchronization may occur for number of reasons, including noise or reflections in the environment, or rapid movement of the receiving instrument (24,70). As shown in FIG. 24:

1) New pulse time of arrival is registered. If the unidentified pulse list is empty, there is nothing with which to pair it. Return as such.
2) Has this pulse been paired yet (with another pulse tracker)? If so, is the interval from previous pulse within the sync window? If so, the previous pulse may have been noise. Resync. A sync window is defined as the time it takes for the transmitter head to complete approximately 0.2% of a rotation.
3) If last pulse was not noise, is this one within the cycle time of this tracker? If not, return "already paired" If so, try to find a match in the unknown pulse list. Note that if it has not been paired yet, we also end up looking in the unknown pulse list.
4) If a match is found, see if the match has been already paired. If so, resynchronize. Otherwise, save as a match, and place this one in the unknown pulse list, so subsequent pulses can try to match this one (4) PulseTrack::Track Once we are in tracking mode, each pulse gets passed to the pulse trackers. The tracking function is shown in flowchart form in FIG. 25. If any pulse is received within an expected range of when the next pulse should occur based on the known parameters of the transmitter, that pulse is accepted as the next pulse for that transmitter and is accepted by the associated tracker. Each fan beam and the synchronization pulse from each transmitter has its own tracker in the receiving system.

Figure 25:
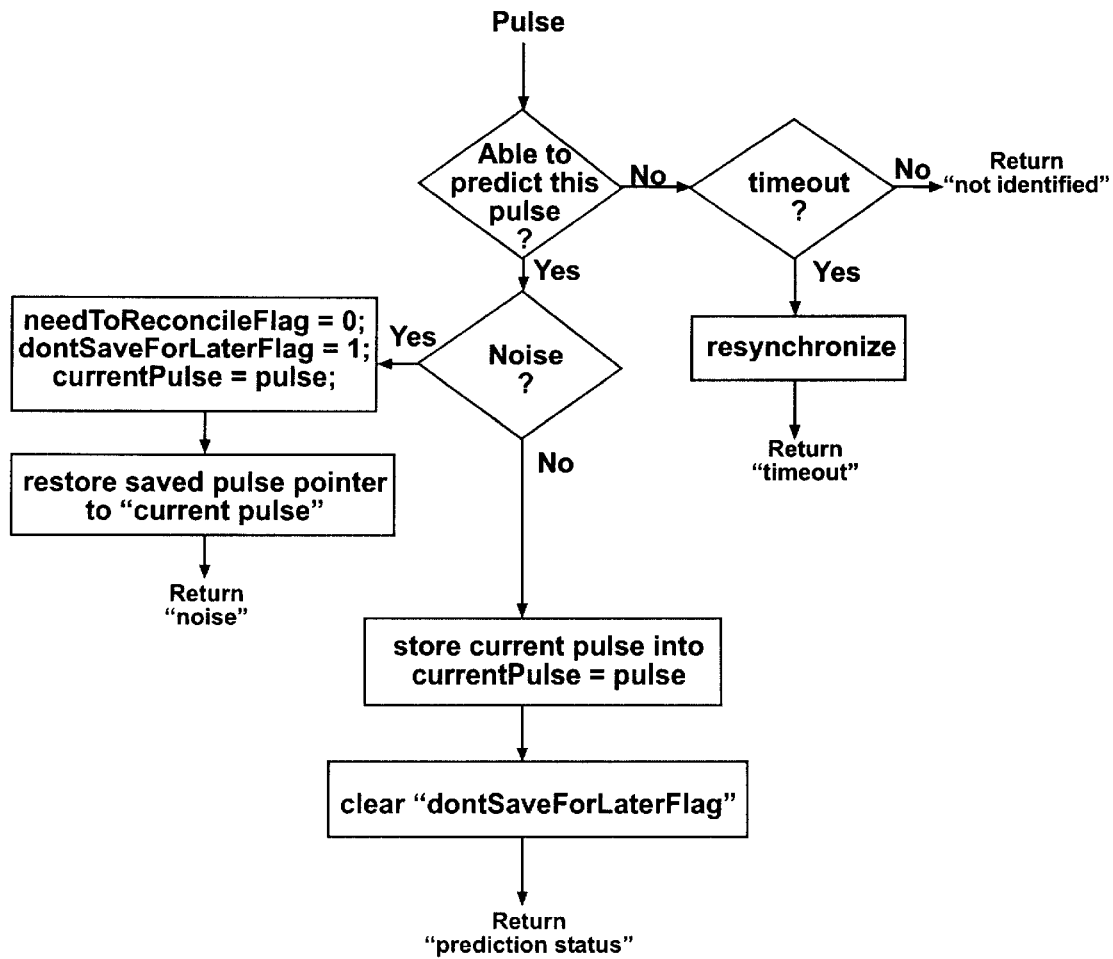
FIG. 25 is a flowchart for Software Object PulseTrack::Track which is executed by the receiving system according to the present invention.

As shown in FIG. 25, tracking is performed as follows:

5) Can we predict a pulse within a reasonable tracking window? If not, has it been too long since the last pulse was registered? If so, resynchronize and return "timeout". If no timeout yet, just return "not identified". A track window is defined as the time it takes for the transmitter head to complete approximately 0.2% of a rotation.
6) If we can predict the pulse, check to see if noise is present (In this case, noise is defined as multiple pulses within the "track window"). If so, reset pointer to previous pulse, and return "noise".
7) If no noise is detected, store current pulse information, and return success.

(5) PulseTrack::Predict

Figure 26:
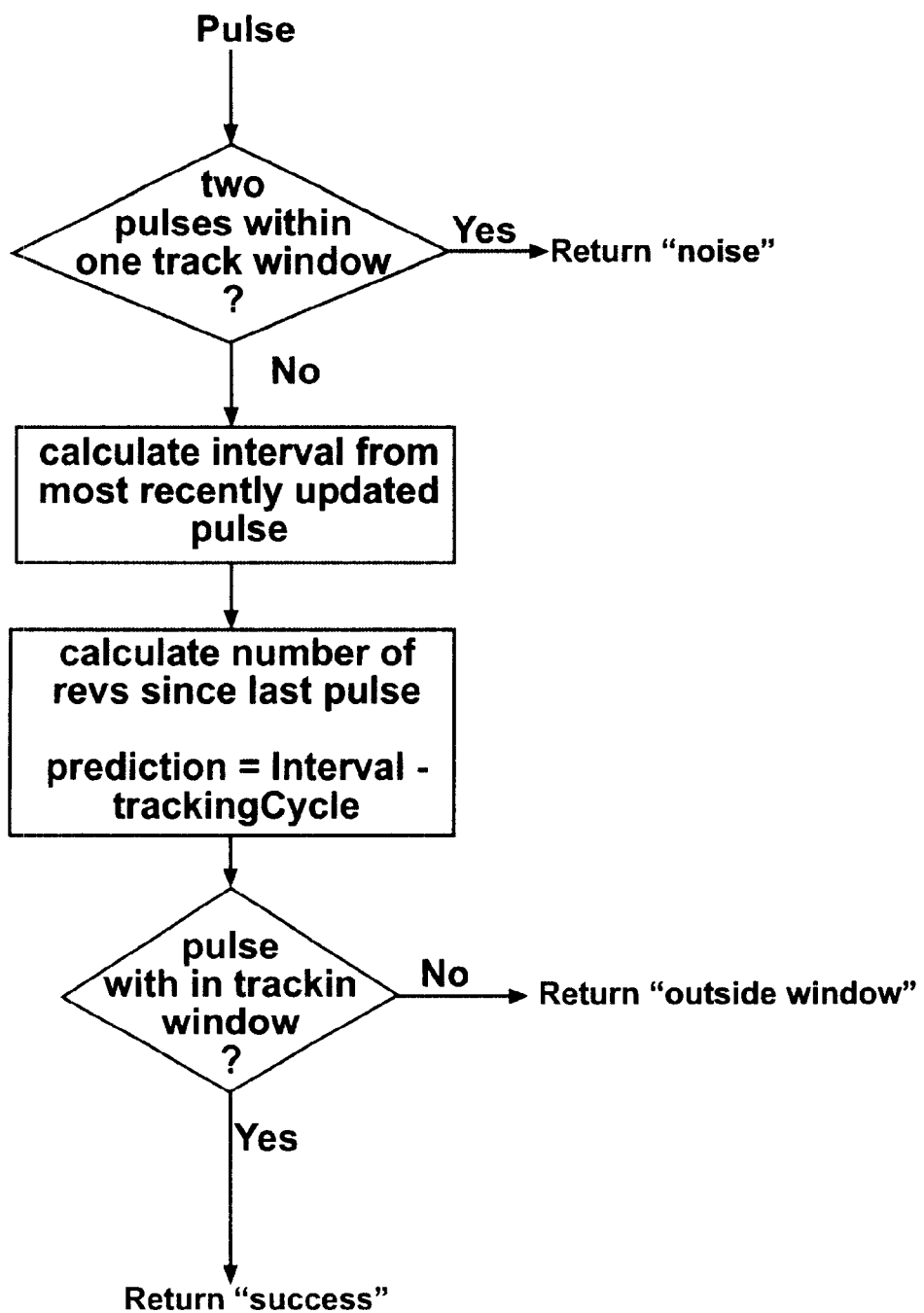
FIG. 26 is a flowchart for Software Object PulseTrack::Predict which is executed by the receiving system according to the present invention.

The predicting routine of the present invention is shown in flowchart form in FIG. 26. This routine interacts with the "Track" routine described above by attempting to predict when the next pulse from any given pulse source should occur. It then tries to correlate this expected time with the next actual pulse time, within a predetermined tracking window.

As shown in FIG. 26, the Predicting routine is performed as follows:

8) Are there two pulses within one tracking window? If so, noise exists; return.
9) Based on previous pulses, is this pulse within a reasonable tracking window of one or more most recent pulses (Several pulses may be missed before tracking fails; i.e.: as may be experienced during a temporary blockage)?
10) If it is, return "success". Otherwise, return "outside window".

(6) Pulse Track::Reconcile

The Reconciliation function of the present invention occurs in two phases. The first part is pulse tracker reconciliation (shown in flowchart form in FIG. 27), which performs pulse pair housekeeping within a particular pulse tracker. The other is transmitter level reconciliation (shown in flowchart form in FIG. 28), which associates a set of three pulses from a single transmit period with a transmitter.

Figure 27:
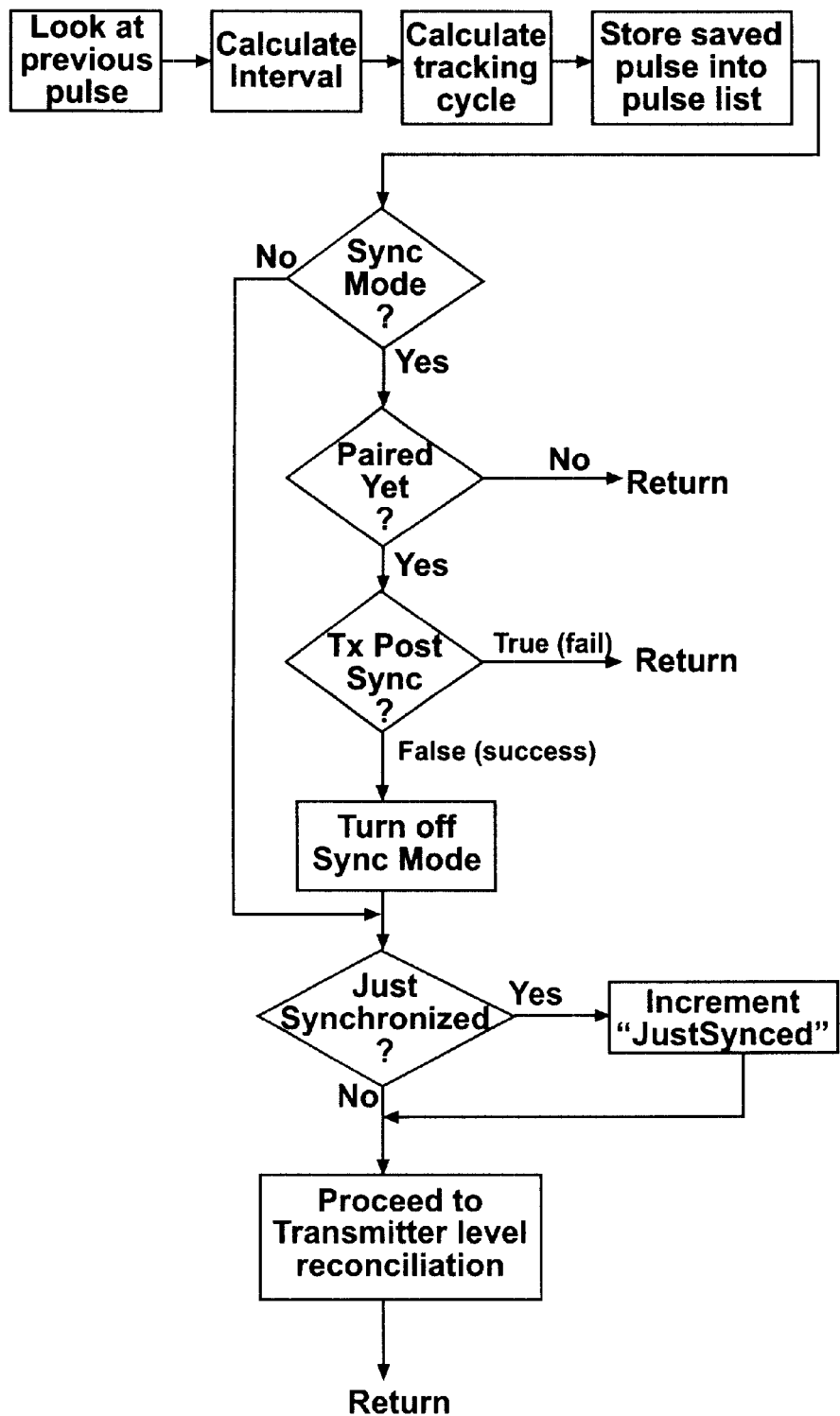
FIG. 27 is a flowchart for Software Object PulseTrack::Reconcile which is executed by the receiving system according to the present invention.
Figure 28:
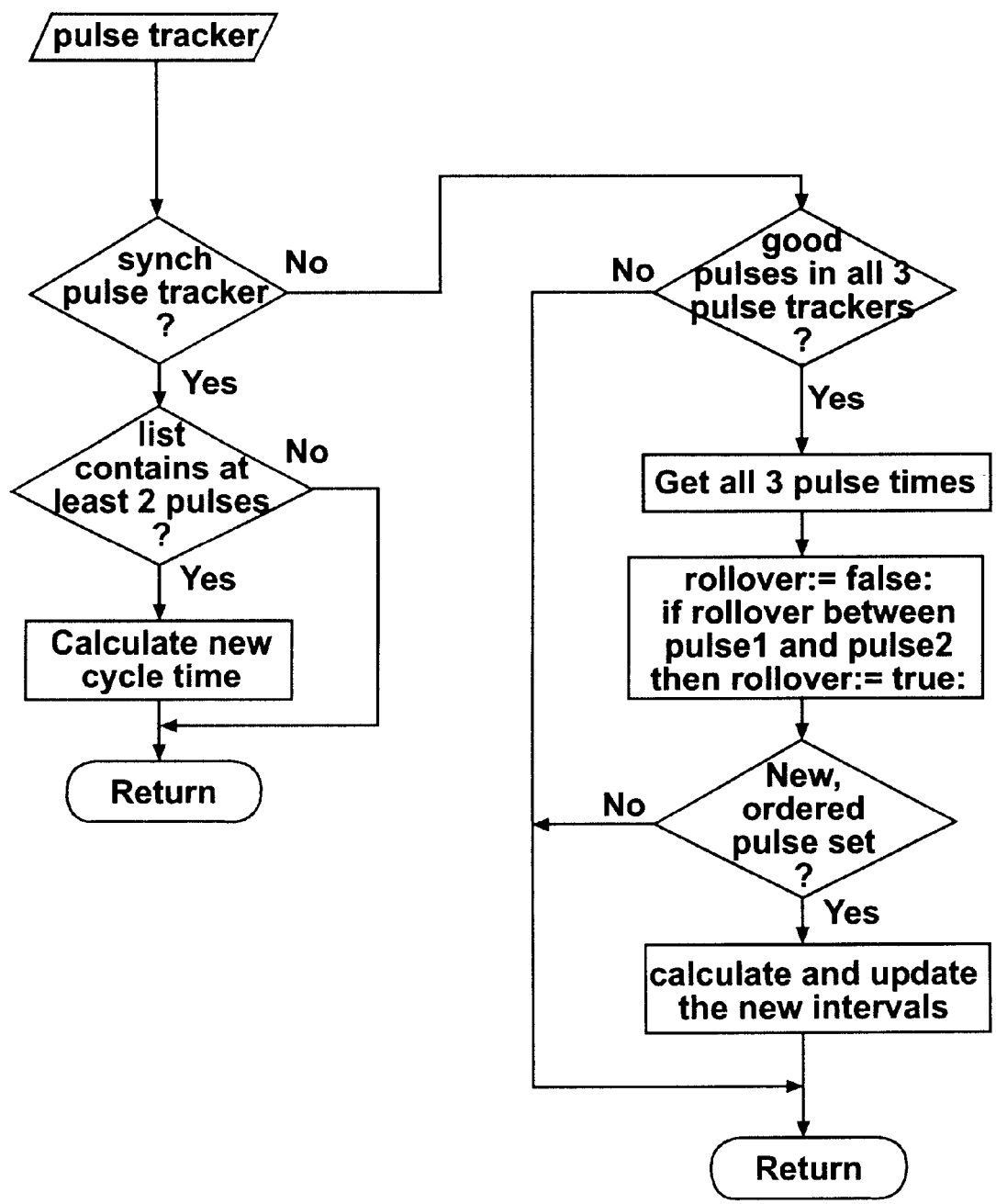
FIG. 28 is a flowchart for Software Object Transmitter::Reconcile which is executed by the receiving system according to the present invention.
Figure 29:
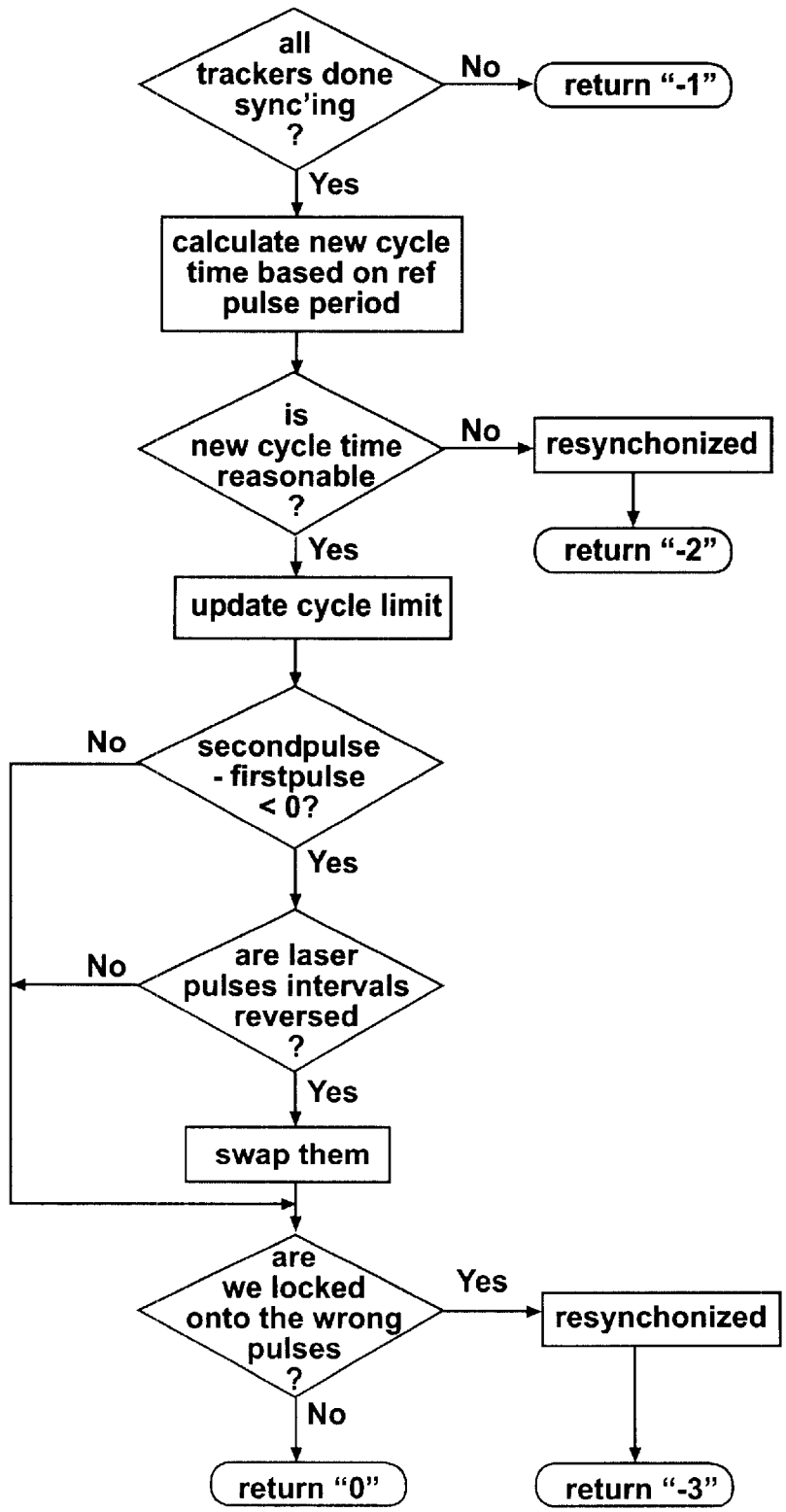
FIG. 29 is a flowchart for Software Object FlyingHeadTransmiterORPGWithDifferentCycle::postSynchronize which is executed by the receiving system according to the present invention.

As shown in FIG. 27, pulse tracker reconciliation proceeds as follows:

11) Calculate interval from previous pulse. Calculate the tracking cycle.
12) Store in the saved pulse list.
13) If in sync mode, and not paired yet, return.
14) Otherwise, call "post-sync" to do cleanup. If it is unsuccessful, return as such.
15) If it was successful, switch to "track" mode.
16) If we were in "track" mode already, check to see if it was recently achieved. If so, increment the counter. This affects the way the "update" routine handles the data.
17) Reconcile at the transmitter level.
(7) Transmitter::Reconcile As shown in FIG. 28, transmitter reconciliation is performed as follows:

18) If this is the reference pulse, check that there are two laser pulses in the list. If so, calculate a new cycle time and return. Otherwise, just return.
19) If it is a laser pulse, make sure there are good pulses from all 3 pulse trackers for this transmitter.
20) Using the pulse time data, calculate the intervals. Save the interval times for use by position calculation routines.
(8) Transmitter::PostSynchronize The Post Synchronization routine of the present invention is used as a final check to make certain that three trackers have synchronized to a single transmitter in a consistent manner and is shown in flowchart form in FIG. 29.

Figure 30:
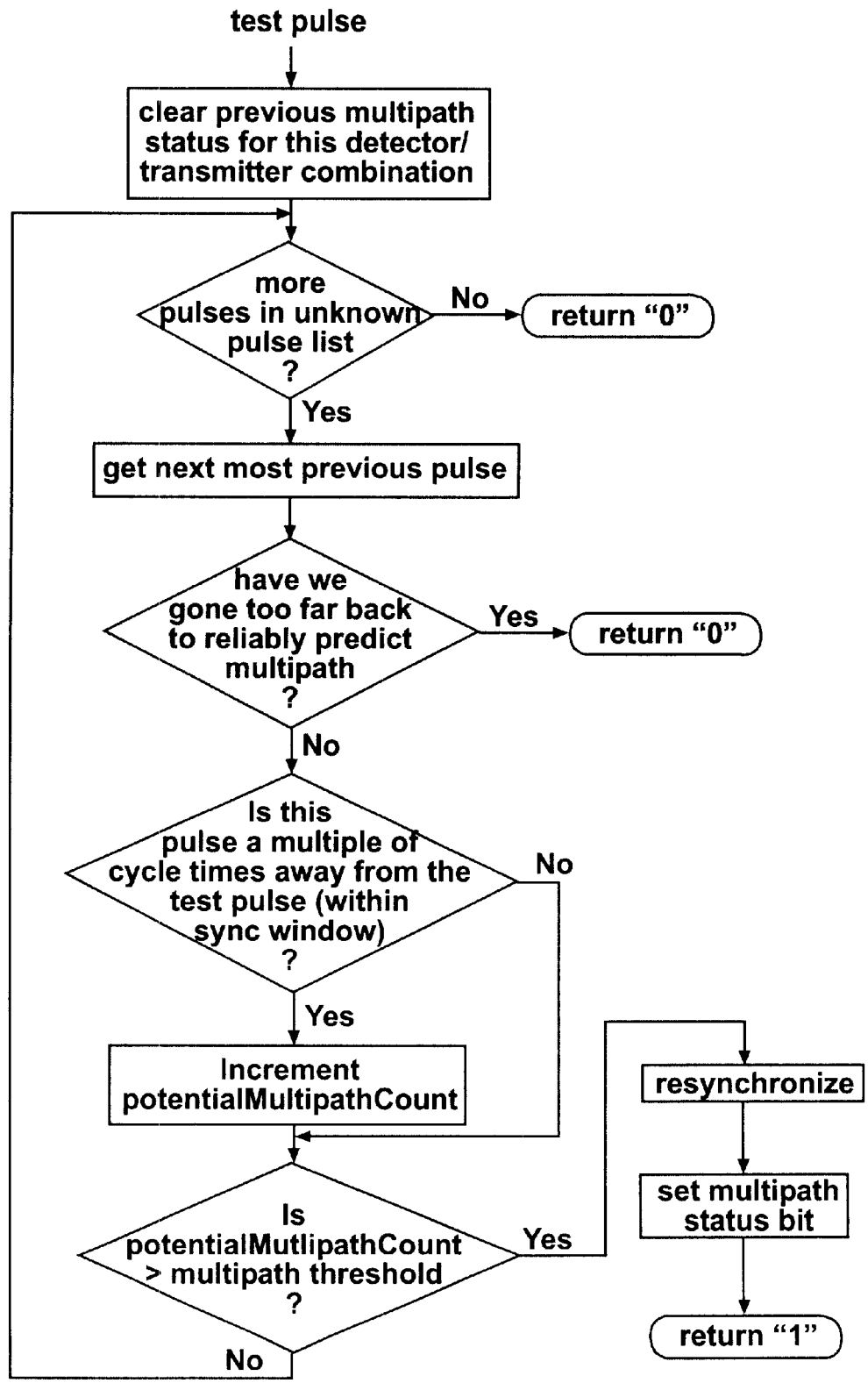
FIG. 30 is a flowchart for Software Object PulseTrack::isMultipath which is executed by the receiving system according to the present invention.

21) First, check that all three trackers have completed synchronization.
22) Using the reference pulse period, check that the cycle time is reasonable. If not, then re-enter the synchronization mode and return an error.
23) Ensure that the pulses have been identified in the correct order. If not, then swap them based upon time of arrival.
24) Check that we're locked onto the correct set of pulses. If not, then re-enter the synchronization mode and return an error.
25) Otherwise, return "success".
(9) PulseTrack::isMultipath The multipath function of the present invention checks to see if multipath interference exists; that is, whether some pulses reaching the detectors are reflections of the emitters rather than "line of sight" pulse strikes. This is accomplished by comparing the pulse currently being classified with previous pulse times and is shown in flowchart form in FIG. 30. As shown in FIG. 30, the multipath routine is performed as follows:

26) Clear any previous multipath indications in the status word.
27) If the unknown pulse list is empty, multipath is not detectable.
28) Compare the pulse time of this pulse with the pulse times of prior entries in the unknown pulse list. If this pulse is a multiple of cycle times away from a previously received (but unidentified) pulse (within a sync window), then multipath interference may be present. Increment a counter.
29) If the counter exceeds a preset limit, multipath exists. Set the multipath status bit, and re-enter synchronization mode.

9. Least Squares Resection

The preceding material describes the operation of the position determining system of the present invention. However, before the system is fully operational, it is necessary to establish and define the user's frame of reference so that the position information generated by the system is actually meaningful to the user. There are at least two different means of setting up the system and defining an initial user's frame of reference: (1) Least Squares Resection and the (2) Quick Setup Method. The Quick Setup method is easier to perform and requires less time and effort than Least Squares Resection. Consequently, the Quick Setup method is preferred for purposes of the present invention and will be described in detail below. However, for completeness, the Least Squares Resection method of setting up the system of the present invention will also now be explained.

Figures 1, 31:
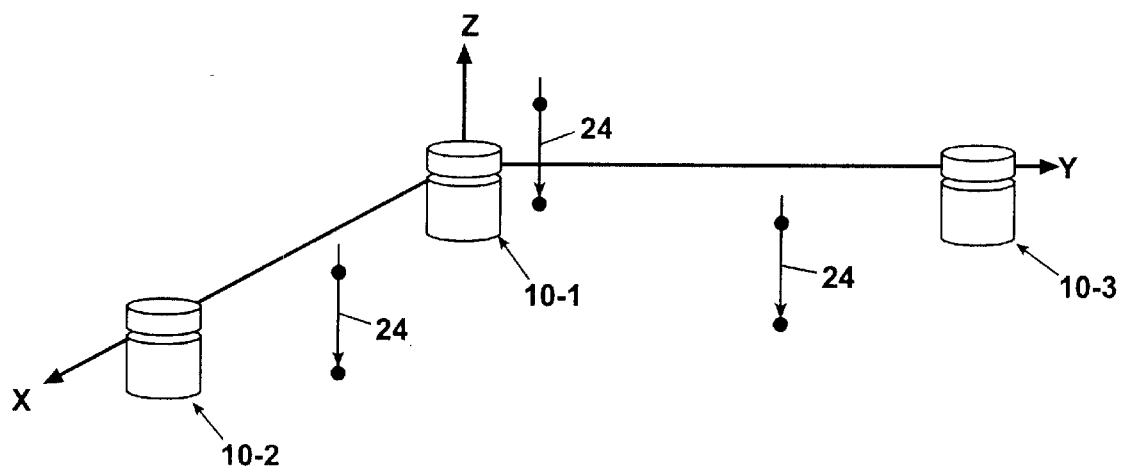
Figures 2, 31:
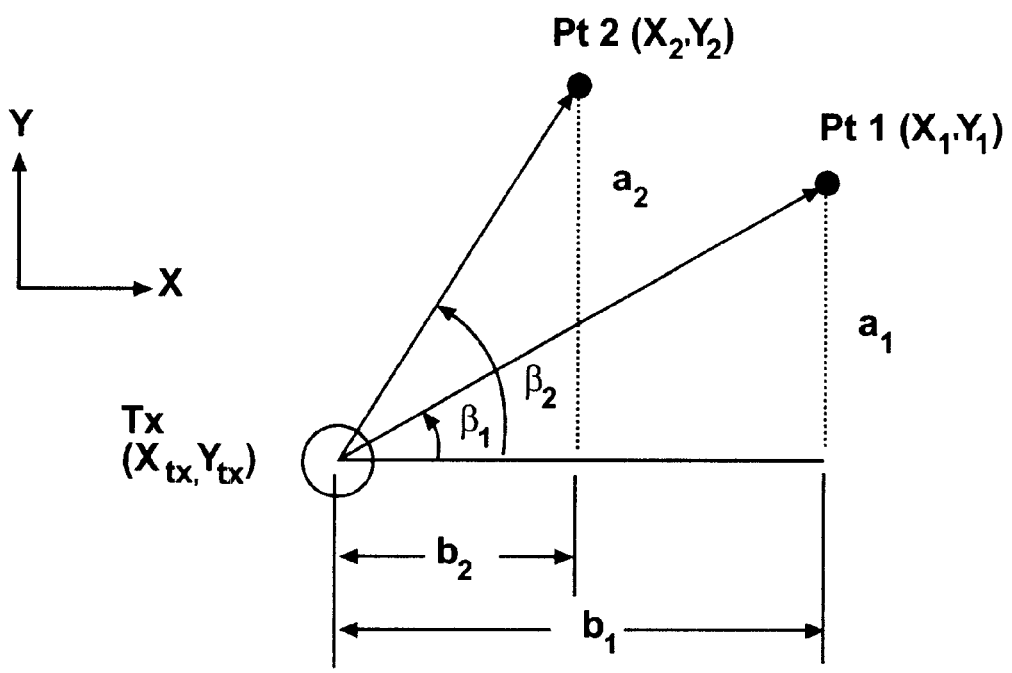

The Least Squares Resection (LSR) algorithm used with the present invention ties the transmitters in the workspace together into a common mathematical reference frame, from which position calculations are made. Whereas the Quick Setup algorithm creates a new reference frame for the transmitters, LSR ties the transmitters into a previously established reference frame defined by coordinates already in the workspace. FIGS. 12 and 31-1 show an example of a user reference frame in which the transmitters are arbitrarily placed.

FIG. 31-1 shows the same three transmitters (10-1, 10-2 & 10-3) shown in FIG. 12, which are arranged in an arbitrary coordinate system relative to each other as was described with regard to FIG. 12. Each transmitter in the workspace has an associated position vector $\vec{p}_{tx}$ and rotation matrix $R_{tx}$ that relate the transmitter's local reference frame to the user's reference frame. $\vec{p}_{tx}$ and $R_{tx}$ are used in the position calculation algorithm.

In order to perform an LSR with the position measurement system of the present invention, the user must level a receiving instrument (24) with a single light (or other signal) detector over at a minimum of three known coordinates in the workspace as shown in FIG. 31-1. The receiver system (24) makes scan angle measurements (measurements of $\theta_1$ and $\theta_2$) for the detector at each location.

After all of the measurements are taken, the algorithm calculates an approximate guess location and orientation for each transmitter (10) relative to the user reference frame. The algorithm then individually calculates the location and orientation of each transmitter (10) using Newton-Raphson iteration. The reader should note that this approach is different from the preferred Quick Setup algorithm to be described below. In the Quick Calc Setup method, all transmitter locations and orientations are solved for simultaneously.

A. Least Squares Resection Algorithm

The mathematical algorithm used in the LSR method of the present invention is described below.

(1) LSR Observations

As stated above, the first step in LSR is for the receiver system to take scan angle measurements with a leveled one-detector wand (24) at a minimum of three locations in the workspace for which the position is already known in the user's reference frame. For each receiver (24) location, the receiver system records the scan angles $\theta_1$ and $\theta_2$ from each transmitter (10) to the detector on the receiver (24). These two scan angles are then converted to their corresponding plane vectors $\hat{v}_1$ and $\hat{v}_2$. The measurement at each wand (24) location is called an LSR observation.

For each LSR observation, the user enters the known coordinate ($x_{tip}, y_{tip}, z_{tip}$) and which the wand's tip (24) has been placed as shown in FIG. 31-1. Since the wand (24) is leveled over this point, the receiver system calculates the coordinate of the tool's detector by making the assumption that the z-axis in the user reference frame is parallel to gravity. Since, the detector (10) is mechanically located at a distance toolLength from the wand tip, we can write the detector location $\vec{c}_{loc}$ as:

$$\vec{c}_{loc} = \begin{bmatrix} x_{tip} \\ y_{tip} \\ z_{tip} + toolLength \end{bmatrix} \quad (3.1)$$

For m different wand (24) locations and n different transmitters (10), we have the following data set.

$$\begin{array}{cccccc} \vec{c}_1 & \vec{v}_{1,1,1} & \vec{v}_{1,1,2} & \cdots & \vec{v}_{1,n,1} & \vec{v}_{1,n,2} \\ \vec{c}_2 & \vec{v}_{2,1,1} & \vec{v}_{2,1,2} & \cdots & \vec{v}_{2,n,1} & \vec{v}_{2,n,2} \\ \vdots & \vdots & & \ddots & & \vdots \\ \vec{c}_m & \vec{v}_{m,1,1} & \vec{v}_{m,1,2} & \cdots & \vec{v}_{m,n,1} & \vec{v}_{m,n,2} \end{array}$$

The subscript convention is $\vec{v}_{loc,tx,beam}$. The first subscript indicates the wand location, i.e. this subscript counts observations. The second indicates the transmitter, and the third indicates beam 1 or beam 2 on the transmitter (10). Since LSR handles each transmitter (10) separately, the data set for a single transmitter (10) is:

$$\begin{array}{ccc} \vec{c}_1 & \vec{v}_{1,tx,1} & \vec{v}_{1,tx,2} \\ \vec{c}_2 & \vec{v}_{2,tx,1} & \vec{v}_{2,tx,2} \\ \vdots & \vdots & \\ \vec{c}_m & \vec{v}_{m,tx,1} & \vec{v}_{m,tx,2} \end{array} \quad (3.2)$$

Furthermore, it is not required that each transmitter (10) use the same four observations in the LSR algorithm; we simply do this for convenience in the operation of the system. This illustrates another difference between LSR and the preferred Quick Setup method; LSR is a resection algorithm because is locates and orients a single transmitter (10) in a preexisting reference frame, just like a total station is aligned to a set of control points. Quick Setup, by contrast, locates and orients all transmitters relative to one another in an arbitrarily defined reference frame.

Because LSR deals with each transmitter individually, we will describe the LSR setup process for a single transmitter. Those of skill in the art will understand that this process is simply repeated for each transmitter (10) in the system.

(2) Estimate Generation

The LSR algorithm must solve for the locations and orientations of the other transmitters in the workspace. Therefore, the LSR solves for the following quantities:

$$\vec{p}_{tx} = \begin{bmatrix} x_{tx} \\ y_{tx} \\ z_{tx} \end{bmatrix}$$

$$R_{tx} = Rx(rx_{tx})Ry(ry_{tx})Rz(rz_{tx})$$

$$= \begin{bmatrix} 1 & 0 & 0 \\ 0 & \cos(rx_{tx}) & -\sin(rx_{tx}) \\ 0 & \sin(rx_{tx}) & \cos(rx_{tx}) \end{bmatrix} \begin{bmatrix} \cos(ry_{tx}) & 0 & \sin(ry_{tx}) \\ 0 & 1 & 0 \\ -\sin(ry_{tx}) & 0 & \cos(ry_{tx}) \end{bmatrix} \begin{bmatrix} \cos(rz_{tx}) & -\sin(rz_{tx}) & 0 \\ \sin(ry_{tx}) & \cos(rz_{tx}) & 0 \\ 0 & 0 & 1 \end{bmatrix}$$

The order of rotation used is called z-y-x fixed angle. This rotation order is chosen because the z rotation component is typically the largest rotation for a transmitter; i.e. the transmitters are usually close to level. Any rotation order can be used, though, as long as $R_{tx}$ is consistent between the LSR algorithm and the position calculation algorithm. We define a solution vector $\vec{x}$ to include the 6 unknowns for the transmitter:

$$\vec{x} = [x_{tx} \; y_{tx} \; z_{tx} \; rx_{tx} \; ry_{tx} \; rz_{tx}]^T$$

Before performing a Newton-Raphson iteration, the LSR algorithm generates a guess for this $\vec{x}$ vector based on the assumption that the transmitter (10) is leveled in the x-y plane. In other words, the $\vec{x}$ vector generated by the guess routine is:

$$\vec{x} = [x_{tx} \; y_{tx} \; 0 \; 0 \; 0 \; rz_{tx}]^T$$

Using this simplification, a diagram for two LSR observations (Pt1 & Pt2) relative to the transmitter (Tx) can be drawn as shown in FIG. 31-2. This Fig. shows two triangles whose common base is parallel to the x-axis. Since the $\theta$ angles (scan angles) are measured relative to the front of the transmitter and $rz_{tx}$ is the angle between the x-axis and the front of the transmitter when the transmitter is in the xy-plane, we have the following formulas for the two $\beta$ angles:

$$\beta_1 = \theta_{1,tx,1} + rz_{tx}$$

$$\beta_2 = \theta_{2,tx,1} + rz_{tx}$$

The subscript notation on $\theta$ is the same as was used on the $\vec{v}$ vector, specifically $\theta_{loc,tx,beam}$. When the transmitter is in the x-y plane, $\theta_{loc,tx,1} = \theta_{loc,tx,2}$. Since this is our assumption, we simply pick the first $\theta$ angle to calculate $\beta$. An estimate for the $rz_{tx}$ angle is determined iteratively, which we will describe later.

Using the law of sines, we make the following observation about the two triangles.

$$\frac{a_1}{\sin\beta_1} = \frac{b_1}{\sin(90-\beta_1)}$$

$$\frac{a_2}{\sin\beta_2} = \frac{b_2}{\sin(90-\beta_2)}.$$

Since $\sin(90-\beta)=\cos(\beta)$, $a_{loc}=y_{loc}-y_{tx}$, and $b_{loc}=x_{loc}-x_{tx}$ and we can rewrite the equations as follows.

$$\frac{y_1 - y_{tx}}{\sin\beta_1} = \frac{x_1 - x_{tx}}{\cos\beta_1}$$

$$\frac{y_2 - y_{tx}}{\sin\beta_2} = \frac{x_2 - x_{tx}}{\cos\beta_2}$$

Rearranging we get:

$$x_{tx} \sin\beta_1 - y_{tx} \cos\beta_1 = x_1 \sin\beta_1 - y_1 \cos\beta_1$$

$$x_{tx} \sin\beta_2 - y_{tx} \cos\beta_2 = x_2 \sin\beta_2 - y_2 \cos\beta_2$$

Or in matrix form:

$$\begin{bmatrix} \sin\beta_1 & -\cos\beta_1 \\ \sin\beta_2 & -\cos\beta_2 \end{bmatrix} \begin{bmatrix} x_{tx} \\ y_{tx} \end{bmatrix} = \begin{bmatrix} x_1\sin\beta_1 - y_1\cos\beta_1 \\ x_2\sin\beta_2 - y_2\cos\beta_2 \end{bmatrix}$$

This matrix can then be solved for the location estimate of the transmitter ($x_{tx}$, $y_{tx}$). To determine if the solution is valid, the following two inequalities are checked.

$$\frac{x_1 - x_{tx}}{\cos\beta_1} \geq 0$$

$$\frac{x_2 - x_{tx}}{\cos\beta_2} \geq 0$$

These inequalities must be true in order for the direction of $\beta_1$ and $\beta_2$ to match the direction shown in FIG. 31-2. We do not need to check they values since the y do not provide any additional information.

In actuality, we have three or more LSR observations. To accommodate this extra data, the guess routine takes groups of three adjacent observations and calculates a transmitter location estimate for each of the three observation combinations. The sum of the distances between these three transmitter location estimates is defined as the residual error, and the guess routine picks the set of observations with the lowest residual error. The final transmitter location ($x_{tx}$,$y_{tx}$) is then the average of the three transmitter locations from this chosen observation set.

Finally, we describe how the $rz_{tx}$ angle is calculated, since $\beta_1$ and $\beta_2$ are based on $rz_{tx}$. Unfortunately, there is not enough information to determine $rz_{tx}$ directly. Therefore, for each set of observation combinations, the guess algorithm tries different $rz_{tx}$ values in increments of 10° starting with 0° and ending with 350°. Using the residual check at each step, the best $rz_{tx}$ is chosen. Those $rz_{tx}$ values that are mathematically impossible with fail the inequality checks given above.

(3) Solution Calculation

As previously stated, the Least Squares algorithm uses Newton-Raphson iteration to find the best solution for the given setup. Newton-Raphson uses a fill function that evaluates the function to be solved for a given solution vector $\vec{x}$:

$$f(\vec{x})=0$$

where $\vec{x}$ is defined above. LSR is essentially just a reverse position calculation, so the fill function is simply the plane equation described in the position calculation herein above described:

$$R_{tx}\vec{v} \cdot (\vec{p} - \vec{p}_{tx})=0$$

When used for position calculation, the quantity for which a solution is found is the location of the detector $\vec{p}$. All other quantities are known. In LSR, the quantities for which a solution is required are the location of the transmitter $\vec{p}_{tx}$ and the orientation of the transmitter $R_{tx}$. The vector $\vec{p}$ is simply the location of the LSR observation $\vec{c}_m$, and the vector $\vec{v}$ is the vector of the measured beam plane. Therefore, for m LSR observations, we can write the set of equations to be solved:

$$\vec{F}(\vec{x}) = \begin{bmatrix} R_{tx}\vec{v}_{1,tx,1} \cdot (\vec{c}_1 - \vec{p}_{tx}) \\ R_{tx}\vec{v}_{1,tx,2} \cdot (\vec{c}_1 - \vec{p}_{tx}) \\ R_{tx}\vec{v}_{2,tx,1} \cdot (\vec{c}_2 - \vec{p}_{tx}) \\ R_{tx}\vec{v}_{2,tx,2} \cdot (\vec{c}_2 - \vec{p}_{tx}) \\ \vdots \\ R_{tx}\vec{v}_{m,tx,1} \cdot (\vec{c}_m - \vec{p}_{tx}) \\ R_{tx}\vec{v}_{m,tx,2} \cdot (\vec{c}_m - \vec{p}_{tx}) \end{bmatrix} = \begin{bmatrix} 0 \\ 0 \\ 0 \\ 0 \\ \vdots \\ 0 \\ 0 \end{bmatrix}$$

The Newton-Raphson iteration adjusts $R_{tx}$ and $\vec{p}_{tx}$ until $\vec{F}(\vec{x})$ is approximately zero.

The guess algorithm and subsequent Newton-Raphson iteration are performed for all transmitters in the workspace.

10. Quick Setup Method

Having fully described the LSR method of setting up the system of the present invention, we will now describe the preferred Quick Setup method. This procedure determines, amongst other things, the coordinate system desired by the user and the wand's location in that coordinate system.

A. Introduction to the Quick Setup Procedure

This procedure relates the transmitters in the workspace together into a common mathematical reference frame that is or can be readily mapped to the user's desired reference frame from which position calculations are made. FIG. 32-1 below shows an example of a user reference frame.

Each transmitter in the workspace has an associated position vector r $\vec{p}_{tx}$ and rotation matrix $R_{tx}$ that relate the transmitter's local reference frame to the user reference frame. $\vec{p}_{tx}$ and $R_{tx}$ are used in the position calculation algorithm.

In order to perform a Quick Setup with the position measurement system of the present invention, the user places the two-detector (78 & 80) receiving instrument (24) in a minimum of three different locations in the workspace as shown in FIG. 32-2. The receiver system makes scan angle measurements (θ measurements) for both detectors (78 & 80) on the tool at each location.

After all of the measurements are taken, the algorithm calculates vectors from transmitter (10) to detector (78 or 80) for each of the detector measurements. Then the algorithm calculates two rough estimates for the locations and orientations of the transmitters (10) relative to one another. Using these guesses as a starting point, the algorithm performs a Newton-Raphson iteration to precisely locate and orient the transmitters (10) in a common user reference frame.

B. Quick Setup Algorithm (1) Observation Collection

As stated above, the first step in the Quick Setup algorithm is for the receiver system to take scan angle measurements of the two-detector receiving instrument (24) at a minimum of three locations in the workspace. For each receiving instrument location, the receiver system records the scan angles, $\theta_1$ and $\theta_2$, from each transmitter (10) to each detector (78 & 80) on the wand (24). These scan angles are then converted to their corresponding plane vectors $\vec{v}_1$ and $\vec{v}_2$. The plane vectors are then converted to a vector from transmitter (10) to detector (78 or 80) as shown in FIG. 1 yielding:

$$r = q0 + k(v1 + v2)$$

The beam 1 cone surface is represented by the cone vector $v_1$ and beam 2 cone surface by cone vector $v_2$. Because the two cones originate at the same vertex, the intersection of the two cone surfaces is a line and its direction is represented by a unit vector r. The vector r is on both the beam 1 cone and beam 2 cone and therefore satisfies the following equations:

$$v_1 r = \cos \alpha_1$$

$$v_2 r = \cos \alpha_2$$

To find r, r is solved given $v_1$, $v_2$, $\alpha_1$ and $\alpha_2$. If there exists a vector $q_0$ $$v_1 q_0 = \cos \alpha_1$$

$$v_2 q_0 = \cos \alpha_2$$

with $$q_0 = \begin{bmatrix} q_x \\ q_y \\ 0 \end{bmatrix}$$

then, $q_0$ is on the ray determined by two planes:

$$v_1 \begin{bmatrix} x \\ y \\ z \end{bmatrix} = \cos \alpha_1$$

$$v_2 \begin{bmatrix} x \\ y \\ z \end{bmatrix} = \cos \alpha_2$$

which obtains:

$$v_1(p - q_0) = 0$$

$$v_2(p - q_0) = 0$$

The direction of vector, p−q0 is given by cross-product of r1 and r2. Therefore:

$$r - q_0 = k(v_1 \times v_2)$$

where k is a scalar constant such that $$|r| = |q_0 + k(v_1 \times v_2)| = 1$$

Thus, r is solved by $$r = q_0 + k(v_1 \times v_2)$$

The $\vec{r}$ vector is relative to the transmitter's local reference frame as shown in the Figures. This vector passes through the detector (78 or 80) but contains no distance information. Since there are two detectors (78 & 80) on the receiving instrument (24), there are two vectors calculated for each wand location. Therefore, for m different wand locations and n different transmitters (10), we have the following data set.

$$\begin{matrix} \vec{r}_{1,1,1} & \vec{r}_{1,1,2} & \cdots & \vec{r}_{1,n,1} & \vec{r}_{1,n,2} \\ \vec{r}_{1,1,1} & \vec{r}_{2,1,2} & \cdots & \vec{r}_{2,n,1} & \vec{r}_{2,n,2} \\ \vdots & \vdots & \ddots & \vdots & \vdots \\ \vec{r}_{m,1,1} & \vec{r}_{m,1,2} & \cdots & \vec{r}_{m,n,1} & \vec{r}_{m,n,2} \end{matrix}$$

The subscript convention is $\vec{r}_{loc,tx,det}$. The first subscript indicates the wand location. The second indicates the transmitter, and the third indicates the detector on the wand (24) (Detector 1 (78) on the wand (24) is the detector closest to the handle.) We call each $\vec{r}$ vector a "target observation".

In addition to target observations, the receiver system also records the distance between the detectors (78 & 80) on the receiving instrument (24). This distance is used to provide scale to the iterative solution. The guess routines and Newton-Raphson iteration will use this distance for each location of the tool. We call each instance of this distance a scale bar observation. Therefore, for n different tool locations, we have n different scale bar observations. We may refer to the receiving instrument (24) as a scale bar in this document.

(2) Guess Generation

In the Quick Setup algorithm, the user reference frame is a somewhat arbitrary frame that simply estimates all transmitters in the workspace together. Once this frame is established, it is possible to make position calculation measurements relative to the frame's coordinate system. It is also possible to transform the coordinate system into another coordinate system, possibly a surveyed reference frame. The user reference frame is arbitrary because we can choose any origin and any orientation for the principal axes. The only requirement is that the various transmitters in the workspace are properly tied together.

As shown in FIG. 32-4, the user reference frame chosen by Quick Setup puts the first transmitter (10-1) at the origin with no rotation; i.e. the first transmitter's local reference frame is used as the user reference frame.

Because the location and orientation of the first transmitter are fixed (10-1), the algorithm must solve for the locations and orientations of the other transmitters (e.g., 10-2 & 10-3) in the workspace. Therefore, the algorithm solves for the following quantities:

$$\vec{p}_{tx} = \begin{bmatrix} x_{tx} \\ y_{tx} \\ z_{tx} \end{bmatrix}$$

$$R_{tx} = R_x(rx_{tx})R_y(ry_{tx})R_z(rz_{tx})$$

$$R_{tx} = \begin{bmatrix} 1 & 0 & 0 \\ 0 & \cos(rx_{tx}) & -\sin(rx_{tx}) \\ 0 & \sin(rx_{tx}) & \cos(rx_{tx}) \end{bmatrix} \begin{bmatrix} \cos(ry_{tx}) & 0 & \sin(ry_{tx}) \\ 0 & 1 & 0 \\ -\sin(ry_{tx}) & 0 & \cos(ry_{tx}) \end{bmatrix} \begin{bmatrix} \cos(rz_{tx}) & -\sin(rz_{tx}) & 0 \\ \sin(rz_{tx}) & \cos(rz_{tx}) & 0 \\ 0 & 0 & 1 \end{bmatrix}$$

where the first transmitter is given by:

$$\vec{p}_1 = \begin{bmatrix} 0 \\ 0 \\ 0 \end{bmatrix}$$

$$R_1 = \begin{bmatrix} 1 & 0 & 0 \\ 0 & 1 & 0 \\ 0 & 0 & 1 \end{bmatrix}$$

The order of rotation used in the rotation matrix above is called a z-y-x fixed angle. This rotation order is chosen because the z rotation component is typically the largest rotation for a transmitter; i.e. the transmitters are usually close to level. Any rotation order can be used, though, as long as $R_{tx}$ is consistent between the Quick Setup algorithm and the position calculation algorithm. We define a solution vector $\vec{x}$ to include the unknowns for all n transmitters:

$$\vec{x} = [x_2 \, y_2 \, z_2 \, rx_2 \, ry_2 \, rz_2 \, \ldots \, x_n \, y_n \, z_n \, rx_n \, ry_n \, rz_n]^T$$

The Quick Setup algorithm generates two different guesses for the $\vec{x}$ vector above. Both guess routines are based on the following assumptions:

1. The transmitters are leveled in the x-y plane and are at the same z-axis location.
2. The scale bars are placed vertically (perpendicular to the x-y plane) at each location.
3. The middle of each scale bar is located in the x-y plane.

These assumptions allow the setup problem to be simplified so that a solution for the position and orientation of the unknown transmitters can be calculated directly rather than through iteration. These guesses are then used as a starting point for the Newton-Raphson iteration. Using the assumptions above, the following information is calculated for each scale bar and each transmitter:

$\vec{t}_{loc,tx}$ A vector in the direction of the center of the scale bar center. The vector's length is approximately the distance to the scale bar center (exactly if the assumptions above are met).

$\beta_{loc,tx}$ The included angle between the two $\vec{r}$ vectors from the given transmitter to the top and bottom detectors on the tool at the given tool location.

The first index on these quantities is the receiving instrument location, and the second is the transmitter number.

The first guess routine uses sets of three scale bar observations to guess the positions and orientations of the unknown transmitters. In this routine, only the $\vec{t}$ vectors calculated above are required. This guess routine is based on the intersection of three spheres in space. We show these spheres from in a plan view in FIG. 32-5. We define a sphere for each scale bar observation. The center of each sphere is located using the corresponding $\vec{t}$ vector from the first transmitter (10-1). Recall that the first transmitter (10-1) is the reference transmitter, and the final user reference frame is going to be based on this transmitter (10-1). The radius of each sphere is the distance from the unknown transmitter (10-?) to the scale bar observation, as given by the following:

$$d_{loc,tx} = \|\vec{t}_{loc,tx}\|$$

When the three assumptions above are met, the intersection of the three spheres will exactly locate the unknown transmitter (10-?) relative to the first transmitter (10-1), thereby giving us $(x_{tx}, y_{tx}, z_{tx})$. Since these assumptions are never exactly met, we actually get an approximate location for the unknown transmitter (10-?) (See FIG. 32-5).

The next step in this first guess routine is to calculate the orientation of the unknown transmitter (10-?) relative to the first transmitter (10-1). Since we have calculated a guess location for the unknown transmitter $(x_{tx}, y_{tx}, z_{tx})$, we can also calculate vectors that locate the scale bars from the unknown transmitter as shown in FIG. 32. In this Fig., we define the $\vec{s}$ vectors as:

$$\vec{s}_{loc,tx} = \vec{t}_{loc,1} - \vec{p}_{tx}$$

These vectors are similar to the $\vec{t}_{loc,tx}$ vectors from the unknown transmitter (10-?), except that these vectors are relative to the first transmitter's reference frame. The $\vec{t}_{loc,tx}$ vectors are relative to the unknown transmitter's reference frame. Therefore, we have three vectors from each reference frame that describe the same three points in space. We can then calculate the z-y-x fixed angle rotations, $rx_{tx}, ry_{tx}, rz_{tx}$.

This three-sphere guess routine calculates guesses for adjacent sets of three scale bars and then averages the guess values for each unknown transmitter (10-?). In other words, the routine uses the scale bars at locations 1, 2, and 3 for the first guess, the scale bars at locations 2, 3, and 4 for the second guess, and so on. This averaging helps reduce the effects of errors in the calculations when the three assumptions above are not met.

The second guess routine is similar to the first, except that the second routine finds a two-dimensional guess using two intersecting circles rather than a three-dimensional guess using three intersecting spheres. The second routine calculates guesses for $x_{tx}, y_{tx}$, and $rz_{tx}$ thereby only affecting position and orientation only in the x-y plane only. The $z_{tx}$, $rx_{tx}$, and $ry_{tx}$ are set to zero for this guess.

The first step in this two-dimensional guess is to pick the two scale bar observations that have the largest included angle $\beta_{loc,tx}$, between the two detectors on the scale bar. The two scale bars are chosen such that $\beta_{loc,tx}$ is large for both the first transmitter (10-1) and the unknown transmitter (10-?). The purpose of this criterion is to select scale bar observations that represent large angular extent between the top and bottom scale bar detectors and thus better resolution on the scale bar measurement. Because $\beta_{loc,tx}$, must be large for both transmitters (10-1 & 10-?), this selection criterion will tend to pick the scale bar locations that are equally spaced between the two transmitters (10-1 & 10-?).

Once the two scale bars are selected, we can create the construct shown in FIG. 32-7 below. In FIG. 32-7, we put primes on the $\vec{t}$ vectors and the d distances to indicate that we have set the z component to zero, since the guess is calculated in the x-y plane only. Zeroing the z component helps reduce errors in both of these quantities when the scale bars are tilted. We calculate the intersection of the two circles to find the guess location for the unknown transmitter (10-?), $(x_{tx}, y_{tx}, 0.0)$.

As with the three-sphere guess routine, we can specify a vector in the first transmitter's reference frame that locates one of the selected scale bars relative to the second transmitter. This is illustrated in FIG. 32-8. Since we also have the $\vec{t}\,'$ vector that describes the scale bar relative to the unknown transmitter, we can determine an $rz_{tx}$ angle using the following formula.

$$\vec{s}_{loc,tx} = \vec{t}\,'_{loc,1} - \vec{p}_{tx}$$

$$rz_{tx} = \tan^{-1}\left(\frac{y_s}{x_s}\right) - \tan^{-1}\left(\frac{y^1_{t_{loc},1}}{x^1_{t_{loc},1}}\right)$$

Using this formula, we calculate the $rz_{tx}$ angle for both selected scale bars and average the two angles to calculate the guess value for the rotation about z.

The first guess routine is sufficient for most user setups. However, when the setup deviates significantly from the three assumptions previously listed, the second guess routine provides a good backup.

(3) Solution Calculation

As previously stated, the Quick Setup algorithm uses Newton-Raphson iteration to find the best solution for the given setup. The Newton-Raphson iteration method will be understood by those skilled in the art. Since we have two separate initial guess vectors, Quick Setup runs two separate iterations and then compares the solutions for both using the residual error from the fill functions described below. The solution with the lowest residual error is chosen.

Since we have two types of data collected, target observations and scale bar observations, we have two different functions to be solved. In each case, the solution vector for which we are trying to solve is given by $\vec{x}$. From this solution vector, we construct a position vector $\vec{p}_{tx}$ and a rotation matrix $R_{tx}$ for each unknown transmitter. In other words, for a three-transmitter setup, the solution vector is:

$$\vec{x} = [x_2 y_2 z_2 rx_2 ry_2 rz_2 x_3 y_3 z_3 rx_3 ry_3 rz_3]^T$$

with position vectors for the three transmitters given by:

$$\vec{p}_1 = \begin{bmatrix} 0 \\ 0 \\ 0 \end{bmatrix}$$

$$\vec{p}_2 = \begin{bmatrix} x_2 \\ y_2 \\ z_2 \end{bmatrix}$$

$$\vec{p}_3 = \begin{bmatrix} x_3 \\ y_3 \\ z_3 \end{bmatrix}$$

and rotation matrices for the three transmitters given by:

$$R_1 = Rx(0)Ry(0)Rz(0)$$

$$R_2 = Rx(rx_2)Ry(ry_2)Rz(rz_2)$$

$$R_3 = Rx(rx_3)Ry(ry_3)Rz(rz_3)$$

In order to describe the two types of solve functions, we now introduce a shorthand notation for two $\vec{r}$ vectors that go through the same detector det at the same tool location loc from two different transmitters a and b:

$$\vec{r}_a \equiv \vec{r}_{loc,a,det}$$

$$\vec{r}_b \equiv \vec{r}_{loc,b,det}$$

For target observations, we want to solve for the locations and orientations of the unknown transmitters by making the distance between each set of target rays zero. Therefore, we use the following formula that describes the distance between two target rays.

$$dist = \frac{R_a \vec{r}_a \times R_b \vec{r}_b}{\|R_a \vec{r}_a \times R_b \vec{r}_b\|} \cdot (\vec{p}_a - \vec{p}_b)$$

As can be seen from the FIG. 32-9, the target rays are multiplied by the corresponding transmitter rotation matrix so that the rays will be relative to the user reference frame. We use the distance equation for all target observations and all combinations of two transmitters. When the correct positions and orientations of the unknown transmitters are found, the calculated distance between rays will be approximately zero.

For scale bar observations, we want to ensure that each recorded scale bar length is equal to the calculated scale bar length for the given locations and orientations of the transmitters in the workspace. Since the solution process is iterative, the rays to the detector targets on each scale bar are not going to intersect until the correct solution vector is found. Therefore, to check the scale, we must first calculate the closest point of intersection for two detector target rays.

In FIG. 32-10, we again illustrate vectors $R_a \vec{r}_a$ and $R_b \vec{r}_b$, which do not intersect. The line segment that connects these two vectors represents the closest point between the vectors. This line segment is perpendicular to both vectors. Rather than calculate the length of this line segment as we did for the target observation function, we instead want to calculate the midpoint on this segment, which represents the closest point of intersection. We can calculate this midpoint by constructing three orthogonal basis vectors.

$$\vec{n} = R_a \vec{r}_a \times R_b \vec{r}_b$$

$$\vec{f} = R_a \vec{r}_a \times \vec{n}$$

$$\vec{g} = R_b \vec{r}_b \times \vec{n}$$

We then define a reference frame B in which the midpoint lies using the three normalized basis vectors as rows of B:

$$B = \begin{bmatrix} \hat{n}^T \\ \hat{f}^T \\ \hat{g}^T \end{bmatrix}$$

We now determine the component of the midpoint along each of the basis vectors:

$$n = \frac{\hat{n} \cdot \vec{p}_a + \hat{n} \cdot \vec{p}_b}{2}$$

$$f = \hat{f} \cdot \vec{p}_a$$

$$g = \hat{g} \cdot \vec{p}_b$$

Finally, we can calculate the coordinate of the midpoint in the user reference frame:

$$\hat{p}_{mid} = B^{-1} \begin{bmatrix} n \\ f \\ g \end{bmatrix}$$

As Newton-Raphson iterates toward the correct positions and orientations of the unknown transmitters, this midpoint approaches the exact location of the detector. The midpoint is calculated for both detectors on the scale bar, and then the scale bar length is calculated:

$$len_{calc} = \|\hat{p}_{mid1} - \hat{p}_{mid2}\|$$

Finally, the difference between the calculated scale bar length and the actual length is determined. This difference will be approximately zero when the correct transmitter positions and orientations are found.

$$len_{error} = len_{calc} - len_{actual}$$

These two types of solution equations make up the fill functions for the Newton-Raphson iteration.

(4) Solution Check

The final step in the Quick Setup algorithm is a cleanup step. By definition, the $\vec{r}$ vectors start at the transmitters (10) and go to the detector targets (78 & 80). This direction is important because it establishes the locations of the transmitters (10) relative to the observations. However, the two fill functions used in the Newton-Raphson iteration do not take into account the direction of the rays, only their distance apart. Therefore, there are two global minima in the solution space, one in which the $\vec{r}$ vectors go from transmitter (10) to detector (78 & 80), and one in which they go the other direction. In some cases, especially when the three assumptions previously described are not met, the iteration can go to the wrong minimum.

Figure 11:
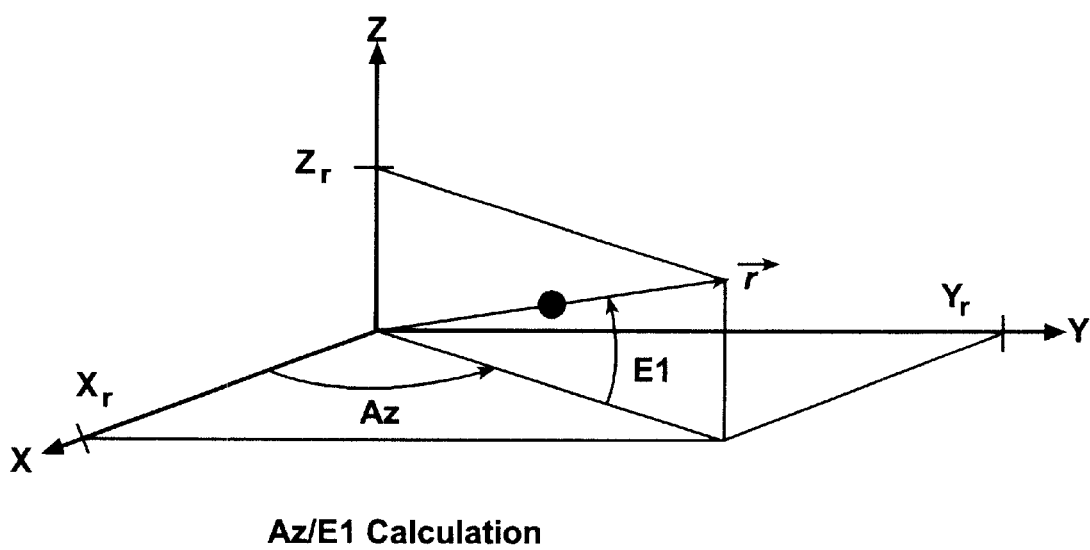
FIG. 11 is a Cartesian plot of an azimuth and elevation corresponding to a given vector.

A simple example of such a solution is given in FIG. 32-11. Note that the unknown transmitter's orientation is correct. Only the transmitter's location gets mirrored. We can see from FIG. 32-11 that the mirrored solution uses the correct rays. The rays just go in the wrong direction. We check for a mirrored solution by calculating actual detector location given the transmitter solution and then comparing that solution with the actual ray as shown in FIG. 32-12. As evident from this Fig., we can simply check the sign on the dot product between these two vectors. If $\vec{r} \cdot (\vec{p}_{det} - \vec{p}_{tx})$ is negative, then the solution is mirrored, and the coordinates of the unknown transmitter are negated. In this case, we simply flip the signs on the $x_{tx}$, $y_{tx}$, and $z_{tx}$ coordinates for the mirrored transmitter. This check is performed on all unknown transmitters (10).

Figure 33:
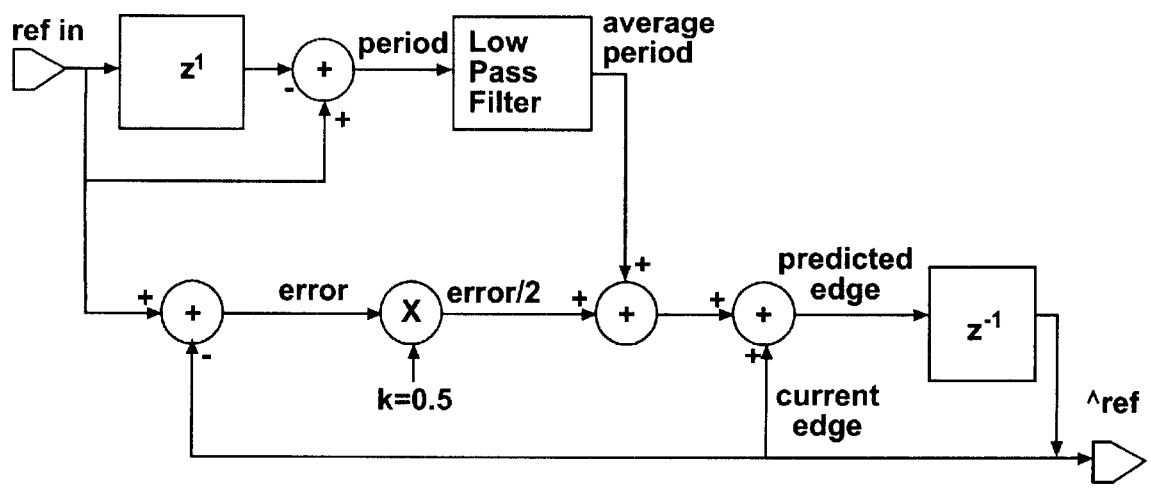
FIG. 33 is a block diagram illustrating a reference pulse stabilization loop that can be incorporated into the receiver of the present invention.

Referring to FIG. 33, the receiver can also incorporate a reference pulse stabilization loop to stabilize the reference pulses emitted by the transmitters. As explained above, the inventive system uses rotating planes or fans of light and a strobe to create the measurement field. The system then uses timing techniques to convert the optical signals into angular measurements. More particularly, the timing between the two beams determines the elevation and/or vertical angle.

From a practical standpoint, however, there are fundamental differences between the optical signals. The fan beams can be made using coherent laser techniques. The effective intensity of the beams will then decrease almost linearly with range. For example, if the intensity where 1 mWatt at 10 meters, the intensity would be ½ mWatt at 20 meters. The strobe has characteristics more like a flash bulb. Therefore, the intensity of its signal decreases quadratically with range ($1/r^2$). For example, if the intensity were 1 mWatt at 10 meters, the intensity would be 1.4 mWatt at 20 meters. Therefore, in most cases at long range, the strobe signal is the weakest signal and becomes noisy as it approaches the noise floor of the system.

The effects of noise can be mitigated through averaging. One simple way would be to average the resulting azimuth and elevation measurements with a fixed filter length. This will present smoothed results to the user with the tradeoff being that the user has to wait for a smooth measurement. This will also put latency into the measurement; therefore, as the user moves the device, the measurement might not appear to track the movement. Other types of averaging can also be used, such as Kalman filters, with the cost being the need for additional computational capacity.

The inventive filter shown in FIG. 33 specifically addresses the unique needs of an optical measurement system. In the inventive system, the strobe signal is stationary in time and space even in the presence of receiver motion, whereas the fan beam signals are not stationary in either time or space during motion. Further, because the strobe is the major noise source, and because the strobe signal is present in all measurements conducted by the inventive system, noise reduction in the strobe would positively affect all system measurements. The stationary characteristics of the strobe also allows the strobe signal to averaged over long periods of time, enabling the strobe signal to act as a predictive signal even if a particular strobe measurement is missing. Even with significant averaging of the strobe signal, the user would experience no additional latency.

The stability measurements using the inventive system depends in part upon the stability of periodic reference pulses emitted by the transmitters. During testing, significant reference pulse jitter was observed on a revolution to revolution basis. However, it was also noted that these errors appeared random in nature. As these pulses are meant to be stationary in time, it appeared that significant stability gains could be obtained by removing this jitter with the reference pulse stabilization loop.

Referring to FIG. 33, the reference pulse stabilization loop includes two distinct components: the period filter, which produces a stable average reference period, and a feedback loop which predicts the next reference pulse time based upon the previous prediction, the calculated average period, and the loop error. Initial testing has indicated a decrease in jitter on the order of 5 times less than that of a system without the control loop. Note that since this jitter is a function of the rotational rate of the transmitter head, the jitter effect on linear measurements increases with distance from the transmitter. However, as there are other sources of jitter, reference pulse jitter becomes more dominant as distance from the transmitter increases. Thus, stability improvement is most noticeable at greater ranges.

The preceding description has been presented only to illustrate and describe the invention. It is not intended to be exhaustive or to limit the invention to any precise form disclosed. Many modifications and variations are possible in light of the above teaching.

In accordance with the principles of the present invention, the functionality disclosed herein can be implemented by hardware, software, and/or a combination of both. Software implementations can be written in any suitable language, including without limitation high-level programming languages such as C++, mid-level and low-level languages, assembly languages, and application-specific or device-specific languages. Such software can run on a general purpose computer such as a 486 or a Pentium, an application specific piece of hardware, or other suitable device. In addition to using discrete hardware components in a logic circuit, the required logic may also be performed by an application specific integrated circuit ("ASIC"), a programmed programmable logic device ("PLD"), or other device. The system will also include various hardware components which are well known in the art, such as connectors, cables, and the like. Moreover, at least part of this functionality may be embodied in computer readable media (also referred to as computer program products), such as magnetic, magnetic-optical, and optical media, used in programming an information-processing apparatus to perform in accordance with the invention. This functionality also may be embodied in computer readable media, or computer program products, such as a transmitted waveform to be used in transmitting the information or functionality.

As is clear from the present disclosure, the present invention can be applied to a variety of different fields, applications, industries, and technologies. The present invention can be used, without limitation, with any system in which information related to position must be determined, including without limitation movement, dimensional measurement, and position and orientation tracking. This includes without limitation many different processes and applications involved in myriad industries. Some of these industries and some of their associated processes or applications are: film making (digitizing models, virtual sets, camera tracking, automatic focusing), construction (trades, power tools, surveying, CAD, equipment control, construction measurement and layout), robotics (robot calibration, work cell configuration, mobile robot navigation, hazardous waste excavation), law enforcement (accident scene mapping, crime scene mapping, incident reconstruction), computers (3D input devices, video games), virtual reality (augmented reality, virtual arcades, 3D Internet experiences), manufacturing (factory automation, facility decommissioning, parts inspection, facility maintenance, manufacturing tooling and inspection, manufacturing measurement), medical (surgical navigation, smart operating rooms, medical instrumentation), and defense (ordinance modeling, simulation training, aircraft fit-checks, ship retrofit and repair, site remediation).

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An improved position measurement system, comprising:
    at least one optical transmitter positioned within a position measurement field to generate a pair of planar light beams and a strobe pulse to illuminate said measurement field;
    at least one selectively positionable receiver within said position measurement field to generate position measurement data in response to said illumination from said planar beams and said strobe pulse; and
    calibration logic associated with said light detector receiver for executing a quadratic mathematical algorithm to uniquely characterize said planar beams of each of said optical transmitters active in said measurement field.

2. The improved position measurement system of claim 1, wherein said quadratic mathematical algorithm uses a cone shape to describe a scan of each planar beam.

3. The improved position measurement system of claim 2, wherein the cone shape is selected from a group consisting of an elliptic cone shape, a parabolic cone shape, or hyperbolic cone shape.

4. The improved position measurement system of claim 2, wherein each cone shape has a cone surface corresponding to one planar beam.

5. The improved position measurement system of claim 4, wherein the calibration logic executes the quadratic mathematical algorithm by:
    moving the cone surface to be tangential to a first axis;
    rotating the cone surface about the first axis by a first angle to generate a second cone surface;
    rotating the second cone surface about a second angle representing a scan angle of one of said planar beams at a given time; and
    calculating a vector expression corresponding to a point at which said one of said planar beams intersects the receiver.

6. The improved position measurement system of claim 1, additionally including a plurality of base stations selectively located within said measurement field for monitoring calibration data uniquely associated with each optical transmitter active in said measurement field.

7. The improved position measurement system of claim 6, wherein each base station additionally includes recalibration logic for monitoring and recalculating transmitter calibration data for each active transmitter within said system in response to detection of any change in one or more of a plurality of transmitter parameters which would induce errors in said transmitter calibration data.

8. The improved position measurement system of claim 1, wherein said quadratic mathematical model is determined by a plurality of measurements of planar beam shapes for each optical transmitter and wherein the transmitter includes a lookup table to store parameters corresponding to the relative positions of the planar beams for each transmitter.

9. The improved position measurement system of claim 1, wherein the receiver includes a reference pulse stabilization loop.

10. The improved position measurement system of claim 9, wherein the reference pulse stabilization loop includes:
    a period filter that produces a stable average reference period; and a feedback loop that predicts a subsequent reference pulse time based on a previous predicted pulse time, the stable average reference period, and a loop error.

11. In a position measurement system which includes an optical transmitter for generating a pair of spaced apart planar light beams and a periodic strobe pulse and a selectively positionable detector having at least two spaced apart optical detectors wherein said transmitter and detector are positioned in a measurement field, an improvement comprising:

means to continuously monitor and calculate a pulse width of said beams;

means to characterize said planar beams using a quadratic mathematical algorithm, wherein a range distance from said transmitter position to said detector position is estimated based on the pulse width and the quadratic mathematical algorithm; and means to display said estimated range to a user.

12. The improved position measurement system of claim 11, additionally including means to permit said user to set an error bounds as a linear measurement.

13. The improved position measurement system of claim 12, additionally including means to convert a selected error bound and estimated range data into a determined angular error.

14. The improved position measurement system of claim 13, additionally including means to signal the user when measurements are either within or outside an established error bound.

15. The improved position measurement system of claim 11, wherein said quadratic mathematical algorithm uses a cone shape to describe a scan of each planar beam.

16. The improved position measurement system of claim 15, wherein the cone shape is selected from a group consisting of an elliptic cone shape, a parabolic cone shape, or hyperbolic cone shape.

17. The improved position measurement system of claim 15, wherein each cone shape has a cone surface corresponding to one planar beam.

18. The improved position measurement system of claim 17, wherein the calibration logic executes the quadratic mathematical algorithm by:

moving the cone surface to be tangential to a first axis;

rotating the cone surface about the first axis by a first angle to generate a second cone surface;

rotating the second cone surface about a second angle representing a scan angle of one of said planar beams at a given time; and calculating a vector expression corresponding to a point at which said one of said planar beams intersects the detector.

19. The improved position measurement system of claim 11, wherein the receiver includes a reference pulse stabilization loop.

20. The improved position measurement system of claim 19, wherein the reference pulse stabilization loop includes:

a period filter that produces a stable average reference period; and a feedback loop that predicts a subsequent reference pulse time based on a previous predicted pulse time, the stable average reference period, and a loop error.

21. An improved position measurement method, comprising:

positioning at least one optical transmitter within a position measurement field to generate a pair of planar laser beams and a strobe pulse to illuminate said measurement field;

placing at least one selectively positionable light detector receiver within said position measurement field to generate position management data in response to said illumination from said planar beams and said strobe pulse; and executing a quadratic mathematical algorithm using calibration logic associated with said light detector receiver to uniquely characterize said planar beams of each of said optical transmitters active in said measurement field.

22. The improved position measurement method of claim 21, wherein the quadratic mathematical algorithm in the executing act uses a cone shape to describe a scan of each planar beam, wherein the cone shape has a cone surface corresponding to one shaped beam.

23. The improved position measurement method of claim 22, wherein the cone shape is selected from a group consisting of an elliptic cone shape, a parabolic cone shape, or hyperbolic cone shape.

24. The improved position measurement method of claim 21, wherein executing the quadratic mathematical algorithm includes:

moving the cone surface to be tangential to a first axis;

rotating the cone surface about the first axis by a first angle to generate a second cone surface;

rotating the second cone surface about a second angle representing a scan angle of one of said planar beams at a given time; and calculating a vector expression corresponding to a point at which said one of said planar beams intersects the light detector receiver.

25. The improved position measurement method of claim 24, further comprising positioning a plurality of base stations selectively located within said measurement field for monitoring calibration data uniquely associated with each optical transmitter active in said measurement field.

26. The improved position measurement method of claim 25, wherein each base station conducts monitoring and recalculating transmitter calibration data for each active transmitter within said system in response to detect any change in one or more of a plurality of transmitter parameters which would induce errors in said transmitter calibration data.

27. The improved position measurement method of claim 21, wherein said quadratic mathematical algorithm is determined by a plurality of measurements of the shaped beams for each optical transmitter and wherein the method further includes the act of storing parameters corresponding to the relative positions of the shaped beams for each transmitter in a lookup table.

28. The improved position measurement method of claim 21, further comprising:

calculating a stable average reference period; and predicting a subsequent reference pulse time based on a previous stable average reference period, the stable average reference period from the calculating step, and a loop error.

29. A receiver for an improved position measurement system having at least one optical transmitter positioned within a position measurement field that generates a pair of planar light beams and a strobe pulse to illuminate the position measurement field, the receiver comprising:

a data generator for generating position measurement data in response to illumination of the receiver from said planar beams and said strobe pulse; and calibration logic associated with the receiver for executing a quadratic mathematical algorithm to uniquely characterize said planar beams of each of said optical transmitters active in said measurement field.

30. The receiver of claim 29, wherein the receiver is selectively positionable within the position measurement field.

31. The receiver of claim 29, wherein the quadratic mathematical algorithm in said calibration logic uses a cone shape to describe a scan of each planar beam.

32. The receiver of claim 31, wherein the cone shape is selected from a group consisting of an elliptic cone shape, a parabolic cone shape, or hyperbolic cone shape.

33. The receiver of claim 32, wherein each cone shape has a cone surface corresponding to one planar beam.

34. The receiver of claim 33, wherein the calibration logic executes the quadratic mathematical algorithm by:

moving the cone surface to be tangential to a first axis;

rotating the cone surface about the first axis by a first angle to generate a second cone surface;

rotating the second cone surface about a second angle representing a scan angle of one of said planar beams at a given time; and calculating a vector expression corresponding to a point at which said one of said planar beams intersects the receiver.

35. The receiver of claim 29, wherein said quadratic mathematical model is determined by a plurality of measurements of planar beam shapes for each optical transmitter and wherein the transmitter includes a lookup table to store parameters corresponding to the relative positions of the planar beams for each transmitter.

36. The receiver of claim 29, wherein the receiver includes a reference pulse stabilization loop.

37. The receiver of claim 36, wherein the reference pulse stabilization loop includes:

a period filter that produces a stable average reference period; and a feedback loop that predicts a subsequent reference pulse time based on a previous predicted pulse time, the stable average reference period, and a loop error.

* * * * *